United States Patent
Oeguen et al.

(10) Patent No.: US 11,940,263 B2
(45) Date of Patent: Mar. 26, 2024

(54) DETECTOR FOR DETERMINING A POSITION OF AT LEAST ONE OBJECT

(71) Applicant: trinamix GmbH, Ludwigshafen am Rhein (DE)

(72) Inventors: Celal Mohan Oeguen, Ludwigshafen (DE); Michael Eberspach, Ludwigshafen (DE); Robert Send, Ludwigshafen (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 520 days.

(21) Appl. No.: 17/269,443

(22) PCT Filed: Aug. 23, 2019

(86) PCT No.: PCT/EP2019/072629
§ 371 (c)(1),
(2) Date: Feb. 18, 2021

(87) PCT Pub. No.: WO2020/039086
PCT Pub. Date: Feb. 27, 2020

(65) Prior Publication Data
US 2021/0180939 A1 Jun. 17, 2021

(30) Foreign Application Priority Data
Aug. 24, 2018 (EP) .................... 18190751

(51) Int. Cl.
*G01B 11/00* (2006.01)
*G02B 6/02* (2006.01)
*G02B 6/26* (2006.01)

(52) U.S. Cl.
CPC ............. *G01B 11/002* (2013.01); *G02B 6/02* (2013.01); *G02B 6/262* (2013.01)

(58) Field of Classification Search
None
See application file for complete search history.

(56) References Cited

U.S. PATENT DOCUMENTS

| 7,126,696 B2 | 10/2006 | Tobiason |
| 10,260,859 B2 | 4/2019 | Kuga |

(Continued)

FOREIGN PATENT DOCUMENTS

| JP | H03238311 A | 10/1991 |
| JP | H06229822 A | 8/1994 |

(Continued)

OTHER PUBLICATIONS

International Search Report and Written Opinion for corresponding PCT/EP2019/072629 dated Oct. 18, 2019, 9 pages.

(Continued)

*Primary Examiner* — Jerry Rahll
(74) *Attorney, Agent, or Firm* — Armstrong Teasdale LLP

(57) ABSTRACT

Described herein is a detector for determining a position of at least one object. The detector includes:
- at least one transfer device;
- at least one illumination source adapted to generate at least one light beam for illuminating the object;
- at least one first optical receiving fiber and at least one second optical receiving fiber;
- at least two optical sensors; and
- at least one evaluation device being configured for determining at least one longitudinal coordinate z of the object by evaluating a combined signal Q from the sensor signals.

16 Claims, 13 Drawing Sheets

(56) References Cited

U.S. PATENT DOCUMENTS

2016/0084637 A1   3/2016  John
2018/0084981 A1   3/2018  Wang

FOREIGN PATENT DOCUMENTS

| JP | 2003028620 A | 5/2002 | |
|---|---|---|---|
| JP | 2002365561 A | 12/2002 | |
| JP | 2005106827 A | 4/2005 | |
| JP | 2005234361 A | 9/2005 | |
| JP | 2014240958 A | 12/2014 | |
| WO | 2012110924 A1 | 8/2012 | |
| WO | 2014097181 A1 | 6/2014 | |
| WO | 2014198629 A1 | 12/2014 | |
| WO | 2018091640 A2 | 5/2018 | |
| WO | WO-2018091640 A2 * | 5/2018 | ............ G01J 1/0411 |
| WO | 2018167215 A1 | 9/2018 | |
| WO | 2017110837 A1 | 10/2018 | |

OTHER PUBLICATIONS

R.A. Street: Technology and Applications of Amorphous Silicon, Springer-Verlag Heidelberg, 2010, pp. 346-349.

* cited by examiner

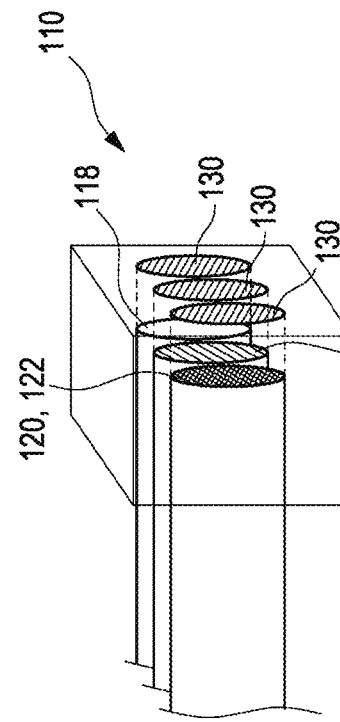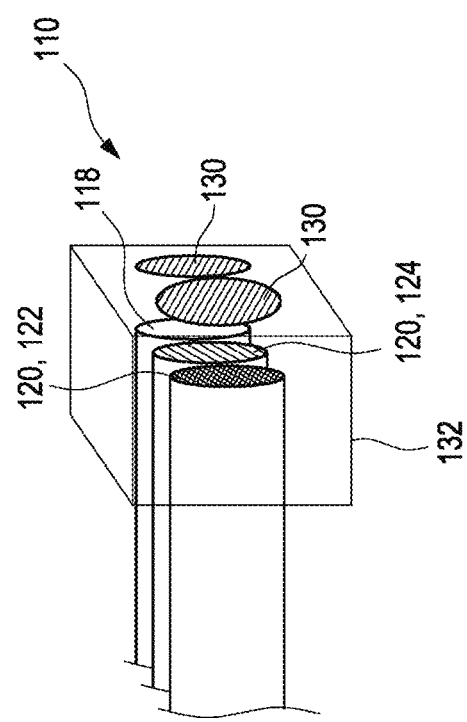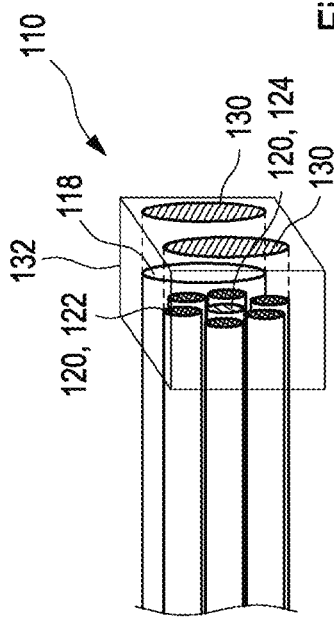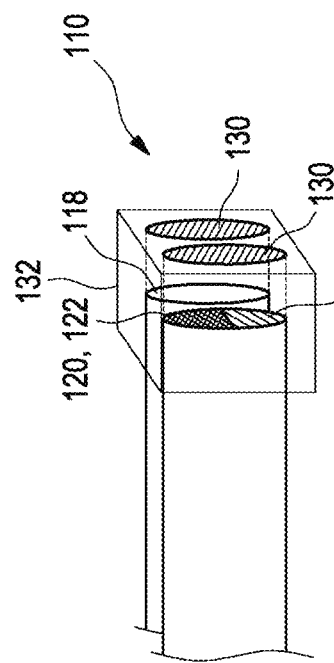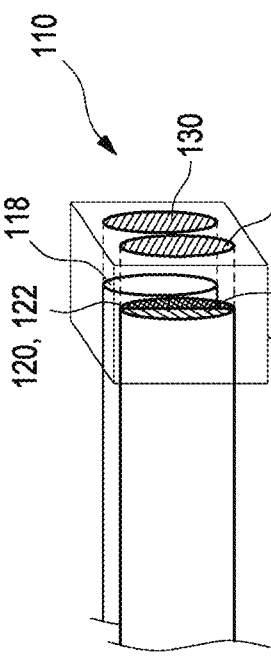

DETECTOR FOR DETERMINING A POSITION OF AT LEAST ONE OBJECT

CROSS-REFERENCE TO RELATED APPLICATIONS

This application is a U.S. National Phase Application of International Patent Application No. PCT/EP2019/072629, filed Aug. 23, 2019, which claims the benefit of priority to European Patent Application No. 18190751.0, filed Aug. 24, 2018, the entire contents of which are hereby incorporated by reference herein.

FIELD OF THE INVENTION

The invention relates to a detector and a method for determining a position of at least one object. The invention further relates to various uses of the detector device. The devices, methods and uses according to the present invention specifically may be employed for example in various areas of daily life, gaming, traffic technology, production technology, security technology, photography such as digital photography or video photography for arts, documentation or technical purposes, medical technology or in the sciences. However, other applications are also possible.

PRIOR ART

Fiber optical distance sensors are generally known from prior art. However, conventional distance measurement technologies cannot be realized easily through optical fibers. For example, measurements based on time of flight of photons may not deliver reliable results due to the physical features of multimode fibers. Triangulation generally requires a spatially well resoled array system to identify an angle of incidence on a sensor which is required for the calculation of the distance.

Moreover, distance measurements based on light intensity may deliver different results for light and dark targets even if targets of both types are positioned at the same distance from the detector since the reflected intensity depends on the reflectivity of the target. Fiber sensors are often employed as light barriers since they can only measure the intensity reflected from the illuminated target.

WO 2018/091640 A1 describes a new distance measurement technology using depth from photon ratios (DPR). Using the DPR technology allows measurements independent of target reflectivity. A fiber optical detector for distance measurement using depth from photon ratio technology is described, in PCT/EP2018/056545 filed on Mar. 15, 2018, the full content of which is herewith included by reference. DPR based fiber sensors can measure absolute distances between a measurement head and a given target. However, DPR may be limited in flexibility when the task is to design a system with a given resolution and a given measurement range.

US 2018/084981 A1 describes an apparatus, method, and system for a spectrally encoded endoscope comprising a focusing lens encompassed by a light guiding component and spacer. The focusing lens is substantially ball or semi-circular in shape, and the refractive index of the focusing lens is greater than the refractive index of the spacer.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably independent from target reflectivity and preferably with enhanced measurement range and resolution.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a detector for determining a position of at least one object is disclosed. As used herein, the term "object" refers to a point or region emitting at least one light beam. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
- at least one transfer device, wherein the transfer device has at least one focal length in response to the at least one incident light beam propagating from the object to the detector, wherein the transfer device has at least one optical axis;
- at least one illumination source adapted to generate at least one light beam for illuminating the object, wherein an exit pupil of the illumination source is displaced from the optical axis by a distance BL;
- at least one first optical receiving fiber and at least one second optical receiving fiber, wherein each of the optical receiving fibers comprises at least one cladding and at least one core, wherein the first optical receiving fiber has a core diameter of $d_1$, wherein the second optical receiving fiber has a core diameter of $d_2$, wherein a ratio $d_1/BL$ is in the range $0.000047 \leq d_1/BL \leq 313$ and/or wherein a ratio $d_2/BL$ is in the range $0.000047 \leq d_2/BL \leq 313$;
- at least two optical sensors, wherein at least one first optical sensor is arranged at an exit end of the first optical receiving fiber and at least one second optical sensor is arranged at an exit end of the second optical receiving fiber, wherein each optical sensor has at least one light sensitive area, wherein each optical sensor is designed to generate at least one sensor signal in response to an illumination of its respective light-sensitive area by a light beam having passed through the respective optical receiving fiber;
- at least one evaluation device being configured for determining at least one longitudinal coordinate z of the object by evaluating a combined signal Q from the sensor signals.

The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical receiving fibers. The transfer device specifically may comprise one or more of: at least one lens, for example at least one lens selected from the group consisting of at least one focus-tunable lens, at least one aspheric lens, at least one spherical lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. The transfer device may comprise at least one gradient index (GRIN) lens such as GRIN lenses available from Grintech GmbH, Schillerstraße 1, 07745 Jena, Germany. The GRIN lens may have a continuous refraction gradient, for example, an axial and/or radial and/or spherical refraction gradient. The f-number of the GRIN lens may be dependent on a lens length. Using GRIN lens may allow miniaturizing optics, in particular using very thin optics. For example, very thin optics with a thickness or diameter of 0.2 mm may be possible. The transfer device may comprise at least one annular axial lens, for example torus form. The annular axial lens may have a plano-convex form, for example, an axial and/or radial and/or spherical curvature.

The transfer device has a focal length in response to the at least one incident light beam propagating from the object to the measurement head. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The above-mentioned optional embodiments of the transfer device can, in principle, be realized individually or in any desired combination.

The transfer device has an optical axis. As used herein, the term "optical axis of the transfer device" generally refers to an axis of mirror symmetry or rotational symmetry of the lens or lens system. In particular, the detector and the transfer device have a common optical axis. The optical axis of the detector may be a line of symmetry of the optical setup of the detector. The detector may comprise at least one transfer system having at least one lens. The transfer system, as an example, may comprise at least one beam path, with the elements of the transfer system in the beam path being located in a rotationally arranged or even symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the detector may have a single beam path along which a light beam may travel from the object to the optical receiving fibers, or may have a plurality of beam paths. As an example, a single beam path may be given or the beam path may be split into two or more partial beam paths. In the latter case, each partial beam path may have its own optical axis. The optical receiving fibers may be located in one and the same beam path or partial beam path. Alternatively, however, the optical receiving fibers may also be located in different partial beam paths.

The transfer device may constitute a coordinate system, wherein a longitudinal coordinate l is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate I. Any direction perpendicular to the z-axis may be considered a transversal direction, and the polar coordinate and/or the polar angle may be considered a transversal coordinate.

The transfer device may have a ratio $v_e/n_D$ in the range $9.05 \leq v_e/n_D \leq 77.3$, wherein $v_e$ is the Abbé-number and $n_D$ is the refractive index. The Abbé-number $v_e$ is given $$v_e = \frac{(n_D - 1)}{(n_F - n_c)},$$

wherein $n_i$ is the refractive index for different wavelengths, wherein $n_C$ is the refractive index for 656 nm, $n_D$ is the refractive index for 589 nm and $n_F$ is the refractive index for 486 nm, measured at room temperature, see e.g. https://en.wikipedia.org/wiki/Abbe_number. Preferably, the ratio is in the range of $13.9 \leq v_e/n_D \leq 44.7$, more preferably the ratio $v_e/n_D$ in the range of $15.8 \leq v_e/n_D \leq 40.1$. Without wishing to be bound by this theory, refractive indices always depend on manufacturing tolerances. Further, refractive indices are temperature dependent. Further, the wavelength of a light source always has a given tolerance concerning temperature variations. To ensure a stable distance measurement despite quickly changing or very high temperatures or uncontrolled surroundings, the Abbé-number to refractive index quotient may be limited to values that ensure the necessary stability range.

The term "light beam" generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space. As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. As used herein, the term "beam profile" generally refers to a transverse intensity profile of the light beam. The beam profile may be a spatial distribution, in particular in at least one plane perpendicular to the propagation of the light beam, of an intensity of the light beam. The light beam specifically may be a Gaussian light beam or a linear combination of Gaussian light beams, as will be outlined in further detail below. Other embodiments are feasible, however. The transfer device may be configured for one or more of adjusting, defining and determining the beam profile, in particular a shape of the beam profile. As used herein, the term "light" generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The incident light beam may propagate from the object towards the detector. The incident light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object and, thereby, is at least partially directed towards the measurement head. The illumination source, as an example, may be or may comprise one or more of an external illumination source, an illumination source integrated into the detector or an illumination source integrated into a beacon device being one or more of attached to the object, integrated into the object or held by the object. Thus, the detector may be used in active and/or passive illumination scenarios.

The detector comprises the illumination source adapted to generate at least one light beam for illuminating the object. The illumination source may be configured for illuminating the object, for example, by directing a light beam towards the object, which reflects the light beam. The illumination source may be configured for generating an illuminating light beam for illuminating the object. Therefore, the illumination source may comprise at least one light source. Specifically, the illumination source may comprise at least one laser and/or laser source. The light source may be or may comprise at least one multiple beam light source. For example, the light source may comprise at least one laser source and one or more diffractive optical elements (DOEs). The illumination source may be adapted to illuminate the object through at least one angle-dependent optical element. Various types of lasers may be employed, such as semiconductor lasers. Additionally or alternatively, non-laser light sources may be used, such as LEDs and/or light bulbs. The illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources. The illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1000 nm, especially 500 to 1000 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1000 nm may be used. On account of their generally defined beam profiles and other properties of handleability, the use of at least one laser source as the illumination source is particularly preferred. The illumination source may be integrated into a housing of the detector.

The illumination source may be configured such that the illuminating light beam propagates from the detector towards the object along an optical axis of the detector. For this purpose, the detector may comprise at least one reflective element, preferably at least one prism, for deflecting the illuminating light beam onto the optical axis.

The illumination source may comprise at least one optical sender fiber, also denoted optical illumination fiber. The optical sender fiber may have at least one entrance end. The at least one light source may be positioned at the entrance end. The illumination source may comprise at least one coupling element configured to couple at least one light beam generated by the light source into the optical sender fiber. The optical sender fiber may further comprise at least one exit end, wherein the exit end is configured to emit the light beam having passed through the optical sender fiber. The illumination source may comprise at least one further transfer device. The further transfer device may be arranged at an exit end of the optical sender fiber. The further transfer device may be designed as one-piece with the transfer device, e.g. the transfer device may be used as further transfer device. The optical sender fiber may be attached to the further transfer device such as by a polymer or glue or the like, to reduce reflections at interfaces with larger differences in refractive index. For example, the detector may be a compact device without further optical elements, wherein the illumination source may be placed as close as possible to an edge of the transfer device.

Further, the illumination source may be configured for emitting modulated or non-modulated light. In case a plurality of illumination sources is used, the different illumination sources may have different modulation frequencies which later on may be used for distinguishing the light beams. The detector may comprise one illumination source or a plurality of identical illumination sources and/or a plurality of different illumination sources. For example, the plurality of illumination sources may comprise at least two illumination sources generating light with different properties such as color or modulation frequencies.

Preferably, the illumination source may be configured to illuminate the object under an angle $\alpha_{illu}$ with respect to the optical axis. The angle $\alpha_{illu}$ may be in the range $0°\le\alpha_{illu}\le40$, preferably in the range $1°\le\alpha_{illu}\le35$, more preferably in the range $2°\le\alpha_{illu}\le25$. The illumination source, specifically the exit pupil of the illumination source, may be arranged under an arbitrary angle with respect to the optical axis. Illuminating the object under an angle $\ge5°$ with respect to the optical axis may allow increasing the measurement range and enhancing resolution. Other embodiments, however, are feasible. For example, the illuminating light beam may be parallel to the optical axis of the detector, specifically of the transfer device, or tilted with respect to the optical axis, e.g. including an angle with the optical axis. As an example, the illuminating light beam, such as the laser light beam, and the optical axis may include an angle of less than 10°, preferably less than 5° or even less than 2°. Further, the illuminating light beam may be on the optical axis or off the optical axis. As an example, the illuminating light beam may be parallel to the optical axis having a distance of less than 10 mm to the optical axis, preferably less than 5 mm to the optical axis or even less than 1 mm to the optical axis or may even coincide with the optical axis.

The illumination source may have a geometrical extend G in the range $1.5 \cdot 10^{-7}$ mm$^2 \cdot$sr$\le G \le 314$ mm$^2 \cdot$sr, preferable in the range $1 \cdot 10^{-5}$ mm$^2 \cdot$sr$\le G \le 22$ mm$^2 \cdot$sr, more preferable in the range $3 \cdot 10^{-4}$ mm$^2 \cdot$sr$\le G \le 3.3$ mm$^2 \cdot$sr. The geometrical extent G of the illumination source may be defined by $$G = A \cdot \Omega \cdot n^2,$$

wherein A is the area of the surface, which can be an active emitting surface, a light valve, optical aperture or the area of the fiber core with $A_{OF} = \pi \cdot r^2_{OF}$, and $\Omega$ is the projected solid angle subtended by the light and n is the refractive index of the medium. For rotationally-symmetric optical systems with a half aperture angle $\theta$, the geometrical extend is given by $$G = \pi \cdot A \cdot \sin^2(\theta) n^2.$$

For optical fibers a divergence angle is obtained by $\theta_{max} = \arcsin(NA/n)$, where NA is the maximum numerical aperture of the optical fiber.

As used herein, the term "exit pupil" of the illumination source refers to a virtual aperture of the illumination source. The exit pupil, also denoted exit aperture, may be an image of the aperture stop of the optical system of the illumination source at the image side. The exit pupil may furthermore refer to a diameter of the light beam, which leaves the illumination source. The exit pupil may be a surface area of the illumination source configured to emit the light beam such as a surface area of the exit end of the optical sender fiber, an aperture of the light source or an aperture stop of the optical system of the illumination source. The exit pupil of the illumination source is displaced from the optical axis by a distance BL.

As used herein, the term "optical fiber" has its ordinary meaning and specifically refers to at least one optical element configured to guide at least partially at least one light beam impinging on an entrance face of the optical fiber to an exit face of the optical fiber. The entrance face and the exit face may be separated from each other by a certain distance and may be connected by at least one light guiding structure. As used herein, the term "to guide at least partially" refers to perfect light guiding and to configurations in which absorptions and reflections from the entrance face and/or absorptions and reflections from or out of the light guiding structure are possible. As further used herein, the term "optical receiving fiber" refers to at least one optical element configured to guide an impinging light beam at least partially to at least one optical sensor. Specifically, each of the optical receiving fibers may be and/or may comprise at least one optical measurement fiber. As used herein, the term "optical measurement fiber" refers to the at least one angle dependent optical element having at least one optical fiber. The optical receiving fibers each may comprise two ends. The optical receiving fibers each may comprise at least one receiving end adapted to receive at least one light beam originating from the object. The optical receiving fibers each may comprise at least one exit-end from which the light beam originating from the object leaves the optical receiving fiber. The terms optical measurement fiber and optical receiving fiber may be used as synonyms in the following. The receiving end may also be denoted as at least one entrance face of the optical receiving fiber which may also be denoted as the position where the light beam travelling from the object to the detector impinges on the optical receiving fiber. Without wishing to be bound by this theory, it is believed that the angle of incidence of a light beam received by the optical receiving fiber is preserved such that the angle of incidence is equal to the exit-angle, assuming that the angle of incidence is equal or smaller than the acceptance angle of the optical receiving fiber. Thus, distance information encoded in the light beam can be essentially preserved and can be evaluated using a combined signal Q, which will be described in detail below.

The optical receiving fibers may be designed such that the degree of transmission may be highest for incoming light rays parallel, i.e. at an angle of 0°, to the optical fiber, neglecting reflection effects. The optical receiving fibers may be designed such that for higher angles, for example angles from 1° to 10°, the degree of transmission may decrease smoothly to around 80% of the degree of transmission for parallel light rays and may remain at this level constantly up to an acceptance angle of the optical receiving fiber. As used herein, the term "acceptance angle" may refer to an angle above which total reflection within the respective optical receiving fiber is not possible such that the light rays are reflected out of the optical receiving fiber. The optical receiving fibers may be designed that at the acceptance angle, the degree of transmission may steeply fall to zero. Light rays having a large angle of incidence may be cut-off.

The optical receiving fibers may be configured to transmit at least parts of the incident light beam which are not absorbed and/or reflected, between two ends of the respective optical receiving fiber such as an entrance end and an exit end. The optical receiving fibers may have a length and may be adapted to permit transmission over a distance. The optical receiving fibers may comprise at least one material selected from the group consisting of: silica, aluminosilicate glass, germane silicate glass, fluorozirconate, rare earth doped glass, fluoride glass, chalcogenide glasses, sapphire, doped variants, especially for silica glass, phosphate glass, PMMA, polystyrene, fluoropolymers such as poly(per-fluoro-butenylvinyl ether), or the like. The optical receiving fibers may be a single or multi-mode fiber. Each of the optical receiving fibers may be or may comprise one or more of a step index fiber, a polarizing fiber, a polarization maintaining fiber, a plastic optical fiber or the like.

Each of the optical receiving fibers comprise at least one fiber core which is surrounded by at least one fiber cladding. The fiber cladding may have a lower index of refraction as the fiber core. The fiber cladding may also be a double or multiple cladding. The fiber cladding may comprise a so-called outer jacket. The fiber cladding may be coated by a so-called buffer adapted to protect the optical fiber from damages and moisture. The buffer may comprise at least one UV-cured urethane acrylate composite and/or at least one polyimide material. In one embodiment, a refractive index of the fiber core may be higher than the refractive index of the fiber cladding material and the optical fiber may be adapted to guide the incoming light beam by total internal reflection below the angle of acceptance. In one embodiment, the optical receiving fibers may comprise at least one hollow core fiber, also called photonic bandgap fiber. The hollow-core fiber may be adapted to guide the incoming light beam essentially within a so-called hollow region, wherein a minor portion of the light beam is lost due to propagation into the fiber cladding material.

The optical receiving fibers may comprise one or more fiber connectors at the end of the respective optical receiving fiber. The optical receiving fibers may comprise end caps such as coreless end caps. The optical receiving fibers may comprise one or more of a fiber coupler, a fiber Bragg grating, a fiber polarizer, a fiber amplifier, a fiber coupled diode laser, a fiber collimator, a fiber joint, a fiber splicing, a fiber connector, a mechanical splicing, a fusion splicing, or the like. The optical fibers may comprise a polymer coating.

The optical receiving fibers may comprise at least two or more fibers. The first optical receiver fiber and/or the second optical receiver fibers may comprise at least one multifurcated optical fiber. At least one of the optical receiving fibers may be at least one multifurcated optical fiber, in particular at least one bifurcated optical fiber. For example, the bifurcated optical fiber may comprise two fibers, in particular at least one first fiber and at least one second fiber. The first fiber and the second fiber may be arranged close to each other at an entrance end of the bifurcated optical fiber and may split into two legs separated by a distance at an exit end of the bifurcated optical fiber. The first and second fiber may be designed as fibers having identical properties or may be fibers of different type. The first fiber may be adapted to generate at least one first transmission light beam and the second fiber may be adapted to generate at least one second transmission light beam. The bifurcated optical fiber may be arranged such that the incident light beam may impinge at a first angle of incidence into the first fiber and at a second angle of incidence, different from the first angle, into the second fiber, such that the degree of transmission is different for the first transmission light beam and the second transmission light beam. At least one of the optical receiving fibers may comprise more than two fibers, for example three, four or more fibers. For example, the multifurcated may comprise multiple fibers wherein each fiber may comprise at least one of a core, a cladding, a buffer, a jacket, and one or more fibers may partially or entirely be bundled by a further jacket such as a polymer hose to ensure that the fibers stay close to each other such as at one end of the fiber. All optical receiving fibers may have the same numerical aperture. All optical receiving fibers may be arranged as such, that the light beam propagating from the object to the detector impinges on all of the optical fibers between the transfer device and the focal point of the transfer device at at least one target distance. The optical receiving fibers may be arranged as such, that the position along the optical axis where the light beam propagating from the object to the detector impinges on the optical fibers is identical for all optical receiving fibers. Other arrangements may be possible.

The optical receiving fibers may have specific mechanical properties. The mechanical properties of the optical receiving fibers may be identical or the mechanical properties of the optical receiving fibers may differ. Without wishing to be bound by this theory, a light supporting function of optical receiving fibers relies on relationships of refractive indices and certain energy transport properties. Further certain mechanical parameters may be prerequisite that all functions of the optical fibers are maintained in a stable way. Therefore, certain mechanical parameters may act as prerequisite to ensure a stable measurement itself. At least one of the optical receiving fibers and/or the transfer device has a ratio $\varepsilon_r/k$ in the range $0.362 \text{ (m·K)/W} \leq \varepsilon_r/k \leq 1854 \text{ (m·K)/W}$, wherein k is the thermal conductivity and $\varepsilon_r$ is the relative permittivity. Without wishing to be bound by this theory in environments of rapid heat cycles and/or high temperatures or low temperatures associated with electrical heating devices and/or electrical cooling devices, associated with the electrical fields emitted by these devices and/or electrical spark devices and or heating arc devices, or the like, the use of optical systems within the given range for the quotient of thermal conductivity and the dielectric constant has shown to yield measurement heads with superior stability in these environments. The relative permittivity is also known as the dielectric constant. Preferably, the ratio $\varepsilon_r/k$ is in the range 0.743 (m·K)/W≤$\varepsilon_r/k$≤194 (m·K)/W. More preferably, the ratio $\varepsilon_r/k$ is in the range 1.133 (m·K)/W≤$\varepsilon_r/k$≤88.7 (m·K)/W. At least one of the optical receiving fibers and/or the transfer device may have a relative permittivity in the range 1.02≤$\varepsilon_r$≤18.5, preferably in the range 1.02≤$\varepsilon_r$≤14.5, more preferably in the range 1.02≤$\varepsilon_r$≤8.7, wherein the relative permittivity is measured at 20° C. and 1 kHz. The optical receiving fibers and/or the transfer device may have a thermal conductivity of k≤24 W/(m·K), preferably k≤17 W/(m·K), more preferably k≤14 W/(m·K). The optical receiving fibers and/or the transfer device may have a thermal conductivity of k≥0.003 W/(m·K), preferably k 0.007 W/(m·K), more preferably k≤0.014 W/(m·K). The thermal conductivity may be measured at 0° C. and <1% relative humidity.

As outlined above, each of the optical receiving fibers comprises the at least one cladding and the at least one core. A product $\alpha\Delta n$ may be in the range 0.0004 dB/km≤$\alpha\Delta n$≤110 dB/km at at least one wavelength in a visual and near infrared wavelength range, wherein $\alpha$ is the attenuation coefficient and $\Delta n$ is the refractive index contrast with $\Delta n = (n_1^2 - n_2^2)/(2n_1^2)$, wherein $n_1$ is the maximum core refractive index and $n_2$ is the cladding refractive index. Preferably, the product $\alpha\Delta n$ is in the range 0.002 dB/km≤$\alpha\Delta n$≤23 dB/km, more preferably in the range 0.02 dB/km≤$\alpha\Delta n$≤11.26 dB/km. The refractive index contrast $\Delta n$ may be in the range 0.0015≤$\Delta n$≤0.285, preferably in the range 0.002≤$\Delta n$≤0.2750, more preferably in the range 0.003≤$\Delta n$≤0.25. The attenuation coefficient of the optical receiving fiber may be in the range 0.2 dB/km≤$\alpha$≤420 dB/km, preferably in the range 0.25 dB/km≤$\alpha$≤320 dB/km. The transfer device may have an aperture area $D_1$ and at least one of the optical receiving fibers may have a fiber core with a cross-sectional area $D_2$, wherein a ratio $D_1/D_2$ is in the range 0.54≤$D_1/D_2$≤5087, preferably 1.27≤$D_1/D_2$≤413, more preferably 2.17≤$D_1/D_2$≤59.2. Without wishing to be bound by this theory, limiting the mechanical boundaries of the optical system may result in a strongly improved the measurement stability concerning the optical system. A diameter $d_{core}$ of the core of at least one of the optical receiving fibers may be in the range 2.5 µm≤$d_{core}$≤10000 µm, preferably in the range 7 µm≤$d_{core}$≤3000 µm, more preferably in the range 10 µm≤$d_{core}$≤500 µm. Without wishing to be bound by this theory, the refractive index contrast of optical receiving fibers has shown to be sensitive concerning manufacturing tolerances and/or manufacturing quality while again it is sensitive concerning temperature changes and/or high temperatures. Further, the attenuation coefficient without being related to the refractive index contrast and being mainly influenced by material properties shows a comparable sensitivity to manufacturing quality, temperature changes, high operating temperatures, or the like. Further, the concerned sensitivity of these quantities needs to be limited to a certain range to ensure a proper functioning of the measurement head, if a strong independence of environmental parameters is required.

The optical receiving fibers and/or the transfer device may have a Youngs modulus, also denoted elastic modulus, of less or equal 188 GPa, measured at room temperature, for example by using ultrasonic testing. Preferably the optical receiving fibers and/or the transfer device may have a Youngs modulus of less or equal 167 GPa, more preferably in the range from to 0.0001 GPa to 97 GPa. The optical receiving fibers and/or the transfer device may have a Youngs modulus of greater or equal 0.0001 GPa, preferably of greater or equal 0.007 GPa, more preferably of greater or equal 0.053 GPa.

As outline above, each of the optical receiving fibers may have at least one entrance face. A geometric center of the respective entrance face may be aligned perpendicular with respect to an optical axis of the transfer device. As used herein, the term "geometrical center" of an area generally may refer to a centroid or arithmetic mean position of all points in the area. As an example, if an arbitrary point inside or outside the area is chosen, and if an integral is formed over the vectors interconnecting this arbitrary point with each and every point of the area, the integral is a function of the position of the arbitrary point. When the arbitrary point is located in the geometrical center of the area, the integral of the absolute value of the integral is minimized. Thus, in other words, the geometrical center may be a point inside or outside the area with a minimum overall or sum distance from all points of the area.

At least one of the optical receiving fibers may have an entrance face which is oriented towards the object. As used herein, the term "is oriented towards the object" generally refers to the situation that the respective surfaces or openings of the entrance faces are fully or partially visible from the object. Specifically, at least one interconnecting line between at least one point of the object and at least one point of the respective entrance face may form an angle with a surface element of the entrance face which is different from 0°, such as an angle in the range of 20° to 90°, preferably 80 to 90° such as 90°. Thus, when the object is located on the optical axis or close to the optical axis, the light beam propagating from the object towards the measurement head may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Additionally or alternatively, at least one of the entrance faces may be oriented differing from an orientation towards the object. For example, at least one of the entrance faces may be oriented perpendicular or under an arbitrary angle to the optical axis and with respect to the object.

The transfer device may be adapted to adjust and/or to change the direction of propagation of the light beam. The transfer device, in particular, may be or may comprise at least one GRIN lens and/or at least one diffractive optical element (DOE). The transfer device may be adapted to influence, for example to divert, the light beam propagating from the object to the measurement head. In particular, the transfer device may be adapted to adjust the direction of propagation of the light beam. The transfer device may be adapted to adjust and/or to generate an angle of propagation with respect to the optical axis of the transfer device. The angle of propagation may be an angle between the optical axis of the transfer device and the direction of propagation of the light beam propagating from the object to the detector. Without using a transfer device the angle of propagation of the light beam may depend primarily on properties of the object, such as surface properties and/or material properties, from which the light beam was generated. The transfer device may be adapted to adjust and/or to generate the angle of propagation such that it is independent from surface properties of the object. The transfer device may be adapted to strengthen and/or to amplify angle dependency of the direction of propagation of the light beam. Without wishing to be bound by theory, the light beam generated by the object may propagate from the object to the detector and may impinge on the transfer device under an angle range from 0°, i.e. the optical axis, to an arbitrary angle X, which may be defined by an origin of the scattering on the object to an edge of the transfer device. Since the transfer device may comprise focusing properties, the angle range after passing through the transfer device may differ significantly from the original angle range. For example, light beams impinging parallel to the optical axis may be focused on the focal point or focus. Depending on focusing properties of the transfer device the angle dependency before impinging on the transfer device and after passing through the transfer device may be inverted. The transfer device may be adapted to amplify the angle dependency for a far field, i.e. in case the object is arranged at far distances, wherein light beams are propagating essentially parallel to the optical axis. Generally, without using the transfer device the angle dependency may be greatest in near field regions. In the near field, signals may generally be stronger compared to far field signals. Therefore, a smaller angle dependency in the near field due to a transfer device that amplifies the angle dependency in the far field, may be at least partially compensated by a generally better signal to noise ratio in the near field, and/or by using additional near field properties such as a distance dependent spot-movement due to a non-zero baseline. Additionally or alternatively, for adjusting and/or changing the direction of propagation of the light beam at least one of the optical receiving fibers may be a structured fiber having a shaped and/or structured entrance and/or exit face. Using a structured fiber may allow further increasing the angle dependency of the incoming light beam.

The optical receiving fibers may be arranged in a direction of propagation of the incident light beam propagating from the object to the detector behind the transfer device. The optical receiving fibers and the transfer device may be arranged such that the light beam propagating from the object to the detector passes through the transfer device before impinging on the optical receiving fibers. The transfer device such as a GRIN lens and the optical fibers may be configured as one-piece. The optical receiving fibers may be attached to the transfer device such as by a polymer or glue or the like, to reduce reflections at interfaces with larger differences in refractive index. Alternatively, the transfer device and the optical receiving fibers may be arranged spatially separated such as separated in a direction in or parallel to the optical axis. The transfer device and/or the optical fibers may be arranged displaced in a direction perpendicular to the optical axis. The optical receiving fibers may be arranged as such, that the light beam propagating from the object to the measurement head impinges on the optical fibers between the transfer device and the focal point of the transfer device. For example, a distance in a direction parallel to the optical axis between the transfer device and the position where the light beam propagating from the object to the detector impinges on the optical fibers may be at least 20% of the focal length, more preferably at least 50% of the focal length, most preferably at least 80% of the focal length. For example, the distance in a direction parallel to the optical axis between the entrance face at least one of the optical receiving fibers receiving the light beam propagating from the object to the measurement head and the transfer device may be at least 20% of the focal length, more preferably at least 50% of the focal length, most preferably at least 80% of the focal length.

Each of the optical receiving fibers may be configured to generate the at least one light beam having at least one beam profile depending on the angle of incidence of the incident light beam propagating from the object towards the detector and impinging on the respective optical receiving fiber. In particular, each of the o receiving optical fibers may be adapted to influence and/or change and/or adjust the beam profile of the incident light beam. For example, each of the optical elements may have one or more of angle dependent transmission properties, angle dependent reflection properties or angle dependent absorption properties. The light beam having passed through the respective optical receiving fiber may comprise at least one transmission light beam and/or at least one reflection light beam. The angle of incidence may be measured with respect to an optical axis of the optical receiving fiber such as of the entrance face.

An electromagnetic wave impinging on the entrance face may be partly, depending on the properties of the optical receiving fiber absorbed and/or reflected and/or transmitted. The term "absorption" refers to a reduction of power and/or intensity of the incident light beam by the optical fiber. For example, the power and/or intensity of the incident light beam may be transformed by the optical receiving fiber to heat or another type of energy. As used herein, the term "transmission" refers to a part of the electromagnetic wave which is measurable outside the optical fiber in a half-space with angles from 90° and higher with respect to the optical axis. For example, transmission may be a remaining part of the electromagnetic wave impinging on the entrance face, passing through the optical receiving fiber and leaving the optical receiving fiber at the exit end. The term "reflection" refers to a part of the electromagnetic wave which is measurable outside the optical fiber in a half-space with angles below 90° with respect to the optical axis. For example, reflection may be a change in direction of a wavefront of the incident light beam due to interaction with the optical receiving fiber. The total power of the electromagnetic wave impinging on the optical receiving fiber may be distributed by the optical receiving fiber in at least three components, i.e. an absorption component, a reflection component and a transmission component. A degree of transmission may be defined as power of the transmission component normalized by the total power of the electromagnetic wave impinging on the optical receiving fiber. A degree of absorption may be defined as power of the absorption component normalized by the total power of the electromagnetic wave impinging on the optical receiving fiber. A degree of reflection may be defined as power of the reflection component normalized by the total power of the electromagnetic wave impinging on the optical receiving fiber. Use of at least one transfer device allows to further enhance robustness of the measurement of the longitudinal coordinate. The transfer device may, for example, comprise at least one collimating lens. The optical receiving fibers may be designed to weaken rays impinging with larger angles compared to rays impinging with a smaller angle. For example, the degree of transmission may be highest for light rays parallel to the optical axis, i.e. at 0°, and may decrease for higher angles. In particular, at at least one cut-off angle the degree of transmission may steeply fall to zero. Thus, light rays having a large angle of incidence may be cut-off.

The detector may comprise a plurality of optical receiving fibers, for example a plurality of single optical fibers or a plurality of multifurcated optical fibers. For example, the optical receiving fibers may be arranged in a bundle of optical fibers. For example, the detector may comprise a plurality of single optical fibers, for example optical fibers having identical properties. The optical receiving fibers, i.e. the single optical fibers or multifurcated optical fibers, may be arranged such that the incident light beam may impinge at different angles of incidence into each of the optical receiving fibers such that the degree of transmission is different for each of the optical receiving fibers.

The detector may comprise at least one measurement head in which at least the optical receiving fibers are arranged. The measurement head may comprise at least one spacer device. The spacer device may be configured for connecting the at least one transfer device and at least one of the optical receiving fibers. The spacer device may be configured to attach the transfer device to at least one of the optical receiving fibers. In case the measurement head comprises a plurality of transfer devices and/or optical receiving fibers, the spacer device may be configured for connecting at least one of the transfer devices with at least one of the optical receiving fibers. Optical paths of the optical receiving fibers may be fully or partially optically separated by mechanical means such as a fully or partially intransparent mechanical wall or cladding or the like to avoid internal reflections. This optical separation by mechanical means may be part of the spacer device. The spacer device may comprise a solid volume $V_s$ and a hollow volume $V_h$.

The solid volume may be defined by the volume of solid material of which the spacer device consists of. The convex hull volume of the spacer device may be defined as the volume of the smallest convex hull of the solid volume of the spacer device. The hollow volume of the spacer device may be defined as the convex hull volume of the spacer device minus the solid volume of the spacer device. For example, the empty volume may be defined by inner edges of the solid material. A ratio of solid volume and hollow volume $V_s/V_h$ may be in the range $0.001 \leq V_s/V_h \leq 1000$, preferably in the range $0.01 \leq V_s/V_h \leq 100$, more preferably in the range $0.1 \leq V_s/V_h \leq 10$. The detector may comprise a further coupling element, in particular a further in-coupling element, adapted to couple the light beam travelling from the object to the detector into the optical receiving fibers. The further coupling element may be arranged in direction of propagation of the light beam travelling from the object to the detector in front of the optical receiving fibers. The further coupling element may be or may comprise the at least one transfer device.

The measurement head may comprise at least one actuator configured to move the measurement head to scan a region of interest. As used herein, the term "move" refers to driving the measurement head and/or to causing the measurement head to oscillate. As used herein, the term "actuator" refers to an arbitrary device adapted to generate a force causing the measurement head to move. Specifically, the actuator may be attached and/or coupled and/or connected to the optical receiving fibers and may be adapted to generate a force causing the optical receiving fibers to move, in particular to oscillate. The actuator may be attached and/or coupled and/or connected to the optical sender fiber and may be adapted to generate a force causing the optical sender fiber to move. The actuator may be adapted to generate a force corresponding to a harmonic of a natural resonant frequency of the optical receiving fibers and/or the optical sender fiber. The actuator may comprise at least one electromechanical actuator and/or at least one piezo actuator. The piezo actuator may comprise at least one actuator selected from the group consisting of: at least one piezoceramic actuator; at least one piezoelectric actuator. The actuator may be configured to cause the measurement head, specifically the optical sender fiber and/or the optical receiving fibers to oscillate. The actuator may be adapted to move the measurement head in a linear scan and/or a radial scan and/or a spiral scan. For example, the actuator may be adapted to generate a force on the measurement head such that the measurement head moves upwards and downwards. For example, the actuator may be configured to generate a force on the measurement head such that the measurement head moves in an orbit with a predefined radius. The radius may be adjustable. For example, the actuator may be adapted to generate a force such that the measurement head moves in a spiral such as with a radius which alternately decreases or increases.

Specifically, the centroid of the exit pupil of the illumination channel and the centroid of the entrance faces of all receiving channels may be projected onto a plane orthogonal to the optical axis and comprising the centroid of the exit faces of all receiving channels, whereas the baseline may be a distance between the centroid of the exit pupil of the illumination channel projected into that plane and the centroid of the entrances faces of all receiving channels projected into that plane. The detector may comprise a baseline. In particular, the baseline may be a distance between at least one illumination channel and at least one receiver channel of the detector. The exit pupil of the illumination source may be displaced from the optical axis in a first direction by the distance BL. The optical receiving fibers, specifically a centroid of the entrance faces of the optical receiving fibers, may be displaced from the optical axis in a second direction, in particular different to the first direction, by a distance $d_R$. Specifically, the baseline may be a distance, for example in a xy-plane, between at least one illumination channel and at least one receiver channel. As used herein, the term "illumination channel" refers to at least one optical channel comprising at least one illumination source such as the optical sender fiber adapted to generate at least one illumination light beam for illuminating the at least one object. The illumination channel may comprise at least one transmitter-optics such as at least one illumination source and at least one lens element. The illumination source may comprise the at least one entrance face. As used herein, the term "entrance face" of the illumination source refers to an end or a surface of the end an optical sender fiber of the illumination source which is adapted to receive the light beam generated by the light source. The illumination source may comprise the at least one exit face. The term "exit face" of the illumination source refers to an end or a surface of the end of the optical sender fiber which emits the light beam for illuminating the object. In case the illumination source comprises one optical sender fiber, the term illumination channel refers to a center such as the geometrical center of the exit face or of the exit pupil of the optical sender fiber. In case the illumination source comprises more than one optical sender fiber the term illumination channel refers to a centroid of the surfaces of the exit faces or of the exit pupil of the optical sender fibers. As outlined above, the exit pupil of the illumination source is displaced from the optical axis by a distance BL. The first optical receiving fiber has a core diameter of $d_1$. The second optical receiving fiber has a core diameter of $d_2$. A ratio $d_1/BL$ is in the range $0.000047 \leq d_1/BL \leq 313$ and/or a ratio $d_2/BL$ is in the range $0.000047 \leq d_2/BL \leq 313$. Preferably the ratio $d_1/BL$ is in the range $0.000114 \leq d_1/BL \leq 30.37$, more preferably in the range $0.000318 \leq d_1/BL \leq 6.83$, and/or wherein the ratio $d_2/BL$ is in the range $0.000114 \leq d_2/BL \leq 30.37$, more preferably in the range $0.000318 \leq d_2/BL \leq 6.83$. The displacement of the illumination source from the optical axis may have an extent greater than 0. The displacement of the illumination source from the optical axis may be in the range 10 μm≤BL≤127000 μm, preferably in the range 100 μm≤BL≤76200 μm, more preferably in the range 500 μm≤BL≤25400 μm. For example, the ratio of $d_1/BL$ may be $0.000047 \leq d_1/BL \leq 1$ and/or a ratio of $d_2/BL$ may be $0.000047 \leq d_2/BL \leq 1$. For example, core diameters may range from 1 μm to 5 mm such that a minimal baseline may be 1 μm. A maximum baseline may be defined as 2 m. By adequately setting the ratio of the displacement (BL) and the receiving fiber core diameters ($d_1$ and $d_2$) the measurement range and the resolution can be adjusted depending on the measurement application. In this example, a ratio of $d_1/BL$ may be $0.0000005 \leq d_1/BL \leq 1$ and/or a ratio of $d_2/BL$ may be $0.0000005 \leq d_2/BL \leq 1$. Preferably, the ratio $d_1/BL$ may be $0.000114 \leq d_1/BL \leq 0.8$, more preferably the ratio $d_1/BL$ may be $0.000318 \leq d_1/BL \leq 0.5$. Preferably, the ratio $d_2/BL$ may be $0.000114 \leq d_2/BL \leq 0.8$, more preferably $0.000318 \leq d_2/BL \leq 0.5$. For example, the ratio of $d_1/BL$ may be $0.0000005 \leq d_1/BL \leq 0.000047$ and/or a ratio of $d_2/BL$ may be $0.0000005 \leq d_2/BL \leq 0.000047$. A displacement of the exit pupil of the illumination source from the optical axis may allow increasing the measurement range and enhancing resolution. As used herein, the term "receiver channel" refers to at least one optical channel comprising at least one of the optical receiving fibers adapted to receive the light beam propagating from the object to the detector. The receiver channel may comprise at least one receiver-optics such as the at least one transfer device. Each of the optical receiving fibers may comprise the at least one entrance face. As used herein, the term "entrance face" of the optical receiving fibers refers to at least one end of the respective optical receiving fiber which is configured to receive the light beam propagating from the object to the detector. The term "exit face" of the optical receiving fiber refers to at least one end of the respective optical receiving fiber from which the light beam propagating through the optical fiber receiving leaves the optical receiving fiber to impinge on the respective optical sensor. The term receiver channel refers to a centroid of the surfaces of the entrance faces of the optical receiving fibers. Each of the first and the second optical receiving fibers may comprise the at least one entrance face configured to receive the light beam propagating from the object to the detector having passed through the transfer device. A centroid of the entrance faces of the first and second optical receiving fibers may be displaced from the optical axis by the distance $d_R$. The distance $d_R$ may be in the range from 10 μm to 127000 μm, preferably from 100 μm to 76200 μm, more preferably from 500 μm to 25400 μm. Thus, the illumination source and/or the exit face of the optical sender fiber and the entrance face of one or both of the optical receiving fibers may be arranged with a relative spatial offset from the optical axis of the transfer device. In particular, the illumination source and/or the exit face of the optical sender fiber and the entrance face of one or both of the optical receiving fibers may be arranged with different spatial offsets from the optical axis. Such an arrangement may allow enhancing the tendency of the combined signal Q, and thus, accuracy of the distance measurement. In particular, with increasing spatial offset a slope in a Q vs distance diagram increases and thus allows distinguishing similar distances more accurately. For example, one of the illumination source and the entrance face of one or both of the optical receiving fibers may be arranged on the optical axis and the other one may be arranged spaced apart from the optical axis. For example, both of illumination source and the entrance face of one or both of the optical receiving fibers may be arranged spaced apart from the optical axis by at least one different distance, in particular perpendicular to the optical axis. For example, the at least two optical receiving fibers may be arranged at different distances from the optical axis. The optical receiving fibers may be adapted to mimic a larger distance compared to the real distance perpendicular to an optical axis between the illumination source and the optical sensors without moving the illumination source and/or optical sensors.

The baseline, also denoted as basis line, may be a distance, for example in a xy-plane, between at least one transmitter-optics and at least one receiver-optics. For example, the baseline may be a distance between the optical axis and the illumination source, in particular a distance between the optical axis and a z-component of the illumination light beam. The detector may comprise additional optical elements, for example, at least one mirror, which may additionally enhance distance to the illumination source. For example, the baseline may be a distance between a transmitter-lens and a receiver-lens. The transmitter-lens may be arranged behind the optical sender fiber in direction of propagation of the illumination light beam. The receiver-lens may be arranged in front of the optical receiving fibers in a direction of propagation of the light beam propagating from the object to the optical receiving fibers. The transfer device may comprise the receiver-lens. Specifically, the baseline may be a distance between the position where the light beam propagating from the object to the detector impinges on the optical receiving fibers, in particular the respective entrance faces, and the illumination source and/or at least one exit face of at least one optical sender fiber.

Centroids of entrance faces of the optical receiving fibers and/or of the exit end of the optical sender fiber may be arranged within one plane orthogonal to the optical axis. Centroids of entrance faces of the optical receiving fibers and/or of the exit end of the optical sender fiber may be arranged within one plane parallel and comprising the optical axis. Centroids of the entrance faces of the optical receiving fibers and/or of the exit end of the optical sender fiber may be arranged at an intersection of a plane orthogonal to the optical axis and a plane parallel and comprising the optical axis. The centers of the exit end of the optical sender fiber and the entrance ends of the optical receiving fibers may be arranged at the intersection of a first plane which is the plane of the entrance faces of the optical receiving fibers and the exit end of the sender fiber with a second plane that is orthogonal to the first plane and comprises the line connecting the centers of the exit end of the optical sender fiber and the entrance ends of the optical receiving fibers.

The first optical receiving fiber may be arranged and configured to provide light to a first optical sensor and the second optical receiving fiber may be arranged and configured to provide light to a second optical sensor. Each of the optical receiving fibers may comprise an exit end and an entrance end. For example, the optical fibers may comprise at least two optical receiving fibers each having at least one entrance face, wherein the entrance faces may be arranged concentric or on top of each other or parallel to each other or side by side.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "at least two optical sensors each having at least one light sensitive area" refers to configurations with two single optical sensors each having one light-sensitive area and to configurations with one combined optical sensor having at least two light-sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available photo-sensors, such as commercially available silicon photodiodes, each having precisely one sensitive area, may be used in the set-up. Other embodiments, however, are feasible. Thus, as an example, an optical device comprising two, three, four or more than four light-sensitive areas may be used which is regarded as two, three, four or more than four optical sensors in the context of the present invention. As an example, the optical device may comprise a matrix of light-sensitive areas. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

Each of the optical receiving fibers may be configured to emit the at least one light beam such that the light beam impinges on the light-sensitive areas. For example, in case at least one of the light-sensitive areas is oriented under the arbitrary angle with respect to the optical axis, the optical receiving fibers may be adapted to guide the light beam onto the light-sensitive area.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

At least one optical sensor may be arranged at the exit ends of each optical receiving fiber. Alternatively, at least two or more of the optical receiving fibers may use the same optical sensor. The optical sensors at the end of the optical receiving fibers may be arranged as such that at least 80%, preferably at least 90%, more preferably at least 99% of the luminance power of the light beams exiting the optical receiving fiber towards the optical sensors impinge on at least one optical sensor. A position relative to the transfer device where the light beam travelling from the object to the detector impinges on the optical fibers may be optimized to obtain a combined signal Q with a high dynamic range.

The optical sensors and/or the entrance face of at least one of the optical receiving fibers may be positioned off focus. As used herein, the term "focus" generally refers to one or both of a minimum extent of a circle of confusion of the light beam, in particular of at least one light beam emitted from one point of the object, caused by the transfer device or a focal length of the transfer device. As used herein, the term "circle of confusion" refers to a light spot caused by a cone of light rays of the light beam focused by the transfer device. The circle of confusion may depend on a focal length f of the transfer device, a longitudinal distance from the object to the transfer device, a diameter of an exit pupil of the transfer device, a longitudinal distance from the transfer device to the light-sensitive area, a distance from the transfer device to an image of the object. For example, for Gaussian beams, a diameter of the circle of confusion may be a width of the Gaussian beam. In particular, for a point like object situated or placed at infinite distance from the detector the transfer device may be adapted to focus the light beam from the object into a focus point at the focal length of the transfer device. For non-point like objects situated or placed at infinite distance from the detector the transfer device may be adapted to focus the light beam from at least one point of the object into a focus plane at the focal length of the transfer device. For point like objects not situated or placed at infinite distance from the measurement head, the circle of confusion may have a minimum extent at least at one longitudinal coordinate. For non-point like objects not situated or placed at infinite distance from the measurement head, the circle of confusion of the light beam from at least one point of the object may have a minimum extent at least at one longitudinal coordinate. As used herein, the term "positioned off focus" generally refers to a position other than the minimum extent of a circle of confusion of the light beam caused by the transfer device or a focal length of the transfer device. In particular, the focal point or minimum extent of the circle of confusion may be at a longitudinal coordinate $l_{focus}$, whereas the position of each of the optical sensors and/or the entrance face of at least one of the optical fibers may have a longitudinal coordinate $l_{sensor}$ different from $I_{focus}$. For example, the longitudinal coordinate $I_{sensor}$ may be, in a longitudinal direction, arranged closer to the position of the transfer device than the longitudinal coordinate $I_{focus}$ or may be arranged further away from the position of the transfer device than the longitudinal coordinate $I_{focus}$. Thus, the longitudinal coordinate $I_{sensor}$ and the longitudinal coordinate $I_{focus}$ may be situated at different distances from the transfer device. For example, the optical sensors and/or the entrance face of at least one of the optical receiving fibers may be spaced apart from the minimum extent of the circle of confusion in longitudinal direction by ±2% of focal length, preferably by ±10% of focal length, most preferably ±20% of focal length. For example, at a focal length of the transfer device may be 20 mm and the longitudinal coordinate $I_{sensor}$ may be 19.5 mm, i.e. the sensors and/or the entrance face of at least one of the optical receiving fibers may be positioned at 97.5% focal length, such that $I_{sensor}$ is spaced apart from the focus by 2.5% of focal length.

For example, the entrance face of at least one of the optical receiving fibers may be arranged such that the variance over distance dependence of the combined signal is maximal, which is equivalent to a maximum dynamic range in the combined signal Q. Without wishing to be bound by this theory, a practical approximation for maximizing the dynamic range is to maximize a circle of confusion variance over distance dependence. The quotient of circle of confusion radii at small and large object distances is a practical approximation to the quotient of combined signals at small and large object distances. In particular, the entrance face of at least one of the optical receiving fibers may be positioned as such that a combined signal $Q_{far}$ at large object distances and a combined signal $Q_{close}$ at small object distances have a maximum variation $$\frac{Q_{far}}{Q_{close}} \approx \frac{r_{CoC}^{Object,close}(z_O, z_s, z_i)^2}{r_{CoC}^{Object,far}(z_O, z_s, z_i)^2} \to \max,$$

wherein $r_{CoC}^{Object,close}$ is a radius of the circle of confusion at small object distances and $r_{CoC}^{Ojbect,far}$ is a radius of the circle of confusion at large object distances, wherein $z_O$ is a detectable distance range between the entrance face of at least one of the optical receiving fibers and the object, $z_s$ is a distance between the transfer device and the entrance face of at least one of the optical receiving fibers and $z_i$ is a position of the focused image behind the transfer device, which depends on the position of the object $z_o$ The optimal position of the optical receiving fibers, specifically the position of the end of the optical receiving fiber where the light beam travelling from the object to the measurement head impinges on the optical receiving fiber, may be adjusted using the following steps: i) positioning the entrance face of at least one of the optical receiving fibers at a focal point of farthest object distance; ii) moving the optical sensors and/or the entrance face of at least one of the optical receiving fibers out of the focal point, in particular along or against the optical axis, such that a distance Δ from the focal point gives the best circle of confusion variation and the largest range, wherein $$\Delta = \frac{z_i^2(z_O^{far})}{z_O^{far} f} O_{size} F_\#,$$

wherein $O_{size}$ is the spot size on the entrance face of at least one of the optical receiving fibers, f is the focal length of the transfer device, $F_\#$ is the F number of the transfer device, $z_O^{far}$ is the farthest object distance.

As outlined above, the detector comprises at least two optical receiving fibers, wherein a first optical receiving fiber is adapted to provide at least one part of the light beam propagating from the object to the detector to a first optical sensor and wherein a second optical receiving fiber is adapted to provide at least one part of the light beam propagating from the object to the detector to a second optical sensor. The detector may comprise a plurality of optical receiving fibers, wherein each of the optical receiving fibers is adapted to provide at least one part of the light beam propagating from the object to the detector to one of the optical sensors. Each geometrical center of the respective entrance face of the optical receiving fibers may be arranged at a longitudinal coordinate $I_{center,i}$, wherein i denotes the number of the respective optical receiving fiber. The detector may comprise precisely two optical sensors and/or precisely two optical receiving fibers, each comprising an entrance face. The detector may comprise more than two optical sensors and/or more than two optical receiving fibers. The first optical receiving fibers may comprise at least one first entrance face and the second optical receiving fiber may comprise at least one second entrance face. The first entrance face, in particular the geometrical center, may be arranged at a first longitudinal coordinate $I_{center,1}$, and the second entrance face, in particular the geometrical center, may be arranged at a second longitudinal coordinate $I_{center,2}$, wherein the first longitudinal coordinate and the second longitudinal coordinate differ. For example, the first entrance end and the second entrance end may be located in different planes which are offset in a direction of the optical axis. The first entrance end may be arranged in front of the second entrance end. A relative distance of the first entrance end and the second entrance end may depend, for example, on focal length or object distance. The longitudinal coordinates of the entrance faces of the optical receiving fibers may also be identical. Specifically, the longitudinal coordinates of the entrance faces of the optical receiving fibers may be identical, but the entrance faces of the optical receiving fibers may be spaced apart from the optical axis by a different spatial offset. The first optical receiving fiber and the second optical receiving fiber may be arranged having a common central axis. The first optical receiving fiber and the second optical receiving fiber may be arranged concentric. The first optical receiving fiber may surround the second optical receiving fiber. For example, the first entrance face and the second entrance face may have a circular shape, wherein the first entrance face may be a circle with a first radius and the second entrance face may be circle with a second radius different from the first radius. Additionally or alternatively, the first entrance face may be spaced apart from the second entrance face. The first entrance face may be arranged in front of the second entrance face and may be spaced apart from the second entrance face by no more than 50 mm, preferably by no more than 15 mm. The relative distance of the first optical sensor and second optical sensor may depend, for example, on focal length or object distance.

Each geometrical center of each entrance face of the optical receiving fibers may be spaced apart from the optical axis of the transfer device, such as the optical axis of the beam path or the respective beam path in which the respective entrance face of the optical receiving fibers is located. In the case of the detector comprising precisely two optical receiving fibers each comprising one entrance face and in the case of the measurement head comprising more than two optical receiving fibers, the first entrance face being spaced apart from the optical axis by a first spatial offset and the second entrance face being spaced apart from the optical axis by a second spatial offset, wherein the first spatial offset and the second spatial offset may differ. The first and second spatial offsets, as an example, may differ by at least a factor of 1.2, more preferably by at least a factor of 1.5, more preferably by at least a factor of 2. The spatial offsets may also be zero or may assume negative values if the longitudinal coordinates and/or a cross-section of the entrance faces of the optical receiving fibers may differ.

The first optical receiving fiber may have a first cross section and the second optical receiving fiber may have a second cross section. The term "cross section" refers to an area perpendicular to a direction of extension of the optical receiving fiber. In the case of the detector comprising more than two optical receiving fibers, a first group of optical receiving fibers or at least one of the optical receiving fibers may form a first cross section, wherein a second group of optical receiving fibers or at least one other optical receiving fiber may form a second cross section. The first cross section and the second cross section may differ. In particular, the first cross section and the second cross section are not congruent. Thus, the cross section of the first optical receiving fiber and the second optical receiving fiber may differ in one or more of the shape or content. For example, the first cross section may be smaller than the second cross section. As an example, both the first cross section and the second cross section may have the shape of a circle. The radius of a first circle of the first entrance face may be smaller than the corresponding radius of a second circle of the second entrance face. Specifically, a diameter of the first cross section may be smaller than a diameter of the second cross section. Again, alternatively, as an example, the first cross section may have a first equivalent diameter, and the second cross section may have a second equivalent diameter, wherein the first equivalent diameter is smaller than the second equivalent diameter. The cross sections may be congruent, if the spatial offsets and/or the longitudinal coordinates of the entrance faces of the optical receiving fibers differ.

The evaluation device is configured for determining at least one longitudinal coordinate z of the object by evaluating a combined signal Q of the sensor signals. As generally used herein, the term "combine" generally may refer to an arbitrary operation in which two or more components such as signals are one or more of mathematically merged in order to form at least one merged combined signal and/or compared in order to form at least one comparison signal or comparison result. As used herein, the term "combined signal Q" refers to a signal which is generated by combining the sensor signals, in particular by one or more of dividing the sensor signals, dividing multiples of the sensor signals or dividing linear combinations of the sensor signals. In particular, the combined signal may be a quotient signal. The combined signal Q may be determined by using various means. As an example, a software means for deriving the combined signal, a hardware means for deriving the combined signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider.

The evaluation device may be configured for deriving the combined signal Q by one or more of dividing the sensor signals, dividing multiples of the sensor signals, dividing linear combinations of the sensor signals. The evaluation device may be configured for using at least one predetermined relationship between the combined signal Q and the longitudinal coordinate for determining the longitudinal coordinate. For example, the evaluation device is configured for deriving the combined signal Q by $$Q(z_O) = \frac{\iint_{A_1} E(x, y; z_O) dx dy}{\iint_{A_2} E(x, y; z_O) dx dy}$$

wherein x and y are transversal coordinates, A1 and A2 are areas of the beam profile of the light beam having passed through the optical fibers at the sensor position, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_o)$ and beam shape $S(x,y;z_o)$, $E(x, y; zo)=L·S$. Thus, by deriving the combined signal it may allow determining the longitudinal coordinate independent from luminance. In addition, using the combined signal allows determination of the distance $z_0$ independent from the object size. Thus, the combined signal allows determination of the distance $z_0$ independent from the material properties and/or reflective properties and/or scattering properties of the object and independent from alterations of the light source such as by manufacturing precision, heat, water, dirt, damages on the lens, or the like.

Each of the sensor signals may comprise at least one information of at least one area of the beam profile of the light beam having passed through the optical receiving fibers. As used herein, the term "area of the beam profile" generally refers to an arbitrary region of the beam profile at the sensor position used for determining the combined signal Q. The light-sensitive areas and/or the entrance faces of the optical receiving fibers may be arranged such that a first sensor signal comprises information of a first area of the beam profile and a second sensor signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

In an embodiment of the present invention, the detector may comprise:
   at least one first optical sensor having a first light-sensitive area, wherein the first optical sensor may be configured to generate at least one first sensor signal in response to an illumination of the first light-sensitive area by the light beam having passed through one of the optical receiving fibers;
   at least one second optical sensor having a second light-sensitive area, wherein the second optical sensor may be configured to generate at least one second sensor signal in response to an illumination of the second light-sensitive area by the light beam having passed through the other one of the optical receiving fibers.

The evaluation device may be configured for determining at least one longitudinal coordinate z of the object by evaluating the first and second sensor signals.

The entrance face of the optical receiving fibers may be identical in size and/or shape or may differ. For example, the first entrance face of a first optical receiving fiber may be smaller than the second entrance face of a second optical receiving fiber. The first entrance face may be smaller than the second light-sensitive area. As used therein, the term "is smaller than" refers to the fact that the surface area of the first entrance face is smaller than the surface area of the second entrance face, such as by at least a factor of 0.9, e.g. at least a factor of 0.7 or even by at least a factor of 0.5. As an example, both the first entrance face and the second entrance face may have the shape of a square or of a rectangle, wherein side lengths of the square or rectangle of the first entrance face are smaller than corresponding side lengths of the square or rectangle of the second entrance face. Alternatively, as an example, both the first entrance face and the second entrance face may have the shape of a circle, wherein a diameter of the first entrance face is smaller than a diameter of the second entrance face. Again, alternatively, as an example, the first entrance face may have a first equivalent diameter, and the second entrance face may have a second equivalent diameter, wherein the first equivalent diameter is smaller than the second equivalent diameter. The second entrance face may be larger than the first entrance face. Thus, as an example, the second entrance face may be larger by at least a factor of two, more preferably by at least a factor of three and most preferably by at least a factor of five than the first entrance face. The first entrance face specifically may be a small entrance face, such that, preferably, the light beam fully illuminates this entrance face. Thus, as an example which may be applicable to typical optical configurations, the first entrance face may have a surface area of 1 $mm^2$ to 150 $mm^2$, more preferably a surface area of 10 $mm^2$ to 100 $mm^2$. The entrance face specifically may be a large area. Thus, preferably, within a measurement range of the detector, light spots may fully be located within the second entrance face, such that the light spot is fully located within the borders of the second entrance face. As an example, which is applicable e.g. in typical optical setups, the second entrance face may have a surface area of 160 $mm^2$ to 1000 $mm^2$, more preferably a surface area of 200 $mm^2$ to 600 $mm^2$.

The first entrance face specifically may overlap with the second entrance face in a direction of propagation of the light beam. The light beam may illuminate both the first entrance face and, fully or partially, the second entrance face. Thus, as an example, as seen from an object located on an optical axis of the detector, the first entrance face may be located in front of the second entrance face, such that the first entrance face, as seen from the object, is fully located within the second entrance face. When the light beam from this object propagates towards the first and second entrance faces, the light beam may fully illuminate the first entrance face and may create a light spot on the second entrance face, wherein a shadow created by the first entrance face is located within the light spot. It shall be noted, however, that other embodiments are feasible.

The first and second entrance face specifically may be arranged linearly in one and the same beam path of the detector. As used herein, the term "linearly" generally refers to that the entrance face are arranged along one axis. Thus, as an example, the first and second entrance face both may be located on an optical axis of the detector. Specifically, the first and second entrance face may be arranged concentrically with respect to an optical axis of the detector.

The first entrance face may be arranged in front of the second entrance face. Thus, as an example, the first entrance face may simply be placed on the surface of the second entrance face. Additionally or alternatively, the first entrance face may be spaced apart from the second entrance face by no more than five times the square root of a surface area of the first entrance face. Additionally or alternatively, the first entrance face may be arranged in front of the second entrance face and may be spaced apart from the second entrance face by no more than 50 mm, preferably by no more than 15 mm.

In one example, the detector comprises
the first optical receiving fiber having a first cross section, wherein the first optical receiving fiber may be configured to provide at least one part of the light beam propagating from the object to the detector to at least one optical sensor of the optical sensors;
the second optical receiving fiber having a second cross section, wherein the second optical receiving fiber may be configured to provide at least one part of the light beam propagating from the object to the detector to at least one other optical sensor of the optical sensors.

The first cross section may be smaller than the second cross section.

The light beam propagating from the object to the detector specifically may fully illuminate the first cross section and/or the second cross section, such that the first cross section and/or the second cross section are fully located within the light beam, e.g. with a width of the light beam being larger than the first cross section of the first optical receiving fiber and/or the second cross section of the second optical receiving fiber. Contrarily, preferably, the light beam propagating from the object to the detector specifically may partially illuminate the first cross section and/or the second cross section. At least one or more appropriate lenses or elements having a focusing or defocusing effect on the light beam may be arranged in front of the entrance faces of the optical receiving fibers in direction of propagation of the light beam propagating from the object to the detector, for example an appropriate transfer device.

As outlined above, the first cross section may be smaller than the second cross section. As used therein, the term "is smaller than" refers to the fact that the first cross section is smaller than the second cross section, such as by at least a factor of 0.9, e.g. at least a factor of 0.7 or even by at least a factor of 0.5. As an example, both the first cross section and the second cross section may have the shape of a circle, wherein a diameter of the first cross section is smaller than a diameter of the second cross section. As outlined above, the second cross section may be larger than the first cross section. Thus, as an example, the second cross section may be larger by at least a factor of two, more preferably by at least a factor of three and most preferably by at least a factor of five than the first cross section.

The first cross section specifically may overlap with the second cross section in a direction of propagation of the light beam propagating from the object to the detector. The light beam propagating from the object to the detector may illuminate both the first cross section and, fully or partially, the second cross section. Thus, as an example, as seen from an object located on an optical axis of the detector, the first cross section may be located in a center of the second cross section such that the first cross section and the second cross section are concentric. It shall be noted, however, that other embodiments are feasible.

The entrance faces of the first and second optical receiving fibers specifically may be arranged at the same longitudinal coordinate or may be arranged at different longitudinal coordinates. Thus, as an example, the first and second entrance faces both may be located on an optical axis of the detector. Specifically, the first and second entrance faces may be arranged concentrically with respect to an optical axis of the detector. For example, the first entrance face may be arranged in front of the second entrance face. For example, the first entrance face may be spaced apart from the second entrance face by no more than five times the square root of a cross section of the first entrance face. Additionally or alternatively, the first entrance face may be arranged in front of the second entrance face and may be spaced apart from the second entrance face by no more than 50 mm, preferably by no more than 15 mm.

Alternatively to the linear arrangement of the two optical sensors, the optical sensors may be arranged in different beam paths of the detector. The optical receiving fibers may be adapted to generate the first light beam and the second light beam. The first light beam and the second light beam may be generated with different degree of transmission. The first optical sensor may be configured to generate the first sensor signal in response to the illumination of the first light-sensitive area by the first light beam. The second optical sensor may be configured to generate the second sensor signal in response to the illumination of the second light-sensitive area by the second light beam. For example, as outlined above, the optical receiving fibers may comprise at least one multifurcated optical fiber which may be arranged such that the incident light beam may impinge at the first angle of incidence into the first optical receiving fiber and at the second angle of incidence, different from the first angle, into the second optical receiving fiber, such that the degree of transmission is different for the first light beam, in this case a first transmission light beam, and the second light beam, in this case a second transmission light beam. One of the first and second optical sensors may be arranged at the exit end of the first optical receiving fiber and the other optical sensor may be arranged at the exit end of the second optical receiving fiber.

The evaluation device specifically may be configured for deriving the combined signal Q by dividing the first and second sensor signals, by dividing multiples of the first and second sensor signals or by dividing linear combinations of the first and second sensor signals. As an example, Q may simply be determined as $Q=s_1/s_2$ or $Q=s_2/s_1$, with $s_1$ denoting the first sensor signal and $s_2$ denoting the second sensor signal. Additionally or alternatively, Q may be determined as $Q = a \cdot s_1 / b \cdot s_2$ or $Q = b \cdot s_2 / a \cdot s_1$, with a and b being real numbers which, as an example, may be predetermined or determinable. Additionally or alternatively, Q may be determined as $Q = (a \cdot s_1 + b \cdot s_2) / (c \cdot s_1 + d \cdot s_2)$, with a, b, c and d being real numbers which, as an example, may be predetermined or determinable. As a simple example for the latter, Q may be determined as $Q = s_1 / (s_1 + s_2)$. Other combined or quotient signals are feasible.

Typically, in the setup described above, Q is a monotonous function of the longitudinal coordinate of the object and/or of the size of the light spot such as the diameter or equivalent diameter of the light spot. Thus, as an example, specifically in case linear optical sensors are used, the quotient $Q = s_1 / s_2$ is a monotonously decreasing function of the size of the light spot. Without wishing to be bound by this theory, it is believed that this is due to the fact that, in the setup described above, both the first signal $s_1$ and the second signal $s_2$ decrease as a square function with increasing distance to the light source, since the amount of light reaching the detector decreases. Therein, however, the first signal $s_1$ decreases more rapidly than the second signal $s_2$, since, in the optical setup as used in the experiments, the light spot in the image plane grows and, thus, is spread over a larger area. The quotient of the first and second sensor signals, thus, continuously decreases with increasing diameter of the light beam or diameter of the light spot on the first and second light-sensitive areas. The quotient, further, is mainly independent from the total power of the light beam, since the total power of the light beam forms a factor both in the first sensor signal and in the second sensor signal. Consequently, the quotient Q may form a secondary signal which provides a unique and unambiguous relationship between the first and second sensor signals and the size or diameter of the light beam. Since, on the other hand, the size or diameter of the light beam is dependent on a distance between the object, from which the incident light beam propagates towards the detector, and the detector itself, i.e. dependent on the longitudinal coordinate of the object, a unique and unambiguous relationship between the first and second sensor signals and the longitudinal coordinate may exist. For the latter, reference e.g. may be made to WO 2014/097181 A1. The predetermined relationship may be determined by analytical considerations, such as by assuming a linear combination of Gaussian light beams, by empirical measurements, such as measurements measuring the first and second sensor signals or a secondary signal derived thereof as a function of the longitudinal coordinate of the object, or both.

The first and second optical sensors each specifically may be semiconductor sensors, preferably inorganic semiconductor sensors, more preferably photodiodes and most preferably silicon photodiodes. Thus, the present invention simply may be realized by using commercially available inorganic photodiodes, i.e. one small photodiode and one large area photodiode. Thus, the setup of the present invention may be realized in a cheap and inexpensive fashion.

Specifically, the first and second optical sensors, each independently, may be or may comprise inorganic photodiodes which are sensitive in the infrared spectral range, preferably in the range of 780 nm to 3.0 micrometers, and/or sensitive in the visible spectral range, preferably in the range of 380 nm to 780 nm. Specifically, the first and second optical sensors may be sensitive in the part of the near infrared region where silicon photodiodes are applicable specifically in the range of 700 nm to 1000 nm. Infrared optical sensors which may be used for the first optical sensor, for the second optical sensor or for both the first and second optical sensors may be commercially available infrared optical sensors, such as infrared optical sensors commercially available available under the brand name Hertzstueck™ from trinamiX GmbH, D-67056 Ludwigshafen am Rhein, Germany. Thus, as an example, the first optical sensor, the second optical sensor or both the first and the second optical sensor may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the first optical sensor, the second optical sensor or both the first and the second optical sensor may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the first optical sensor, the second optical sensor or both the first and the second optical sensor may comprise at least one bolometer, preferably a bolometer selected from the group consisting of a VO bolometer and an amorphous Si bolometer.

The first and second optical sensors each specifically may be uniform sensors having a single light-sensitive area each. Thus, the first and second optical sensors specifically may be non-pixelated optical sensors.

As outlined above, by evaluating the first and second sensor signals, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more additional transversal sensors may be used for determining at least one transversal coordinate of the object. Various transversal sensors are generally known in the art, such as the transversal sensors disclosed in WO 2014/097181 A1 and/or other position-sensitive devices (PSDs), such as quadrant diodes, CCD or CMOS chips or the like. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. By scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object.

The optical sensors may be partial diodes of a bi-cell or quadrant diode and/or comprise at least one CMOS sensor.

For example, the optical sensors may comprise a CMOS sensor. The evaluation device may be adapted to divide the sensor region of the CMOS sensor into at least two sub-regions. Specifically, the evaluation device may be adapted to divide the sensor region of the CMOS sensor into at least one left part and at least one right part and/or at least one upper part and at least one lower part and/or at least one inner and at least one outer part. The evaluation device may be configured for determining the at least one longitudinal coordinate z of the object by evaluating the combined signal Q from the sensor signals of the at least two sub-regions. Using at least one CMOS sensor may allow movement of the illumination source for illuminating the object. In particular independent movement of at least one optical sender fiber and the optical receiving fibers may be possible. In case of using optical sensors arranged as partial diodes of a bi-cell or quadrant diode, the optical receiving fibers and the optical sender fiber may be interconnected, in particular fixedly. Additionally or alternatively to an illumination using the optical sender fiber, the object may be illuminated by a light beam generated from an arbitrary illumination source. In particular, the illumination of the object may be performed independently from the optical fiber.

For example, the detector may comprise at least one sensor element having a matrix of optical sensors, the optical sensors each having a light-sensitive area, wherein each optical sensor may be configured to generate at least one sensor signal in response to an illumination of the light-sensitive area by the light beam having passed through one or more optical fibers. The detector may comprise two sensor elements, in particular at least one first sensor element and at least one second sensor element, arranged in different beam paths of the detector. One of the first and second sensors elements may be arranged at the exit end of the first optical receiving fiber and the other sensor element may be arranged at the exit end of the second optical receiving fiber.

The evaluation device may be configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that the light beam having passed through the optical receiving fibers may generate a light spot on the common plane.

As explained in more detail in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the detector. Without wishing to be bound by this theory, the light spot may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the detector. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the object may be generated. The comparing of the center signal and the sum signal, as an example, may be done by forming the combined signal Q out of the center signal and the sum signal and by using a predetermined or determinable relationship between the longitudinal coordinate and the combined signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the object. By using a matrix of optical sensors, the detector according to the present invention may adapt to these changes in conditions and, thus, may determine the center of the light spot simply by comparing the sensor signals. Consequently, the detector according to the present invention may, by itself, choose the center signal and determine the sum signal and, from these two signals, derive a combined signal which contains information on the longitudinal coordinate of the object. By evaluating the combined signal, the longitudinal coordinate of the object may, thus, be determined. The use of the matrix of optical sensors, thus, provides a significant flexibility in terms of the position of the object, specifically in terms of a transversal position of the object.

The transversal position of the light spot on the matrix of optical sensors, such as the transversal position of the at least one optical sensor generating the sensor signal, may even be used as an additional item of information, from which at least one item of information on a transversal position of the object may be derived, as e.g. disclosed in WO 2014/198629 A1. Additionally or alternatively, the detector according to the present invention may contain at least one additional transversal detector for, in addition to the at least one longitudinal coordinate, detecting at least one transversal coordinate of the object.

Consequently, in accordance with the present invention, the term "center signal" generally refers to the at least one sensor signal comprising essentially center information of the beam profile. As used herein, the term "highest sensor signal" refers to one or both of a local maximum or a maximum in a region of interest. For example, the center signal may be the signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be adapted to determine the center signal by integration of the plurality of sensor signals, for example the plurality of optical sensors around the optical sensor having the highest sensor signal. For example, the beam profile may be a trapezoid beam profile and the evaluation device may be adapted to determine an integral of the trapezoid, in particular of a plateau of the trapezoid.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized for example by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

Similarly, the term "combined signal", as further used herein, generally refers to a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The light beam may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the light beam may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below. As further used herein, a "light spot" generally refers to a visible or detectable round or non-round illumination of an article, an area or object by a light beam.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

As outlined above, raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more quotient signals. Thus, generally, the combined signal may be a quotient signal, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals. The evaluation device may further be configured for determining the at least one longitudinal coordinate by evaluating the at least one quotient signal.

The evaluation device specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the quotient Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. to WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

Thus, generally, the evaluation device may be configured for determining the longitudinal coordinate by evaluating the combined signal Q such as the quotient signal. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of steps c) and d) being separate and independent steps and the option of steps c) and d) being fully or partially combined, shall be comprised by the present invention.

The evaluation device may be configured for using at least one predetermined relationship between the combined signal and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

As further outlined above, the matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multimega pixel range. Other embodiments, however, are feasible. Thus, as outlined above, in setups in which an axial rotational symmetry is to be expected, circular arrangements or concentric arrangements of the optical sensors of the matrix, which may also be referred to as pixels, may be preferred.

The illumination source may be adapted to generate and/or to project a cloud of points such that a plurality of illuminated regions is generated on the matrix of optical sensors, for example the CMOS detector. Additionally, disturbances may be present on the matrix of optical sensors such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or object recognition method.

As outlined above, by evaluating the center signal and the sum signal, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street: *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be adapted to combine the information of the longitudinal coordinate and the transversal coordinate and to determine a position of the object in space.

In an embodiment the detector may comprise at least two optical sensors, each optical sensor having a light-sensitive area, wherein each light-sensitive area has a geometrical center, wherein the geometrical centers of the optical sensors are spaced apart from an optical axis of the detector by different spatial offsets, wherein each optical sensor is configured to generate a sensor signal in response to an illumination of its respective light-sensitive area by the light beam having passed through the optical fibers. The evaluation device may be configured for determining at least one longitudinal coordinate z of the object by combining the at least two sensor signals.

The light-sensitive areas of the optical sensors may overlap, as visible from the object, or may not overlap, i.e. may be placed next to each other without overlap. The light-sensitive areas may be spaced apart from each other or may directly be adjacent. The optical sensors may be located in one and the same beam path or partial beam path. Alternatively, however, the optical sensors may also be located in different partial beam paths. In case the optical sensors are distributed over different partial beam paths, the above-mentioned condition may be described such that at least one first optical sensor is located in at least one first partial beam path, being offset from the optical axis of the first partial beam path by a first spatial offset, and at least one second optical sensor is located in at least one second partial beam path, being offset from the optical axis of the second partial beam path by at least one second spatial offset, wherein the first spatial offset and the second spatial offset are different.

The detector may comprise more than two optical sensors. In any case, i.e. in the case of the detector comprising precisely two optical sensors and in the case of the detector comprising more than two optical sensors, the optical sensors may comprise at least one first optical sensor being spaced apart from the optical axis by a first spatial offset and at least one second optical sensor being spaced apart from the optical axis by a second spatial offset, wherein the first spatial offset and the second spatial offset differ. In case further optical sensors are provided, besides the first and second optical sensors, these additional optical sensors may also fulfill the condition or, alternatively, may be spaced apart from the optical axis by the first spatial offset, by the second spatial offset or by a different spatial offset. The first and second spatial offsets, as an example, may differ by at least a factor of 1.2, more preferably by at least a factor of 1.5, more preferably by at least a factor of 2. As outlined above, each light-sensitive area has a geometrical center. Each geometrical center of each light-sensitive area may be spaced apart from the optical axis of the detector, such as the optical axis of the beam path or the respective beam path in which the respective optical sensor is located. As outlined above, the optical sensors and/or the entrance faces of the optical receiving fibers specifically may be located in one and the same plane, which, preferably, is a plane perpendicular to the optical axis. Other configurations, however, are possible. Thus, two or more of the optical sensors and/or entrance faces of the optical receiving fibers may also be spaced apart in a direction parallel to the optical axis.

For example, the optical sensors may be partial diodes of a segmented diode, with a center of the segmented diode being off-centered from the optical axis of the detector. The optical sensors may be partial diodes of a bi-cell or quadrant diode and/or comprise at least one CMOS sensor. As used herein, the term "partial diode" may comprise several diodes that are connected in series or in parallel. This example is rather simple and cost-efficiently realizable. Thus, as an example, bi-cell diodes or quadrant diodes are widely commercially available at low cost, and driving schemes for these bi-cell diodes or quadrant diodes are generally known. As used herein, the term "bi-cell diode" generally refers to a diode having two partial diodes in one packaging. Bi-cell and quadrant diodes may have two or four separate light sensitive areas, in particular two or four active areas. As an example, the bi-cell diodes may each form independent diodes having the full functionality of a diode. As an example, each of the bi-cell diodes may have a square or rectangular shape, and the two diodes may be placed in one plane such that the two partial diodes, in total, form a 1×2 or 2×1 matrix having a rectangular shape. In the present invention, however, a new scheme for evaluating the sensor signals of the bi-cell diodes and quadrant diode is proposed, as will be outlined in further detail below. Generally, however, the optical sensors specifically may be partial diodes of a quadrant diode, with a center of the quadrant diode being off-centered from the optical axis of the detector. As used herein, the term "quadrant diode" generally refers to a diode having four partial diodes in one packaging. As an example, the four partial diodes may each form independent diodes having the full functionality of a diode. As an example, the four partial diodes may each have a square or rectangular shape, and the four partial diodes may be placed in one plane such that the four partial diodes, in total, form a 2×2 matrix having a rectangular or square shape. In a further example, the four partial diodes, in total, may form a 2×2 matrix having a circular or elliptical shape. The partial diodes, as an example, may be adjacent, with a minimum separation from one another.

In case a quadrant diode is used, having a 2×2 matrix of partial diodes, the center of the quadrant diode specifically may be off-centered or offset from the optical axis. Thus, as an example, the center of the quadrant diodes, which may be an intersection of the geometrical centers of the optical sensors of the quadrant diode, may be off-centered from the optical axis by at least 0.2 mm, more preferably by at least 0.5 mm, more preferably by at least 1.0 mm or even 2.0 mm. Similarly, when using other types of optical sensors setups having a plurality of optical sensors, an overall center of the optical sensors may be offset from the optical axis by the same distance.

Generally, the light-sensitive areas of the optical sensors may have an arbitrary surface area or size. Preferably, however, specifically in view of a simplified evaluation of the sensor signals, the light-sensitive areas of the optical sensors are substantially equal, such as within a tolerance of less than 10%, preferably less than 5% or even less than 1%. This, specifically, is the case in typical commercially available quadrant diodes.

In typical setups, commercially available quadrant diodes such as quadrant photodiodes are used for positioning, i.e. for adjusting and/or measuring a transversal coordinate of a light spot in the plane of the quadrant photodiode. Thus, as an example, laser beam positioning by using quadrant photodiodes is well known. According to a typical prejudice, however, quadrant photodiodes are used for xy-positioning, only. According to this assumption, quadrant photodiodes are not suitable for measuring distances. The above-mentioned findings, however, using an off-centered quadrant photodiode with regard to an optical axis of the detector, show otherwise, as will be shown in further measurements below. Thus, as indicated above, in quadrant photodiodes, the asymmetry of the spot can be measured by shifting the quadrant diode slightly off-axis, such as by the above-mentioned offset. Thereby, a monotonously z-dependent function may be generated, such as by forming the combined signal Q of two or more of the sensor signals of two or more partial photodiodes, i.e. quadrants, of the quadrant photodiode. Therein, in principle, only two photodiodes are necessary for the measurement. The other two diodes may be used for noise cancellation or to obtain a more precise measurement.

In addition or as an alternative to using a quadrant diode or quadrant photodiode, other types of optical sensors may be used. Thus, for example, staggered optical sensors may be used.

The use of quadrant diodes provides a large number of advantages over known optical detectors. Thus, quadrant diodes are used in a large number of applications in combination with LEDs or active targets and are widely commercially available at very low price, with various optical properties such as spectral sensitivities and in various sizes. No specific manufacturing process has to be established, since commercially available products may be implemented into the detector according to the present invention.

The distance measurement by using the detector according to the present invention may be enhanced by implementing one or more additional distance measurement means into the detector and/or by combining the detector with other types of distance measurement means. Thus, as an example, the detector may comprise or may be combined with at least one triangulation distance measurement device. Thus, the distance measurement can be enhanced by making use of a combination of the measurement principle discussed above and a triangulation type distance measurement.

Further, means for measuring one or more other coordinates, such as x- and/or y-coordinates, may be provided. In case a quadrant diode is used, the quadrant diode may also be used for additional purposes. Thus, the quadrant diode may also be used for conventional x-y-measurements of a light spot, as generally known in the art of optoelectronics and laser physics. Thus, as an example, the lens or detector position can be adjusted using the conventional xy-position information of the quadrant diode to optimize the position of the spot for the distance measurement. As a practical example, the light spot, initially, may be located right in the center of the quadrant diode, which typically does not allow for the above-mentioned distance measurement using the quotient function Q. Thus, firstly, conventional quadrant photodiode techniques may be used for off-centering a position of the light spot on the quadrant photodiode, such that, e.g., the spot position on the quadrant diode is optimal for the measurement. Thus, as an example, the different off-centering of the optical sensors of the detector may simply be a starting point for movement of the optical sensors relative to the optical axis such that the light spot is off-centered with respect to the optical axis and with respect to a geometrical center of the array of the optical sensors.

Thus, generally, the optical sensors of the detector may form a sensor array or may be part of a sensor array, such as the above-mentioned quadrant diode. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like. The case m=2, n=2 is the case of the quadrant diode or quadrant optical sensor, which, for practical reasons, is one of the preferred cases, since quadrant photodiodes are widely available.

As a starting point, a geometrical center of the optical sensors within the array may be off-centered from the optical axis, such as by a certain offset. The sensor array specifically may be movable relative to the optical axis, for example along a gradient, preferably automatically, such as by moving the sensor array, e.g. in a plane perpendicular to the optical axis, and/or by moving the optical axis itself, e.g. shifting the optical axis in a parallel shift and/or tilting the optical axis. Thus, the sensor array may be shifted in order to adjust a position of a light spot generated by the light beam in the plane of the sensor array. Additionally or alternatively, the optical axis may be shifted and/or tilted by using appropriate elements, such as by using one or more deflection elements and/or one or more lenses. The movement, as an example, may take place by using one or more appropriate actuators, such as one or more piezo actuators and/or one or more electromagnetic actuators and/or one or more pneumatic or mechanical actuators, which, e.g., move and/or shift the array and/or move and/or shift and/or tillage one or more optical elements in the beam path in order to move the optical axis, such as parallel shifting the optical axis and/or tilting the optical axis. The evaluation device specifically may be adjusted to control a relative position of the sensor array to the optical axis, e.g. in the plane perpendicular to the optical axis. An adjustment procedure may take place in that the evaluation device is configured for, firstly, determining the at least one transversal position of a light spot generated by the light beam on the sensor array by using the sensor signals and for, secondly, moving the array relative to the optical axis, such as by moving the array and/or the optical axis, e.g. by moving the array in the plane to the optical axis until the light spot is off-centered and/or by tilting a lens until the light spot is off-centered. As used therein, a transversal position may be a position in a plane perpendicular to the optical axis, which may also be referred to as the x-y-plane. For the measurement of the transversal coordinate, as an example, the sensor signals of the optical sensors may be compared. As an example, in case the sensor signals are found to be equal and, thus, in case it is determined that the light spot is located symmetrically with respect to the optical sensors, such as in the center of the quadrant diodes, a shifting of the array and/or a tilting of a lens may take place, in order to off-center the light spot in the array. Thus, the off-centering of the array from the optical axis, such as by off-centering the center of the quadrant photodiode from the optical axis, may simply be a starting point in order to avoid the situation which is typical, in which the light spot is located on the optical axis and, thus, is centered. By off-centering the array relative to the optical axis, thus, the light spot should be off-centered. In case this is found not to be true, such that the light spot, incidentally, is located in the center of the array and equally illuminates all optical sensors, the above-mentioned shifting of the array relative to the optical axis may take place, preferably automatically, in order to off-center the light spot on the array. Thereby, a reliable distance measurement may take place. Further, in a scanning system with a movable light source, the position of the light spot on the quadrant diode may not be fixed. This is still possible, but may necessitate that different calibrations are used, dependent on the xy-position of the spot in the diode.

As outlined above, specifically, quadrant photodiodes may be used. As an example, commercially available quadrant photodiodes may be integrated in order to provide four optical sensors, such as one or more quadrant photodiodes available from Hamamatsu Photonics Deutschland GmbH, D-82211 Herrsching am Ammersee, Germany, such as quadrant Si PIN photodiodes of the type S4349, which are sensitive in the UV spectral range to the near IR spectral range. In case an array of optical sensors is used, the array may be a naked chip or may be an encapsulated array, such as encapsulated in a TO-5 metal package. Additionally or alternatively, a surface mounted device may be used, such as TT Electronics OPR5911 available from TT Electronics plc, Fourth Floor, St Andrews House, West Street Woking Surrey, GU21 6EB, England. It shall be noted that other optical sensors may also be used.

Further, it shall be noted that, besides the option of using precisely one quadrant photodiode, two or more quadrant photodiodes may also be used. Thus, as an example, a first quadrant photodiode may be used for the distance measurement, as described above, providing the two or more optical sensors. Another quadrant photodiode may be used, e.g. in a second partial beam path split off from the beam path of the first quadrant photodiode, for a transversal position measurement, such as for using at least one transversal coordinate x and/or y. The second quadrant photodiode, as an example, may be located on-axis with respect to the optical axis.

Further, it shall be noted that, besides the option of using one or more quadrant photodiodes, one or more quadrant photodiodes or further photodiode arrays may also be replaced or mimicked by separated photodiodes that are arranged or assembled close to each other, preferably in a symmetric shape such as a rectangular matrix, such as a 2×2 matrix. However, further arrangements are feasible. In such an arrangement or assembly, the photodiodes may be arranged or assembled in a housing or mount, such as all photodiodes in a single housing or mount or groups of photodiodes in one housing or mount, or each of the photodiodes in a separate housing or mount. Further, the photodiodes may also be assembled directly on a circuit board. In such arrangements or assemblies, photodiodes may be arranged as such that the separation between the active area of the photodiodes, has a distinct value less than one centimeter, preferably less than one millimeter, more preferably as small as possible. Further, to avoid optical reflexes, distortions, or the like that may deteriorate the measurement, the space between the active areas may be either empty or filled with a material, preferably with a light absorbing material such as a black polymer, such as black silicon, black polyoxymethylene, or the like, more preferably optically absorbing and electrically insulating material, such as black ceramics or insulating black polymers such as black silicon, or the like. Further, the distinct value of the photodiode separation may also be realized by adding a distinct building block between the photodiodes such as a plastic separator. Further embodiments are feasible. The replacement of quadrant photodiodes by single diodes arranged in a similar setup such as in a 2×2 rectangular matrix with minimal distance between the active areas may further minimize the costs for the optical detector. Further, two or more diodes from a quadrant diode may be connected in parallel or in series to form a single light-sensitive area.

The optical sensors each, independently, may be opaque, transparent or semitransparent. For the sake of simplicity, however, opaque sensors which are not transparent for the light beam, may be used, since these opaque sensors generally are widely commercially available.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Field Programmable Gate Arrays (FPGAs), or digital signal processors (DSPs) which are configured to perform the above-mentioned evaluation, in order to determine the at least one longitudinal coordinate of the object. Additionally or alternatively, however, the evaluation device may also fully or partially be embodied by hardware.

The detector may be configured for evaluating a single light beam or a plurality of light beams. In case a plurality of light beams propagates from the object to the detector, means for distinguishing the light beams may be provided. Thus, the light beams may have different spectral properties, and the detector may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

As outlined above, the detector may further comprise one or more additional elements such as one or more additional optical elements. Further, the detector may fully or partially be integrated into at least one housing.

The detector further may comprise at least one beacon device adapted to direct at least one light beam towards the detector, wherein the beacon device is at least one of attachable to the object, holdable by the object and integratable into the object. The at least one beacon device may be or may comprise at least one active beacon device, comprising one or more illumination sources such as one or more light sources like lasers, LEDs, light bulbs or the like. As an example, the light emitted by the illumination source may have a wavelength of 300 to 1000 nm, especially 500 to 1000 nm. Alternatively, as outlined above, the infrared spectral range may be used, such as in the range of 780 nm to 3.0 µm. Specifically, the near infrared region where silicon photodiodes are applicable specifically in the range of 700 nm to 1000 nm may be used. The light emitted by the one or more beacon devices may be non-modulated or may be modulated, as outlined above, in order to distinguish two or more light beams. Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect, the present invention discloses a method for determining a position of at least one object by using at least one detector such as a detector according to the present invention, such as according to one or more of the embodiments referring to a detector as disclosed above or as disclosed in further detail below. Still, other types of detectors may be used. The method comprises the following method steps, wherein the method steps may be performed in the given order or may be performed in a different order. Further, one or more additional method steps may be present which are not listed. Further, one, more than one or even all of the method steps may be performed repeatedly.

The method comprises the following steps:

providing at least one transfer device, wherein the transfer device has at least one focal length in response to the at least one incident light beam propagating from the object to the detector, wherein the transfer device has at least one optical axis;

providing at least one illumination source adapted to generate at least one light beam for illuminating the object, wherein the illumination source is displaced from the optical axis by a distance BL;

providing at least one first optical receiving fiber and at least one second optical receiving fiber, wherein each of the optical receiving fibers comprises at least one cladding and at least one core, wherein the first optical receiving fiber has a core diameter of $d_1$, wherein the second optical receiving fiber has a core diameter of $d_2$, wherein a ratio $d_1/BL$ is in the range $0.000047 \leq d_1/BL \leq 313$ and/or wherein a ratio $d_2/BL$ is in the range $0.000047 \leq d_2/BL \leq 313$;

providing at least two optical sensors, wherein at least one first optical sensor is arranged at an exit end of the first optical receiving fiber and at least one second optical sensor is arranged at an exit end of the second optical receiving fiber, wherein each optical sensor has at least one light sensitive area, wherein each optical sensor is designed to generate at least one sensor signal in response to an illumination of its respective light-sensitive area by the light beam generated by the object having passed through the respective optical receiving fiber;

illuminating the light-sensitive area of at least one of the optical sensors with the light beam having passed through the first optical receiving fiber and illuminating the light-sensitive area of the other one of the optical sensors with the light beam having passed through the second optical receiving fiber, wherein, thereby, each of the light-sensitive areas generates at least one sensor signal; and evaluating the sensor signals, thereby, determining at least one longitudinal coordinate z of the object, wherein the evaluating comprises deriving a combined signal Q of the sensor signals.

Specifically, evaluating the first and second sensor signal may comprise deriving the combined signal Q by dividing the first and second sensor signals, by dividing multiples of the first and second sensor signals or by dividing linear combinations of the first and second sensor signals. Further, the determining the longitudinal coordinate may comprise evaluating the combined signal Q.

For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; an optical data storage application; a security application; a surveillance application; a safety application; a human-machine interface application; a tracking application; a photography application; an imaging application or camera application; an industrial sensing application; a medical application; a 3D printing application; a mapping application for generating maps of at least one space; a homing or tracking beacon detector for vehicles; a machine vision application; a robotics application; a quality control application; a manufacturing application.

For further uses of the measurement head and kit according to the present application, reference is made to WO 2018/091640 A1, the full content of which is herewith included by reference.

Overall, in the context of the present invention, the following embodiments are regarded as preferred:

Embodiment 1: A detector for determining a position of at least one object, the detector comprising:
- at least one transfer device, wherein the transfer device has at least one focal length in response to the at least one incident light beam propagating from the object to the detector, wherein the transfer device has at least one optical axis;
- at least one illumination source adapted to generate at least one light beam for illuminating the object, wherein an exit pupil of the illumination source is displaced from the optical axis by a distance BL;
- at least one first optical receiving fiber and at least one second optical receiving fiber, wherein each of the optical receiving fibers comprises at least one cladding and at least one core, wherein the first optical receiving fiber has a core diameter of $d_1$, wherein the second optical receiving fiber has a core diameter of $d_2$, wherein a ratio $d_1/BL$ is in the range $0.000047 \leq d_1/BL \leq 313$ and/or wherein a ratio $d_2/BL$ is in the range $0.000047 \leq d_2/BL \leq 313$;
- at least two optical sensors, wherein at least one first optical sensor is arranged at an exit end of the first optical receiving fiber and at least one second optical sensor is arranged at an exit end of the second optical receiving fiber, wherein each optical sensor has at least one light sensitive area, wherein each optical sensor is designed to generate at least one sensor signal in response to an illumination of its respective light-sensitive area by a light beam having passed through the respective optical receiving fiber;
- at least one evaluation device being configured for determining at least one longitudinal coordinate z of the object by evaluating a combined signal Q from the sensor signals.

Embodiment 2: The detector according to the preceding embodiment, wherein the ratio $d_1/BL$ is in the range $0.000114 \leq d_1/BL \leq 30.37$, preferably in the range $0.000318 \leq d_1/BL \leq 6.83$, and/or wherein the ratio $d_2/BL$ is in the range $0.000114 \leq d_2/BL \leq 30.37$, preferably in the range $0.000318 \leq d_2/BL \leq 6.83$.

Embodiment 3: The detector according to the preceding embodiment, wherein the illumination source comprises at least one optical sender fiber for illuminating the object.

Embodiment 4: The detector according to the preceding embodiment, wherein the detector further comprises at least one further transfer device, wherein the further transfer device is arranged at an exit end of the optical sender fiber.

Embodiment 5: The detector according to any one of the preceding embodiments, wherein the illumination source has a geometrical extend G in the range $1.5 \cdot 10^{-7}$ mm²·sr$\leq G \leq 314$ mm²·sr, preferably in the range $1 \cdot 10^{-5}$ mm²·sr$\leq G \leq 22$ mm²·sr, more preferably in the range $3 \cdot 10^{-4}$ mm²·sr$\leq G \leq 3.3$ mm²·sr.

Embodiment 6: The detector according to any one of the preceding embodiments, wherein the illumination source is configured to illuminate the object under an angle $\alpha_{illu}$ with respect to the optical axis, wherein the angle is in the range $0° \ 2° \leq \alpha_{illu} \leq 40$, preferably in the range $1° \leq \alpha_{illu} \leq 35$, more preferably in the range $2° \leq \alpha_{illu} \leq 25$.

Embodiment 7: The detector according to any one of the preceding embodiments, wherein at least one of the optical receiving fibers and/or the transfer device has a ratio $\varepsilon_r/k$ in the range $0.362$ (m·K)/W$\leq \varepsilon_r/k \leq 1854$ (m·K)/W, wherein k is the thermal conductivity and $\varepsilon_r$ is the relative permittivity, preferably the ratio $\varepsilon_r/k$ is in the range $0.743$ (m·K)/W$\leq \varepsilon_r/k \leq 194$ (m·K)/W, more preferably the ratio $\varepsilon_r/k$ is in the range $1.133$ (m·K)/W$\leq \varepsilon_r/k \leq 88.7$ (m·K)/W.

Embodiment 8: The detector according to any one of the preceding embodiments, wherein the transfer device has a ratio $v_e/n_D$ in the range $9.05 \leq v_e/n_D \leq 77.3$, wherein $v_e$ is the Abbé-number and $n_D$ is the refractive index, wherein the Abbé-number $v_e$ is given by $$v_e = \frac{(n_D - 1)}{(n_F - n_c)},$$

wherein $n_i$ is the refractive index for different wavelengths, wherein $n_C$ is the refractive index for 656 nm, $n_D$ is the refractive index for 589 nm and $n_F$ is the refractive index for 486 nm, wherein preferably the ratio $v_e/n_D$ is in the range of $13.9 \leq v_e/n_D \leq 44.7$, more preferably in the range of $15.8 \leq v_e/n_D \leq 40.1$.

Embodiment 9: The detector according to any one of the preceding embodiments, wherein a product $\alpha\Delta n$ is in the range $0.0004$ dB/km$\leq \alpha\Delta n \leq 110$ dB/km at at least one wavelength in a visual and near infrared wavelength range, wherein $\alpha$ is the attenuation coefficient and $\Delta n$ is the refractive index contrast with $\Delta n = (n_1^2 - n_2^2)/(2n_1^2)$, wherein $n_1$ is the maximum core refractive index and $n_2$ is the cladding refractive index, wherein preferably the product $\alpha\Delta n$ is in the range $0.002$ dB/km$\leq \alpha\Delta n \leq 23$ dB/km, more preferably in the range $0.02$ dB/km$\leq \alpha\Delta n \leq 11.26$ dB/km.

Embodiment 10: The detector according to any one of the preceding embodiments, wherein the transfer device has an aperture area $D_1$ and at least one of the optical receiving fibers has a fiber core with a cross-sectional area $D_2$, wherein a ratio $D_1/D_2$ is in the range $0.54 \leq D_1/D_2 \leq 5087$, preferably $1.27 \leq D_1/D_2 \leq 413$, more preferably $2.17 \leq D_1/D_2 \leq 59.2$.

Embodiment 11: The detector according to any one of the preceding embodiments, wherein each of the first and the second optical receiving fibers comprises at least one entrance face configured to receive the light beam propagating from the object to the detector having passed through the transfer device, wherein a centroid of the entrance faces of the first and second optical receiving fibers is displaced from the optical axis by a distance $d_R$, wherein $d_R$ is in the range $10 \ \mu m \leq d_R \leq 127000 \ \mu m$, preferably in the range $100 \ \mu m \leq d_R \leq 76200 \ \mu m$, more preferably in the range $500 \ \mu m \leq d_R \leq 25400 \ \mu m$.

Embodiment 12: The detector according to any one of the preceding embodiments, wherein the first optical receiver fiber and/or the second optical receiver fibers comprise at least one multifurcated optical fiber.

Embodiment 13: The detector according to any one of the preceding embodiments, wherein the transfer device specifically may comprise one or more of: at least one lens, for example at least one lens selected from the group consisting of at least one focus-tunable lens, at least one aspheric lens, at least one spherical lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system; at least one gradient index (GRIN) lens.

Embodiment 14: The detector according to any one of the preceding embodiments, wherein the evaluation device is configured for deriving the combined signal Q by one or more of dividing the sensor signals, dividing multiples of the sensor signals, dividing linear combinations of the sensor signals.

Embodiment 15: The detector according to the preceding embodiment, wherein the evaluation device is configured for using at least one predetermined relationship between the combined signal Q and the longitudinal coordinate for determining the longitudinal coordinate.

Embodiment 16: The detector according to any one of the preceding embodiments, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile at a sensor position of the optical sensors, and $E(x,y,z_o)$ denotes the beam profile given at the object distance $z_o$.

Embodiment 17: The detector according to any one of the preceding embodiments, wherein each of the sensor signals comprises at least one information of at least one area of the beam profile of the light beam, wherein the beam profile is selected from the group consisting of a trapezoid beam profile; a triangle beam profile; a conical beam profile and a linear combination of Gaussian beam profiles.

Embodiment 18: The detector according to the preceding embodiment, wherein the light-sensitive areas are arranged such that a first sensor signal comprises information of a first area of the beam profiles and a second sensor signal comprises information of a second area of the beam profile, wherein the first area of the beam profile and the second area of the beam profile are one or both of adjacent or overlapping regions, wherein the evaluation device is configured to determine the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile, wherein the evaluation device is configured to derive the combined signal Q by one or more of dividing the edge information and the center information, dividing multiples of the edge information and the center information, dividing linear combinations of the edge information and the center information.

Embodiment 19: The detector according to any one the preceding embodiments, wherein each optical receiving fiber has at least one entrance face, wherein a geometrical center of the respective entrance face is aligned perpendicular with respect to the optical axis of the transfer device.

Embodiment 20: The detector according to any one of the preceding embodiments, wherein centroids of entrance faces of the optical receiving fibers and/or of the exit end of the optical sender fiber are arranged within one plane orthogonal to the optical axis.

Embodiment 21: The detector according to any one of the preceding embodiments, wherein centroids of entrance faces of the optical receiving fibers and/or of the exit end of the optical sender fiber are arranged within one plane parallel and comprising the optical axis.

Embodiment 22: The detector according to any one of the preceding embodiments, wherein centroids of the entrance faces of the optical receiving fibers and/or of the exit end of the optical sender fiber are arranged at an intersection of a plane orthogonal to the optical axis and a plane parallel and comprising the optical axis.

Embodiment 23: The detector according to any one the preceding embodiments, wherein at least one of the optical receiving fibers is a structured fiber having a shaped and/or structured entrance and/or exit face.

Embodiment 24: The detector according to any one the preceding embodiments, wherein the optical sensors are non-pixelated optical sensors.

Embodiment 25: A method for determining a position of at least one object by using at least one detector, the method comprising the following steps:

providing at least one transfer device, wherein the transfer device has at least one focal length in response to the at least one incident light beam propagating from the object to the detector, wherein the transfer device has at least one optical axis;

providing at least one illumination source adapted to generate at least one light beam for illuminating the object, wherein the illumination source is displaced from the optical axis by a distance BL;

providing at least one first optical receiving fiber and at least one second optical receiving fiber, wherein each of the optical receiving fibers comprises at least one cladding and at least one core, wherein the first optical receiving fiber has a core diameter of $d_1$, wherein the second optical receiving fiber has a core diameter of $d_2$, wherein a ratio $d_1/BL$ is in the range $0.000047 \leq d_1/BL \leq 313$ and/or wherein a ratio $d_2/BL$ is in the range $0.000047 \leq d_2/BL \leq 313$;

providing at least two optical sensors, wherein at least one first optical sensor is arranged at an exit end of the first optical receiving fiber and at least one second optical sensor is arranged at an exit end of the second optical receiving fiber, wherein each optical sensor has at least one light sensitive area, wherein each optical sensor is designed to generate at least one sensor signal in response to an illumination of its respective light-sensitive area by the light beam generated by the object having passed through the respective optical receiving fiber;

illuminating the light-sensitive area of at least one of the optical sensors with the light beam having passed through the first optical receiving fiber and illuminating the light-sensitive area of the other one of the optical sensors with the light beam having passed through the second optical receiving fiber, wherein, thereby, each of the light-sensitive areas generates at least one sensor signal; and evaluating the sensor signals, thereby, determining at least one longitudinal coordinate z of the object, wherein the evaluating comprises deriving a combined signal Q of the sensor signals.

Embodiment 26: A use of the detector according to any one of the preceding embodiments relating to a detector, for a purpose of use, selected from the group consisting of: a position measurement in traffic technology; an entertainment application; an optical data storage application; a security application; a surveillance application; a safety application; a human-machine interface application; a logistics application; an endoscopy application; a medical application; a tracking application; a photography application; an industrial sensing application; a machine vision application; a robotics application; a quality control application; a 3D printing application; an augmented reality application; a manufacturing application; a use in combination with optical data storage and readout.

Embodiment 27: A detector for determining a position of at least one object, the detector comprising:
at least one transfer device, wherein the transfer device has at least one focal length in response to the at least one incident light beam propagating from the object to the detector, wherein the transfer device has at least one optical axis;
at least one illumination source adapted to generate at least one light beam for illuminating the object, wherein an exit pupil of the illumination source is displaced from the optical axis by a distance BL;
at least one first optical receiving fiber and at least one second optical receiving fiber, wherein each of the optical receiving fibers comprises at least one cladding and at least one core, wherein the first optical receiving fiber has a core diameter of $d_1$, wherein the second optical receiving fiber has a core diameter of $d_2$, wherein a ratio $d_1/BL$ is in the range $0.0000005 \leq d_1/BL \leq 1$ and/or wherein a ratio $d_2/BL$ is in the range $0.0000005 \leq d_2/BL \leq 1$,
at least two optical sensors, wherein at least one first optical sensor is arranged at an exit end of the first optical receiving fiber and at least one second optical sensor is arranged at an exit end of the second optical receiving fiber, wherein each optical sensor has at least one light sensitive area, wherein each optical sensor is designed to generate at least one sensor signal in response to an illumination of its respective light-sensitive area by a light beam having passed through the respective optical receiving fiber;
at least one evaluation device being configured for determining at least one longitudinal coordinate z of the object by evaluating a combined signal Q from the sensor signals.

Embodiment 28: The detector according to the preceding embodiment, wherein the ratio $d_1/BL$ is in the range $0.000114 \leq d_1/BL \leq 0.8$, preferably in the range $0.000318 \leq d_1/BL \leq 0.5$, and/or wherein the ratio $d_2/BL$ is in the range $0.000114 \leq d_2/BL \leq 0.8$, preferably in the range $0.000318 \leq d_2/BL \leq 0.5$.

Embodiment 29: The detector according to the preceding embodiment, wherein the illumination source comprises at least one optical sender fiber for illuminating the object.

Embodiment 30: The detector according to the preceding embodiment, wherein the detector further comprises at least one further transfer device, wherein the further transfer device is arranged at an exit end of the optical sender fiber.

Embodiment 31: The detector according to any one of the four preceding embodiments, wherein the illumination source has a geometrical extend G in the range $1.5 \cdot 10^{-7}$ mm$^2 \cdot$sr$\leq G \leq 314$ mm$^2 \cdot$sr, preferably in the range $1 \cdot 10^{-5}$ mm$^2 \cdot$sr$\leq G \leq 22$ mm$^2 \cdot$sr, more preferably in the range $3 \cdot 10^{-4}$ mm$^2 \cdot$sr$\leq G \leq 3.3$ mm$^2 \cdot$sr.

Embodiment 32: The detector according to any one of the five preceding embodiments, wherein the illumination source is configured to illuminate the object under an angle $\alpha_{illu}$ with respect to the optical axis, wherein the angle is in the range $0° \leq \alpha_{illu} \leq 40$, preferably in the range $1° \leq \alpha_{illu} \leq 35$, more preferably in the range $2° \leq \alpha_{illu} \leq 25$.

Embodiment 33: The detector according to any one of the six preceding embodiments, wherein at least one of the optical receiving fibers and/or the transfer device has a ratio $\varepsilon_r/k$ in the range $0.362$ (m·K)/W$\leq \varepsilon_r/k \leq 1854$ (m·K)/W, wherein k is the thermal conductivity and $\varepsilon_r$ is the relative permittivity, preferably the ratio $\varepsilon_r/k$ is in the range $0.743$ (m·K)/W$\leq \varepsilon_r/k \leq 194$ (m·K)/W, more preferably the ratio $\varepsilon_r/k$ is in the range $1.133$ (m·K)/W$\leq \varepsilon_r/k \leq 88.7$ (m·K)/W.

Embodiment 34: The detector according to any one of the seven preceding embodiments, wherein the transfer device has a ratio $v_e/n_D$ in the range $9.05 \leq v_e/n_D \leq 77.3$, wherein $v_e$ is the Abbé-number and $n_D$ is the refractive index, wherein the Abbé-number $v_e$ is given by $$v_e = \frac{(n_D - 1)}{(n_F - n_c)},$$

wherein $n_i$ is the refractive index for different wavelengths, wherein $n_C$ is the refractive index for 656 nm, $n_D$ is the refractive index for 589 nm and $n_F$ is the refractive index for 486 nm, wherein preferably the ratio $v_e/n_D$ is in the range of $13.9 \leq v_e/n_D \leq 44.7$, more preferably in the range of $15.8 \leq v_e/n_D \leq 40.1$.

Embodiment 35: The detector according to any one of the eight preceding embodiments, wherein a product $\alpha \Delta n$ is in the range $0.0004$ dB/km$\leq \alpha \Delta n \leq 110$ dB/km at at least one wavelength in a visual and near infrared wavelength range, wherein $\alpha$ is the attenuation coefficient and $\Delta n$ is the refractive index contrast with $\Delta n = (n_1^2 - n_2^2)/(2n_1^2)$, wherein $n_1$ is the maximum core refractive index and $n_2$ is the cladding refractive index, wherein preferably the product $\alpha \Delta n$ is in the range $0.002$ dB/km$\leq \alpha \Delta n \leq 23$ dB/km, more preferably in the range $0.02$ dB/km$\leq \alpha \Delta n \leq 11.26$ dB/km.

Embodiment 36: The detector according to any one of the nine preceding embodiments, wherein the transfer device has an aperture area $D_1$ and at least one of the optical receiving fibers has a fiber core with a cross-sectional area $D_2$, wherein a ratio $D_1/D_2$ is in the range $0.54 \leq D_1/D_2 \leq 5087$, preferably $1.27 \leq D_1/D_2 \leq 413$, more preferably $2.17 \leq D_1/D_2 \leq 59.2$.

Embodiment 37: The detector according to any one of the ten preceding embodiments, wherein each of the first and the second optical receiving fibers comprises at least one entrance face configured to receive the light beam propagating from the object to the detector having passed through the transfer device, wherein a centroid of the entrance faces of the first and second optical receiving fibers is displaced from the optical axis by a distance $d_R$, wherein $d_R$ is in the range $10$ μm$\leq d_R \leq 127000$ μm, preferably in the range $100$ μm$\leq d_R \leq 76200$ μm, more preferably in the range $500$ μm$\leq d_R \leq 25400$ μm.

Embodiment 38: The detector according to any one of the eleven preceding embodiments, wherein the first optical receiver fiber and/or the second optical receiver fibers comprise at least one multifurcated optical fiber.

Embodiment 39: The detector according to any one of the twelve preceding embodiments, wherein the transfer device specifically may comprise one or more of: at least one lens, for example at least one lens selected from the group consisting of at least one focus-tunable lens, at least one aspheric lens, at least one spherical lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system; at least one gradient index (GRIN) lens.

Embodiment 40: The detector according to any one of the thirteen preceding embodiments, wherein the evaluation device is configured for deriving the combined signal Q by one or more of dividing the sensor signals, dividing multiples of the sensor signals, dividing linear combinations of the sensor signals.

Embodiment 41: The detector according to the preceding embodiment, wherein the evaluation device is configured for using at least one predetermined relationship between the combined signal Q and the longitudinal coordinate for determining the longitudinal coordinate.

Embodiment 42: The detector according to any one of the fifteen preceding embodiments, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile at a sensor position of the optical sensors, and $E(x,y,z_o)$ denotes the beam profile given at the object distance $z_o$.

Embodiment 43: The detector according to any one of the sixteen preceding embodiments, wherein each of the sensor signals comprises at least one information of at least one area of the beam profile of the light beam, wherein the beam profile is selected from the group consisting of a trapezoid beam profile; a triangle beam profile; a conical beam profile and a linear combination of Gaussian beam profiles.

Embodiment 44: The detector according to the preceding embodiment, wherein the light-sensitive areas are arranged such that a first sensor signal comprises information of a first area of the beam profiles and a second sensor signal comprises information of a second area of the beam profile, wherein the first area of the beam profile and the second area of the beam profile are one or both of adjacent or overlapping regions, wherein the evaluation device is configured to determine the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile, wherein the evaluation device is configured to derive the combined signal Q by one or more of dividing the edge information and the center information, dividing multiples of the edge information and the center information, dividing linear combinations of the edge information and the center information.

Embodiment 45: The detector according to any one the eighteen preceding embodiments, wherein each optical receiving fiber has at least one entrance face, wherein a geometrical center of the respective entrance face is aligned perpendicular with respect to the optical axis of the transfer device.

Embodiment 46: The detector according to any one of the nineteen preceding embodiments, wherein centroids of entrance faces of the optical receiving fibers and/or of the exit end of the optical sender fiber are arranged within one plane orthogonal to the optical axis.

Embodiment 47: The detector according to any one of the 20 preceding embodiments, wherein centroids of entrance faces of the optical receiving fibers and/or of the exit end of the optical sender fiber are arranged within one plane parallel and comprising the optical axis.

Embodiment 48: The detector according to any one of the 21 preceding embodiments, wherein centroids of the entrance faces of the optical receiving fibers and/or of the exit end of the optical sender fiber are arranged at an intersection of a plane orthogonal to the optical axis and a plane parallel and comprising the optical axis.

Embodiment 49: The detector according to any one the 22 preceding embodiments, wherein at least one of the optical receiving fibers is a structured fiber having a shaped and/or structured entrance and/or exit face.

Embodiment 50: The detector according to any one the 23 preceding embodiments, wherein the optical sensors are non-pixelated optical sensors.

Embodiment 51: A method for determining a position of at least one object by using at least one detector, the method comprising the following steps:
providing at least one transfer device, wherein the transfer device has at least one focal length in response to the at least one incident light beam propagating from the object to the detector, wherein the transfer device has at least one optical axis;
providing at least one illumination source adapted to generate at least one light beam for illuminating the object, wherein the illumination source is displaced from the optical axis by a distance BL;
providing at least one first optical receiving fiber and at least one second optical receiving fiber, wherein each of the optical receiving fibers comprises at least one cladding and at least one core, wherein the first optical receiving fiber has a core diameter of $d_1$, wherein the second optical receiving fiber has a core diameter of $d_2$, wherein a ratio $d_1/BL$ is in the range $0.0000005 \leq d_1/BL \leq 1$ and/or wherein a ratio $d_2/BL$ is in the range $0.0000005 \leq d_2/BL \leq 1$;
providing at least two optical sensors, wherein at least one first optical sensor is arranged at an exit end of the first optical receiving fiber and at least one second optical sensor is arranged at an exit end of the second optical receiving fiber, wherein each optical sensor has at least one light sensitive area, wherein each optical sensor is designed to generate at least one sensor signal in response to an illumination of its respective light-sensitive area by the light beam generated by the object having passed through the respective optical receiving fiber;
illuminating the light-sensitive area of at least one of the optical sensors with the light beam having passed through the first optical receiving fiber and illuminating the light-sensitive area of the other one of the optical sensors with the light beam having passed through the second optical receiving fiber, wherein, thereby, each of the light-sensitive areas generates at least one sensor signal; and
evaluating the sensor signals, thereby, determining at least one longitudinal coordinate z of the object, wherein the evaluating comprises deriving a combined signal Q of the sensor signals.

Embodiment 52: A use of the detector according to any one of embodiments 27 to 50 relating to a detector, for a purpose of use, selected from the group consisting of: a position measurement in traffic technology; an entertainment application; an optical data storage application; a security application; a surveillance application; a safety application; a human-machine interface application; a logistics application; an endoscopy application; a medical application; a tracking application; a photography application; an industrial sensing application; a machine vision application; a robotics application; a quality control application; a 3D printing application; an augmented reality application; a manufacturing application; a use in combination with optical data storage and readout.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures:

FIGS. 5A to E show further embodiments of a measurement head according to the present invention;

DETAILED DESCRIPTION OF THE EMBODIMENTS

Figure 1:
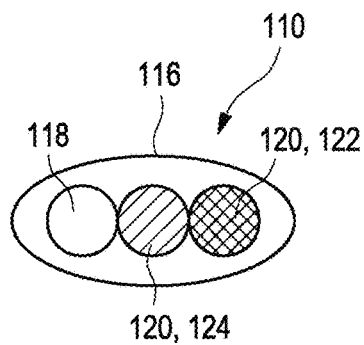
FIGS. 1A to JJ show top views of exemplary embodiments of a measurement head of a detector according to the present invention.
Figure 1:
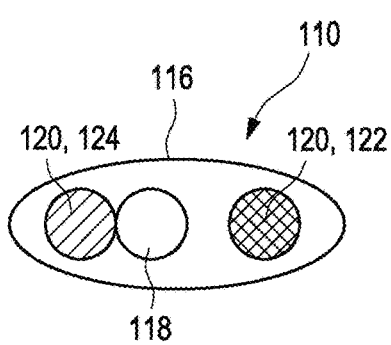
Figure 1:
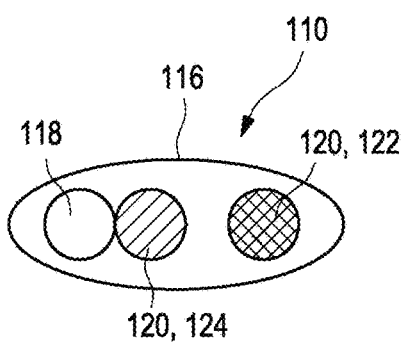
Figure 1:
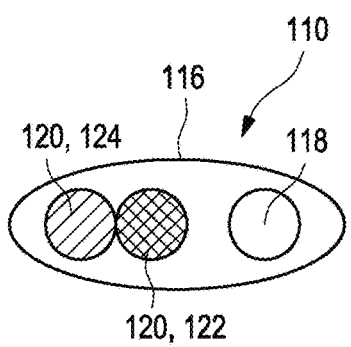
Figure 1:
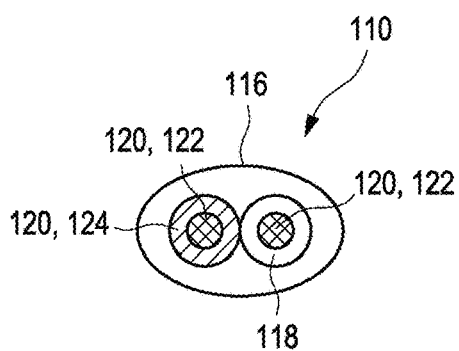
Figure 1:
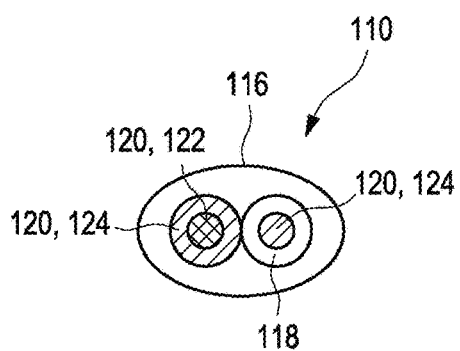
Figure 1:
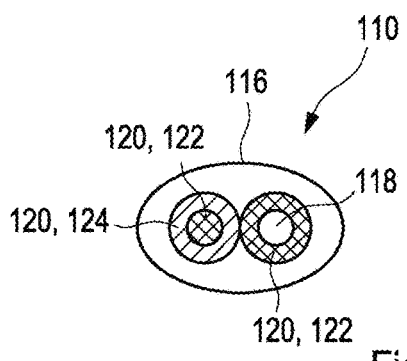
Figure 1:
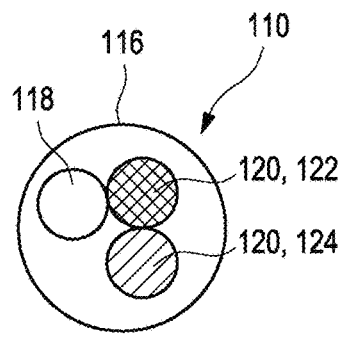
Figure 1:
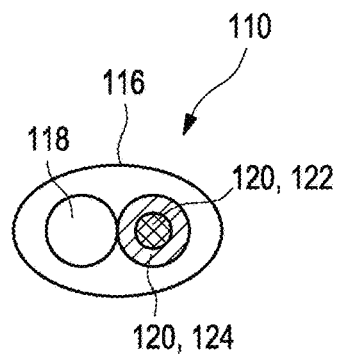
Figure 1:
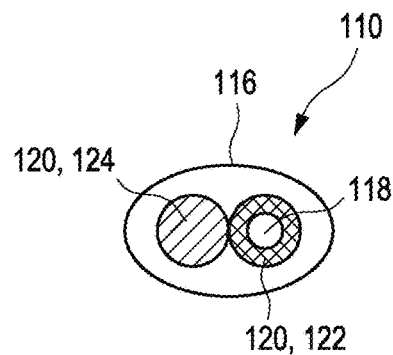
Figure 1:
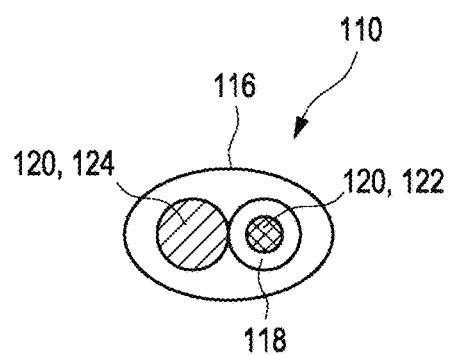
Figure 1:
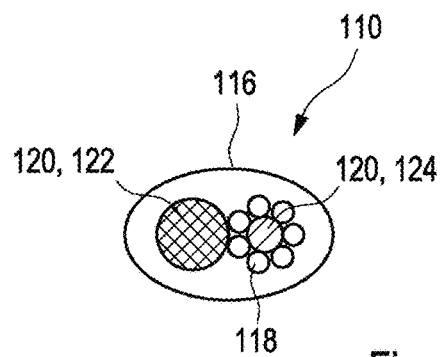
Figure 1:
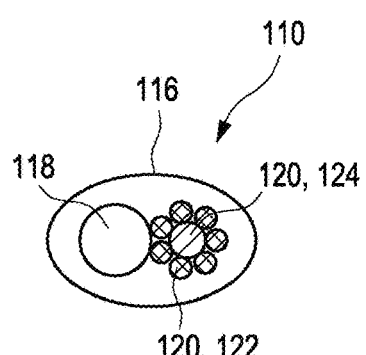
Figure 1:
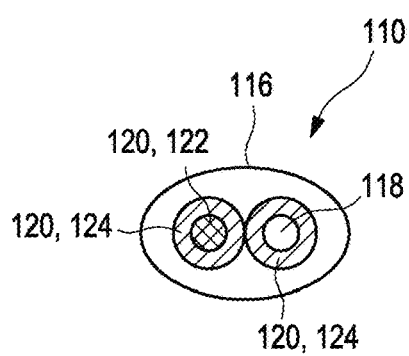
Figure 1:
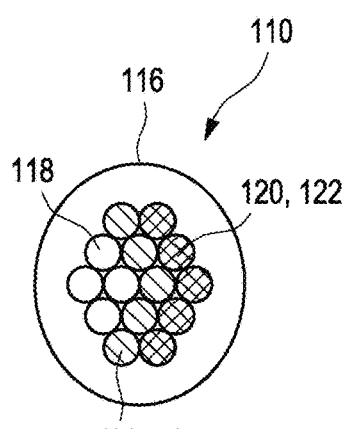
Figure 1:
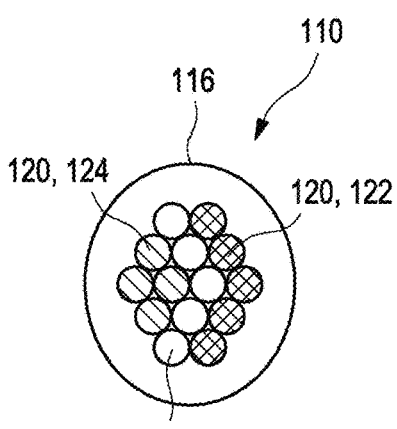
Figure 1:
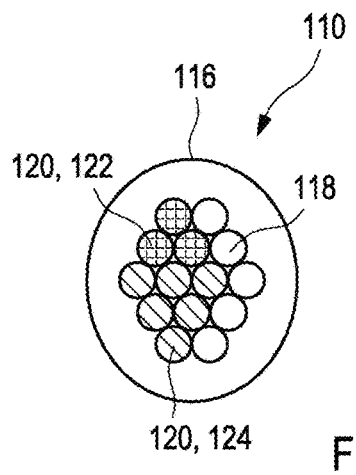
Figure 1:
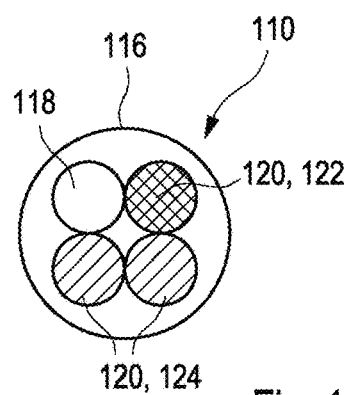
Figure 1:
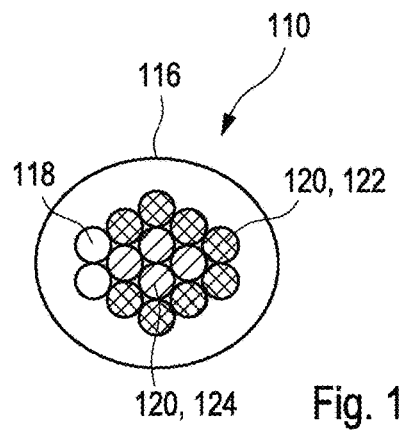
Figure 1:
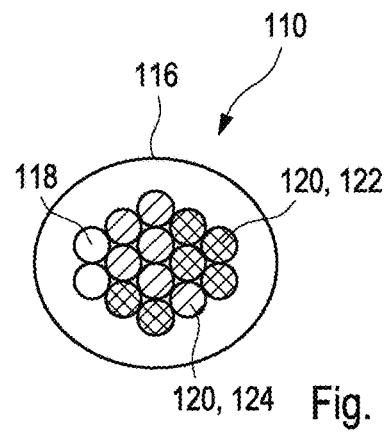
Figure 1:
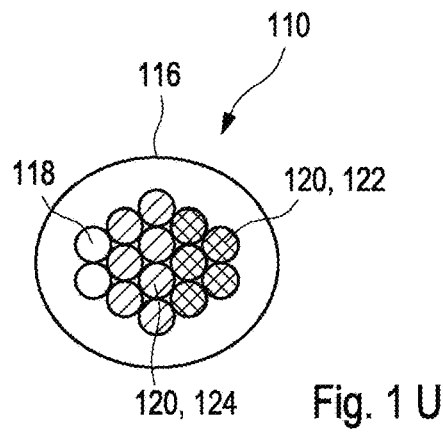
Figure 1:
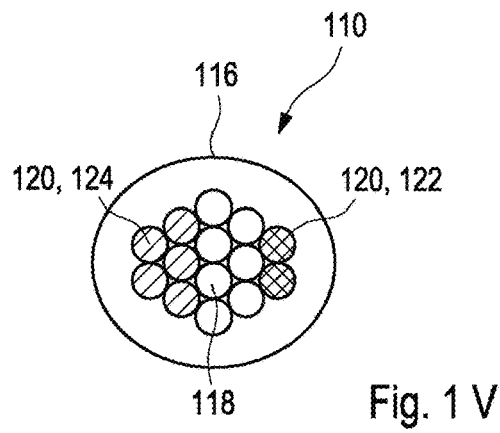
Figure 1:
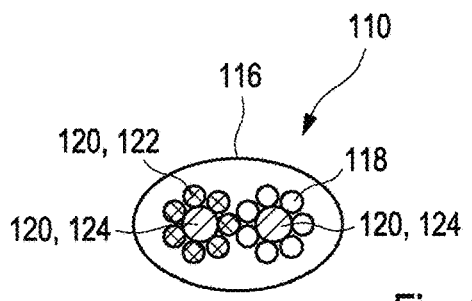
Figure 1:
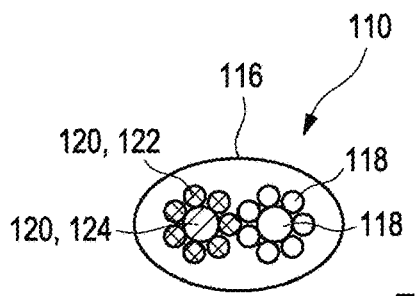
Figure 1:
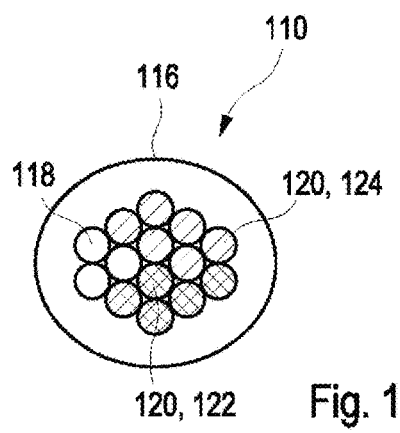
Figure 1:
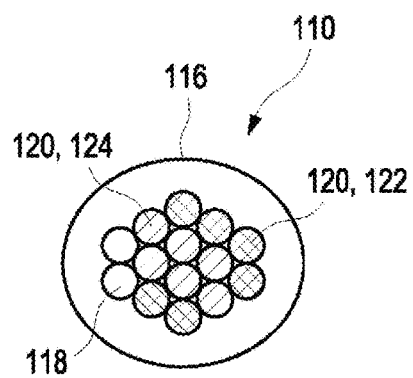
Figure 1:
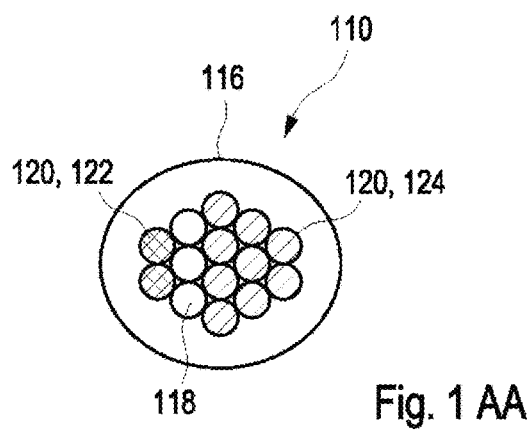
Figure 1:
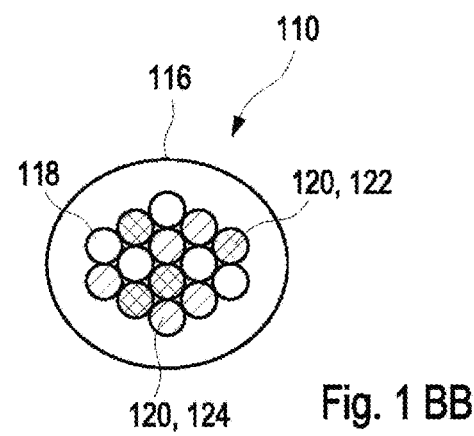
Figure 1:
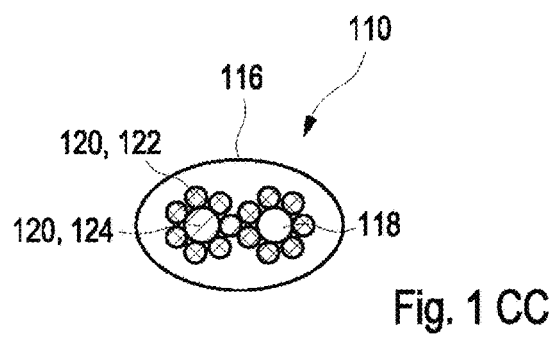
Figure 1:
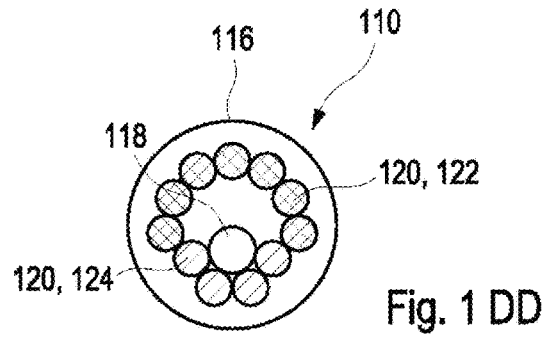
Figure 1:
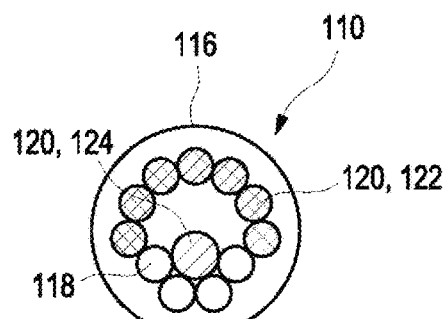
Figure 1:
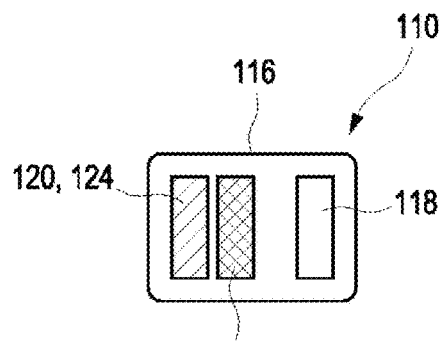
Figure 1:
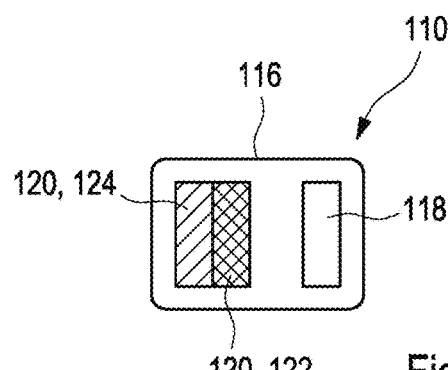
Figure 1:
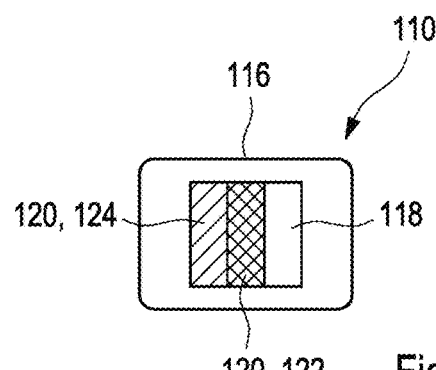
Figure 1:
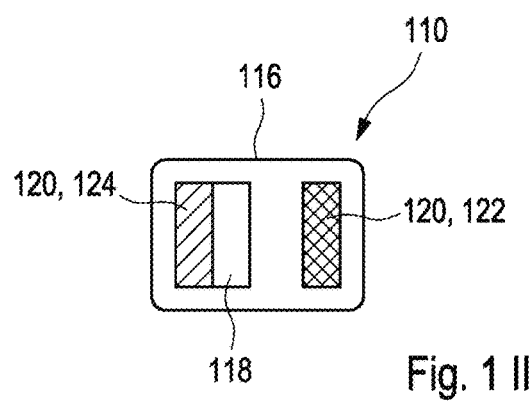
Figure 1:
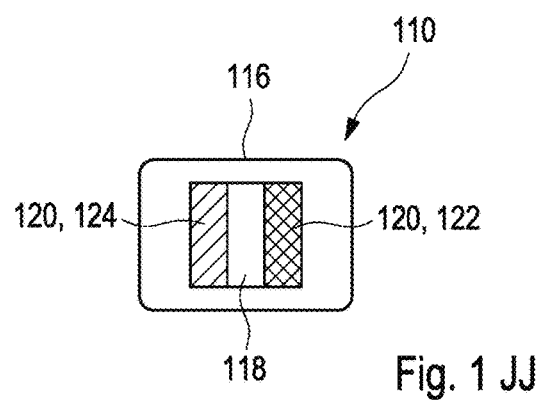

FIGS. 1A to JJ show in top view exemplary embodiments of a measurement head 110 of a detector 112 for determining a position of at least one object 114. The measurement head 110 may comprise at least one housing 116, for example at least one metal housing and/or plastic housing. Each of the measurement heads 110 may comprise a plurality of fibers, specifically a plurality of the at least one optical sender fiber 118 and/or at least two optical receiving fibers 120 such as at least one first optical receiving fiber 122 and at least one second optical receiving fiber 124. The first optical receiving fiber 122 may be configured to provide at least one impinging light beam to at least one first optical sensor 126 which is arranged at an exit end of the first optical receiving fiber 122. The second optical receiving fiber 124 may be configured to provide at least one impinging light beam to at least one second optical sensor 128 which is arranged at an exit end of the second optical receiving fiber 124. Each of the optical receiving fibers 120 may comprise an exit end and an entrance end. In FIGS. 1A to JJ top view on the entrance end is shown.

FIGS. 1A to 1D, 1I to 1K, and 1FF to 1JJ show embodiments of measurement head 110 having one optical sender fiber 118 and one first optical receiving fiber 122 and one second optical receiving fiber 124. In FIGS. 1A to D and 1I to 1K the measurement head 110 may have an elliptic cross section and the optical sender fiber 118, the first optical receiving fiber 122 and the second optical receiving fiber 124 may have a circular cross section. In FIGS. 1FF to 1JJ the measurement head may have a rectangular shape and the optical sender fiber 118, the first optical receiving fiber 122 and the second optical receiving fiber 124 may have a rectangular cross section. In the embodiments of FIGS. 1A to 1D and 1FF to 1JJ the optical sender fiber 118, the first optical receiving fiber 122 and the second optical receiving fiber 124 may be arranged side by side and in parallel. For example, in FIG. 1A the optical sender fiber 118 may be arranged next to the second optical receiving fiber 124 which may be arranged next to the first optical receiving fiber 122. Similar arrangements are shown in FIGS. 1HH and 1JJ, with different order of the respective optical fibers. The optical sender fiber 118, the first optical receiving fiber 122 and the second optical receiving fiber 124 may be arranged displaced from each other such as shown in FIGS. 1B, 1C, 1GG and 1II. For example, as shown in FIGS. 1B and 1O, the second optical receiving fiber 124 may arranged next to the optical sender fiber 118, wherein the first optical receiving fiber 122 may be displaced from the two fibers by a certain distance. As shown in FIGS. 1B and 1C different order of the second optical receiving fiber 124 and the optical sender fiber 118 may be possible. For example, as shown in FIG. 1D, the first optical receiving fiber 122 may be arranged next to the optical sender fiber 118, wherein the second optical receiving fiber 124 may be displaced from the two fibers by a certain distance. Similar arrangements are shown in FIGS. 1FF, 1GG and 1II with different order of the respective optical fibers. In addition, to the embodiments as shown in the FIGS. 1A to D and 1FF to 1JJ, every conceivable order of the optical sender fiber 118, the first optical receiving fiber 122 and the second optical receiving fiber 124 may be possible. For example, in FIG. 1I, the second optical receiving fiber 124 may be arranged concentric around the first optical receiving fiber 122, wherein the optical sender fiber 118 may be arranged side by side next to the optical receiving fibers 120. For example, in FIG. 1J the first optical receiving fiber 122 may be arranged concentric around the optical sender fiber 118, wherein the second optical receiving fiber 124 may be arranged parallel to the first optical receiving fiber 122 and the optical sender fiber 118. For example, in FIG. 1K the measurement head 110 may comprise one optical sender fiber 118 which is arranged concentric around one first optical receiving fiber 122 and one second optical receiving fiber which is arranged parallel to the first optical receiving fiber 122 and the optical sender fiber 118.

FIGS. 1E to 1G, 1L to 1EE show embodiments, wherein the measurement head 110 comprises a plurality of the first optical receiving fiber 122 and/or of the second optical receiving fiber 124 and/or of the optical sender fiber 118. FIGS. 1E, 1F, 1G, 1L to 1N and 1W to 1X show embodiments wherein two or more of the first optical receiving fiber 122, the second optical receiving fiber 124 and the optical sender fiber 118 may be arranged concentric and having and/or sharing a common central axis. For example, in FIG. 1E, the measurement head 110 may comprise two first optical receiving fibers 122, one optical sender fiber which may be arranged concentric around one of the first optical receiving fibers 122, and one second optical receiving fiber 124 which may be arranged concentric around the other one of the first optical receiving fibers 122. For example, in FIG. 1F, the measurement head 110 may comprise two second optical receiving fibers 124, one optical sender fiber 118 which may be arranged concentric around one of the second optical receiving fibers 124, and one first optical receiving fiber 122 wherein the other one of the second optical receiving fibers 124 may be arranged concentric around the first optical receiving fiber 122. For example, in FIG. 1G, the measurement head 110 may comprise two first optical receiving fibers 122, one optical sender fiber 118, wherein one of the first optical receiving fibers may be arranged concentric around the optical sender fiber 118, and one second optical receiving fiber 124 which may be arranged concentric around the other one of the first optical receiving fibers 122. For example, in FIG. 1N, the measurement head 110 may comprise two second optical receiving fibers 124 wherein one of the second optical receiving fibers 124 may be arranged concentric around one first optical receiving fiber 122, and the other one of the second optical receiving fibers 124 may be arranged concentric around one optical sender fiber 118. For example, in FIG. 1L, the measurement head 110 may comprise seven optical sender fibers 118 which may be arranged concentric around one second optical receiving fiber 124. One first optical receiving fiber 122 may be arranged parallel to the second optical receiving fiber 124 and the optical sender fibers 118. For example, in FIG. 1M, the measurement head 110 may comprise seven first optical receiving fibers 122 which may be arranged concentric around one second optical receiving fiber 124. One optical sender fiber 118 may be arranged parallel to the first and second optical receiving fibers 122, 124. For example, in FIG. 1W, the measurement head 110 may comprise seven optical sender fibers 118 which may be arranged concentric around one second optical receiving fiber 124, and seven first optical receiving fibers 122 which may be arranged concentric around one second optical receiving fiber 124. For example, in FIG. 1X, the measurement head 110 may comprise eight optical sender fibers 118 wherein seven of the optical sender fibers 118 may be arranged concentric around one of the optical sender fibers 118, and seven first optical receiving fibers 122 which may be arranged concentric around one second optical receiving fiber 124. Other embodiments of a radially arranged or radial symmetric design are possible. The radially arranged or radially symmetric design may allow enhancing robustness of measurement values, in particular at strong black-and-white contrast in a measured point of the object or for measurements of concave or convex surfaces.

FIGS. 1O to 1V, 1Y to 1EE show non-radial symmetric design. In addition, to the embodiments as shown in the FIGS. 1O to 1V, 1Y to 1BB, 1DD and 1EE every conceivable non-radial symmetric design of the optical sender fibers 118, the first optical receiving fibers 122 and the second optical receiving fibers 124 may be possible. Specifically, measurement heads 110 are possible with identical amount of optical sender fibers 118, first optical receiving fibers 122 and second optical receiving fibers 124 or with different amount of optical sender fibers 118 first optical receiving fibers 122 and second optical receiving fibers 124.

Figure 2:
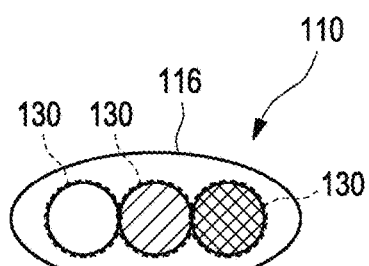
FIGS. 2A to GG show top views of embodiments of lens and fiber arrangement according to the present invention.
Figure 2:
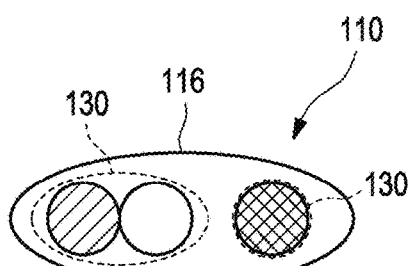
Figure 2:
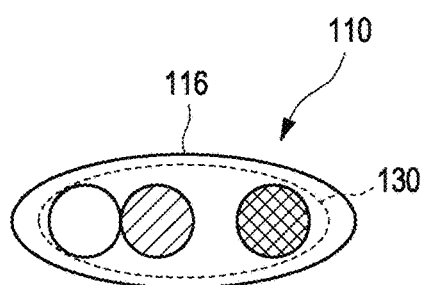
Figure 2:
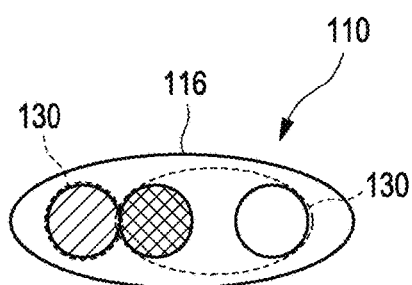
Figure 2:
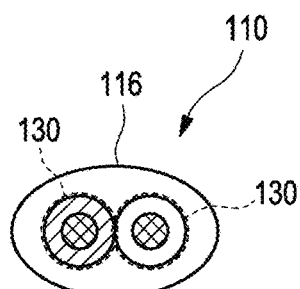
Figure 2:
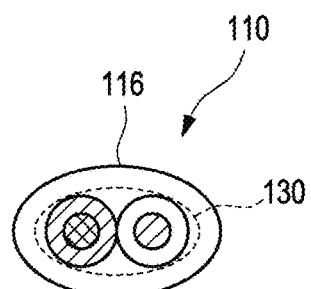
Figure 2:
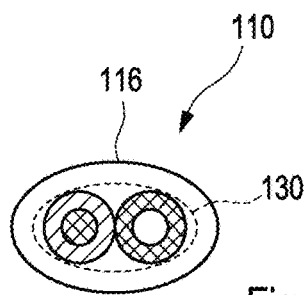
Figure 2:
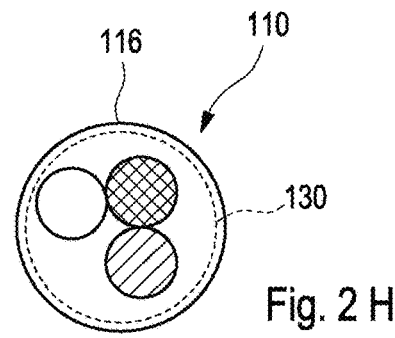
Figure 2:
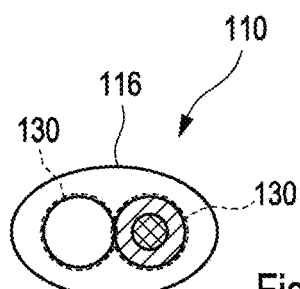
Figure 2:
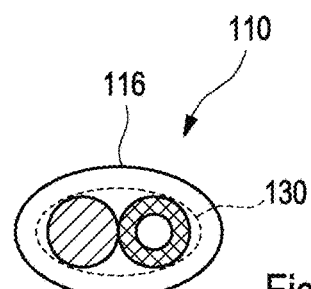
Figure 2:
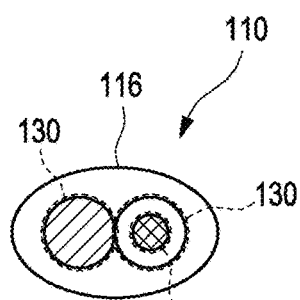
Figure 2:
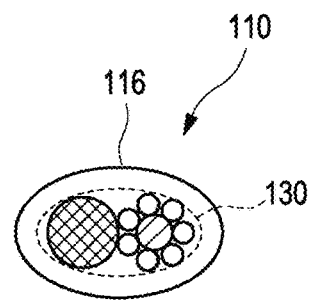
Figure 2:
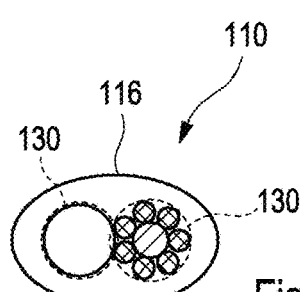
Figure 2:
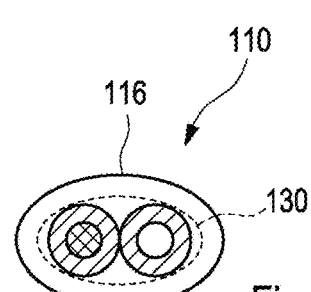
Figure 2:
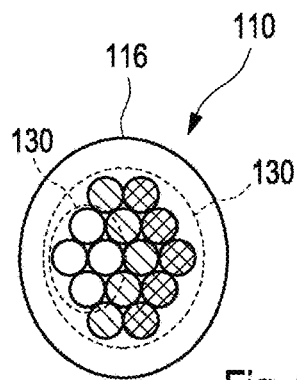
Figure 2:
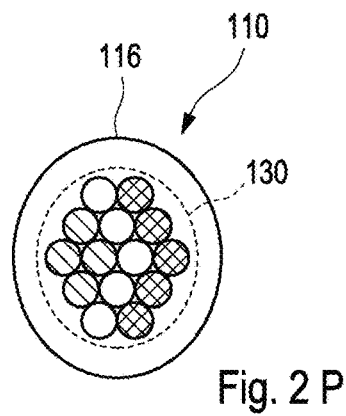
Figure 2:
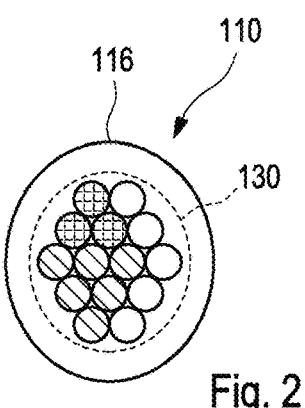
Figure 2:
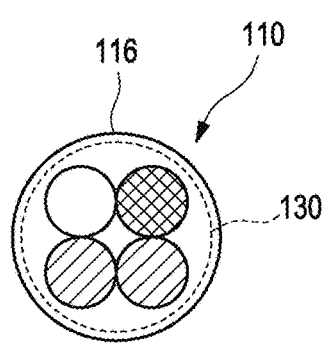
Figure 2:
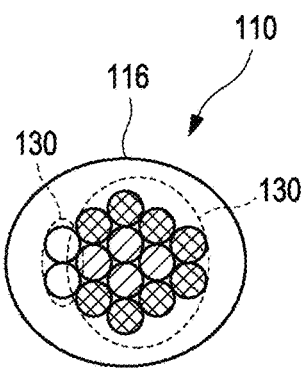
Figure 2:
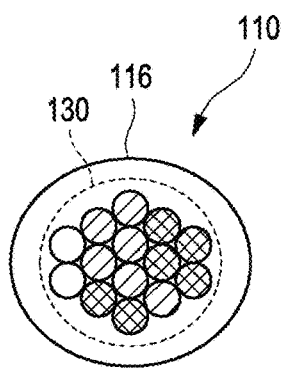
Figure 2:
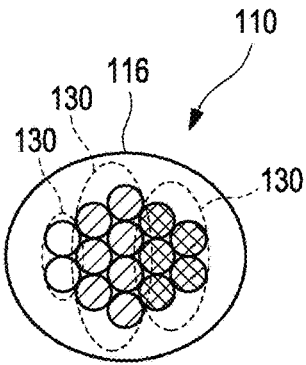
Figure 2:
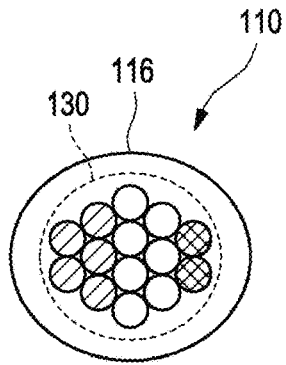
Figure 2:
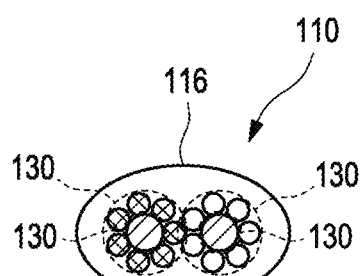
Figure 2:
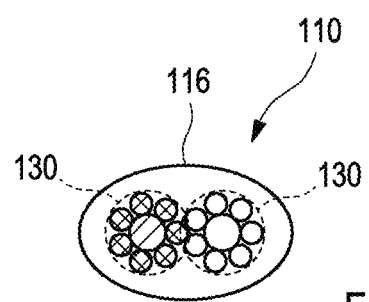
Figure 2:
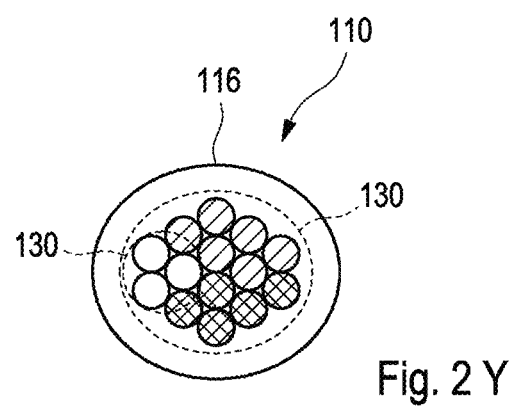
Figure 2:
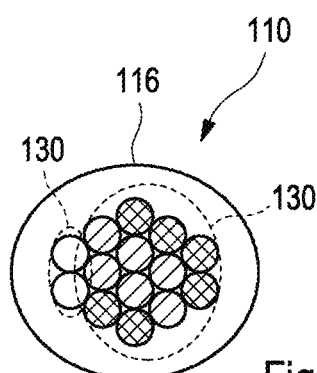
Figure 2:
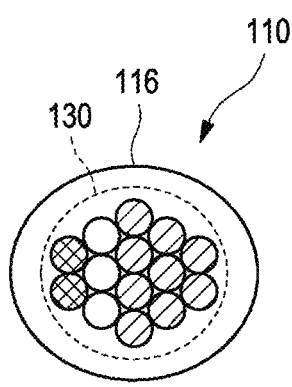
Figure 2:
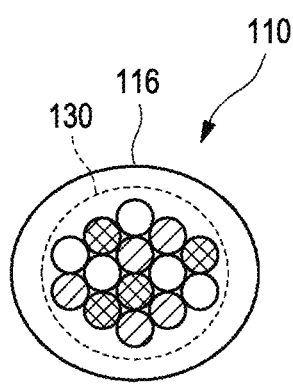
Figure 2:
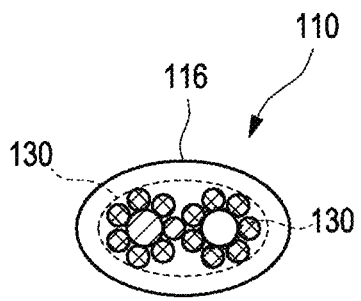
Figure 2:
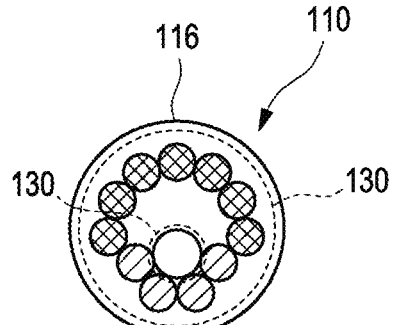
Figure 2:
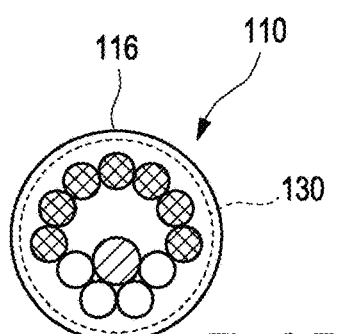
Figure 2:
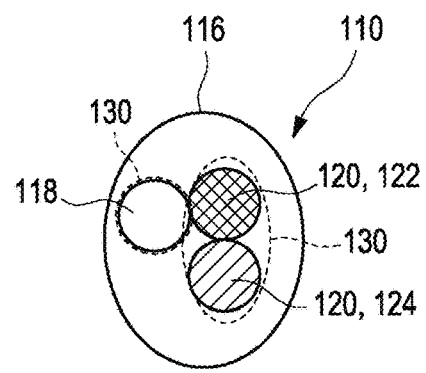
Figure 2:
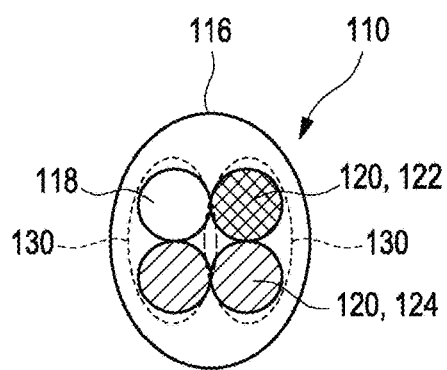

FIGS. 1H and 1R show embodiments of the measurement head 110 having a circular cross section. In FIG. 1H, the measurement head 110 comprises one optical sender fiber 118, one first optical receiving fiber 122 and one second optical receiving fiber 124. In FIG. 1R, the measurement head 110 comprises one optical sender fiber 118, one first optical receiving fiber 122 and two second optical receiving fibers 124. The amount and arrangement of the optical fibers is only exemplar. All possible amounts and radial and non-radial symmetric arrangements are possible The measurement head 110 comprises one or more transfer devices 130, in particular collimating lenses. FIG. 2A to GG show in top view embodiments of lens arrangements in the measurement head 110. The arrangement of fibers in the measurement heads 110 of FIG. 2A to 2EE correspond to the arrangement shown in FIGS. 1A to 1EE. For clarity reference numbers of respective fibers were omitted such that reference is made to FIGS. 1A to 1EE. FIGS. 2FF and 2GG shows fiber arrangement corresponding to FIGS. 1H and 1R, respectively, but in this embodiment the measurement head 110 has a circular cross section. The measurement head 110 may comprise one transfer device 130 for each of the optical fibers or a common transfer device 130 for two or more optical fibers. For example, in FIG. 2A, the measurement head 110 comprise one transfer device 130 for each of the optical fibers. In FIG. 2B, the measurement head 110 comprises two transfer devices 130, wherein one transfer device 130 covers the first optical receiving fiber 122 and one transfer device 130 covers both the optical sender fiber 118 and the second optical receiving fiber 124. In FIGS. 2C, 2F, 2G, 2H, 2J, 2L, 2P, 2Q, 2R, 2T, 2V, 2AA, 2BB and 2EE the measurement head 110 comprises one transfer device 130 covering all optical fibers. In FIG. 2D, the measurement head 110 comprises two transfer devices 130, wherein one transfer device 130 covers the second optical receiving fiber 124 and one transfer device 130 covers both the optical sender fiber 118 and the first optical receiving fiber 122. In FIG. 2E, the measurement head 110 comprises two transfer devices 130, wherein one transfer device 130 covers one of the first optical receiving fibers 122 surrounded by the second optical receiving fiber 124 and one transfer device 130 covers the other one of the first optical receiving fibers 122 surrounded by the optical sender fiber 118. In FIG. 2I, the measurement head 110 comprises two transfer devices 130, wherein one transfer device 130 covers the optical sender fiber 118 and the other transfer device covers both of the first optical receiving fiber 122 and the second optical receiving fiber 124. In FIG. 2K, the measurement head 110 comprises three transfer devices 130, wherein one transfer device 130 covers both the optical sender fiber 118 and the first optical receiving fiber 122 and one transfer device 130 covers the second optical receiving fiber 124. A third transfer device 130 may be arranged such that it covers the first optical receiving fiber 122 only. In FIG. 2M, the measurement head 110 comprises two transfer devices 130, wherein one transfer device 130 covers the optical sender fiber 118 and the other transfer device 130 covers the first and second optical receiving fibers 122, 124. In FIG. 2N, the measurement head 110 comprises two transfer devices 130, wherein one transfer device 130 covers all optical fibers and the other transfer device 130 covers the optical sender fiber 118 only. In FIG. 2O, the measurement head 110 comprises two transfer devices 130, wherein one transfer device 130 covers all optical fibers and the other transfer device 130 covers the optical sender fibers 118, only. In FIG. 2S, the measurement head 110 comprises two transfer devices 130, wherein one transfer device 130 covers the optical sender fiber 118 and the other transfer device 130 covers the first and second optical receiving fibers 122, 124. In FIG. 2U, the measurement head 110 comprises three transfer devices 130, wherein one transfer device 130 covers the optical sender fiber 118, a second transfer device 130 covers the first optical receiving fibers 122 and a third transfer device 130 covers the second optical receiving fibers 124. In FIG. 2W, the measurement head 110 comprises four transfer devices 130, wherein one transfer device 130 covers one of the second optical receiving fibers 124 and the first optical receiving fibers surrounding said second optical receiving fiber 124, a second transfer device which covers the other one of the second optical receiving fibers 124 and the optical sender fibers 118 surrounding said second optical receiving fiber 124, a third transfer device 130 covering one of the second optical receiving fibers 124, only, and a fourth transfer device 130 covering the other one of the second optical receiving fibers 124, only. In FIG. 2X, the measurement head 110 comprises two transfer devices 130, wherein one transfer device 130 covers the optical receiving fibers 120 and the other transfer device 130 covers the optical sender fibers 118 only. In FIG. 2Y, the measurement head 110 comprises two transfer devices 130, wherein one transfer device 130 covers all optical fibers and the other transfer device 130 covers the optical sender fibers 118 only. In FIG. 2Z, the measurement head 110 comprises two transfer devices 130, wherein one transfer device 130 covers the optical receiving fibers 120 and the other transfer device 130 covers the optical sender fibers 118 only. In FIGS. 2CC and 2DD, the measurement head 110 comprises two transfer devices 130, wherein one transfer device 130 covers all optical fibers and the other transfer device 130 covers the optical sender fiber 118 only. In FIG. 2FF, the measurement head 110 comprises two transfer devices 130, wherein one transfer device 130 covers the optical receiving fibers 120 and the other transfer device 130 covers the optical sender fiber 118 only. In FIG. 2GG, an alternative fiber lens arrangement for the fiber arrangement of FIG. 1R is shown. In this embodiment, one transfer device 130 covers the one of the second optical receiving fibers 124 and the optical sender fiber 118 and the other transfer device 130 covers the other one of the second optical receiving fibers 124 and the first optical receiving fibers 122.

Figure 3:
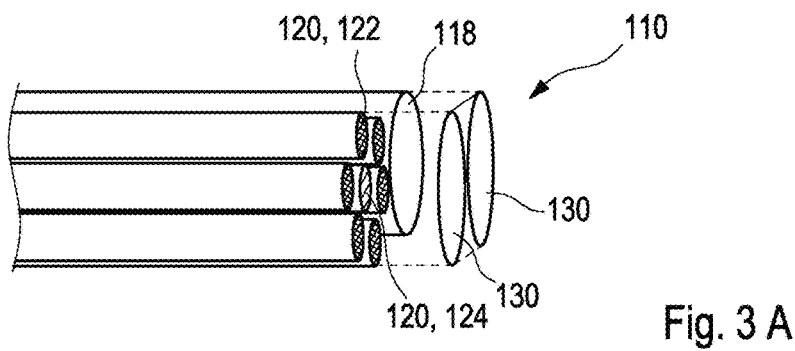
FIGS. 3A and B shows side views of embodiments of a measurement head according to the present invention.
Figure 3:
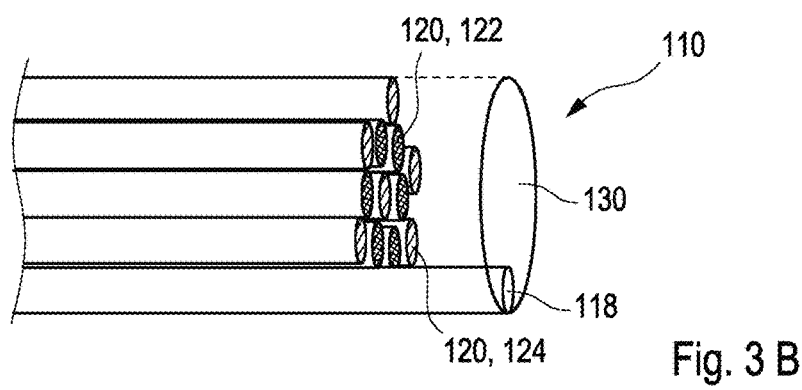

FIGS. 3A, 3B and FIGS. 5A to 5E show in a side view of embodiments of the measurement head 110. FIG. 3A corresponds to the fiber and lens arrangement depicted in FIGS. 1M and 2M. The measurement head 110 may comprise separate transfer devices 130 for optical sender fiber 118 and optical receiving fibers 120. The measurement head 110 may comprise one optical sender fiber 118. The measurement head 110 may comprise, in particular displaced from the optical sender fiber 118, one second optical receiving fiber 124 which is surrounded by six first optical receiving fibers 122 which are arranged radial around the second optical receiving fiber 124. The measurement head 110 may comprise a first transfer device 130, which may be arranged in front of the optical sender fiber 118, and a second transfer device 130 which may cover the first optical receiving fibers 122 and the second optical receiving fiber 124. FIG. 3B shows an embodiment of the measurement head 110 comprising one optical sender fiber 118, six first optical receiving fiber 122 and six second optical receiving fibers 124. The measurement head 110 may comprise one transfer device 130 covering all optical fibers. The optical sender fiber 118 may be guided up to the transfer device 130 such that internal reflections can be prevented.

FIGS. 5A to 5E show further embodiments of the measurement head 110. The lens and fiber arrangement in FIG. 5A corresponds to the lens and fiber arrangement as shown in FIG. 3A. In FIG. 5A, in addition the measurement head 110 comprises the spacer device 132 which is adapted to attach the transfer devices 130 to the optical fibers. The optical paths of the first optical receiving fiber 122 and/or the second optical receiving fiber 124 and/or the optical sender fiber 118 and/or the optical pathways of two or more transfer devices 130 may be fully or partially optically separated by mechanical means such as a fully or partially intransparent mechanical wall or cladding or the like to avoid internal reflections. This optical separation by mechanical means may be part of the spacer device 132. In FIG. 5B an arrangement comprising three fibers is shown. The optical sender fiber 118 may be arranged separately and parallel to the optical receiving fibers 120. The optical receiving fibers 120 may be arranged in one combined receiving fiber entrance end. A first transfer device 130 may be arranged in front of the entrance end of the optical receiving fibers 120 and a second transfer device 130 may be arranged in front of the exit end of the optical sender fiber 118. The combined receiving fiber entrance end may be split up into the first optical receiving fiber 122 and the second optical receiving fiber 124. For example, in a cross sectional view the first optical receiving fiber 122 and the second optical receiving fiber 124 may be arranged within the combined receiving fiber entrance end as half circles separated by a horizontal border. FIG. 5C shows a similar arrangement but in the embodiment of FIG. 5C, the first optical receiving fiber 122 and the second optical receiving fiber 124 may be arranged within the combined receiving fiber entrance end as half circles separated by a vertical border. FIG. 5D shows an arrangement wherein the first optical receiving fiber 122 and the second optical receiving fiber 124 and the optical sender fiber 118 each are designed as separated fibers. A first transfer device 130 may be arranged in front of the entrance end of the first optical receiving fiber 122 and a second transfer device 130 may be arranged in front of the entrance end of the second optical receiving fiber 124 and a third transfer device 114 may be arranged in front of the exit end of the optical sender fiber 118. The entrance ends of the optical receiving fibers 120 and the exit end of the optical sender fiber 118 may be arranged in the same plane such as plane-parallel. The transfer devices 130 may be arranged plane-parallel but in a different plane compared to the plane of the entrance ends of the optical receiving fibers 120 and the exit end of the optical sender fiber 118 such spaced apart from the plane of the entrance ends of the optical receiving fibers 120 and the exit end of the optical sender fiber 118. The plane of the entrance ends of the optical receiving fibers 120 and the exit end of the optical sender fiber 118 and the plane of the transfer devices 130 may be parallel planes. The centers of the exit end of the optical sender fiber 118 and the entrance ends of the optical receiving fibers 120 may be arranged at the intersection of a first plane which is the plane of the entrance faces of the optical receiving fibers 120 and the exit end of the sender fiber 118 with a second plane that is orthogonal to the first plane and comprises the line connecting the centers of the exit end of the optical sender fiber 118 and the entrance ends of the optical receiving fibers 120. In FIG. 5E, as in FIG. 5D, the first optical receiving fiber 122 and the second optical receiving fiber 124 and the optical sender fiber 118 are designed as separated fibers. In this embodiment, a first transfer device 130 may be arranged in front of the entrance end of the optical receiving fibers 120 and a second transfer device 130 may be arranged in front of the exit end of the optical sender fiber 118. As in FIG. 5D, the entrance ends of the optical receiving fibers 120 and the exit end of the optical sender fiber 118 may be arranged in the same plane. The first transfer device 130 and/or the second transfer device 130 may be arranged non-parallel such as under an angle with respect to the plane of the plane of the entrance ends of the optical receiving fibers 120 and the exit end of the optical sender fiber 118.

Figure 4:
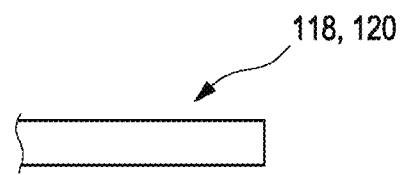
FIGS. 4A to F shows further embodiments of optical fibers according to the present invention.
Figure 4:
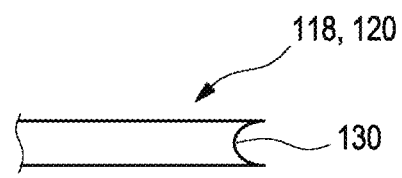
Figure 4:
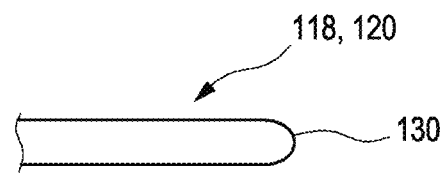
Figure 4:
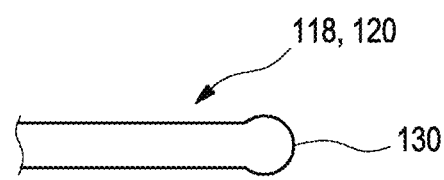
Figure 4:
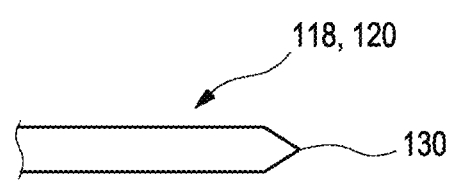
Figure 4:
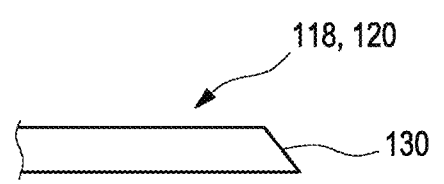

FIGS. 4A to F show different lens arrangements at the fiber ends. As described above, at least one transfer device 130 may be arranged at an end of the optical fibers such as the optical receiving fibers 120 and/or the optical sender fiber 118. The transfer device 130 may be attached directly to one optical fiber or may be attached to a bundle of optical fibers. Alternatively, the transfer device 130 may be attached to the optical fiber or bundle of optical fibers using at least one spacer device 132. FIG. 4A shows an optical fiber or a bundle of optical fibers. FIG. 4B shows the optical fiber or bundle of optical fibers having attached at least one concave lens. FIG. 4C shows the optical fiber or bundle of optical fibers having attached at least one convex lens. FIG. 4D shows the optical fiber or bundle of optical fibers having attached at least one spherical lens. FIG. 4E shows the optical fiber or bundle of optical fibers having attached at least one conical lens or at least one tip-shaped lens. FIG. 4F shows the optical fiber or bundle of optical fibers having attached at least one prism shaped lens, in particular a non-rotationally symmetric lens.

Figure 6:
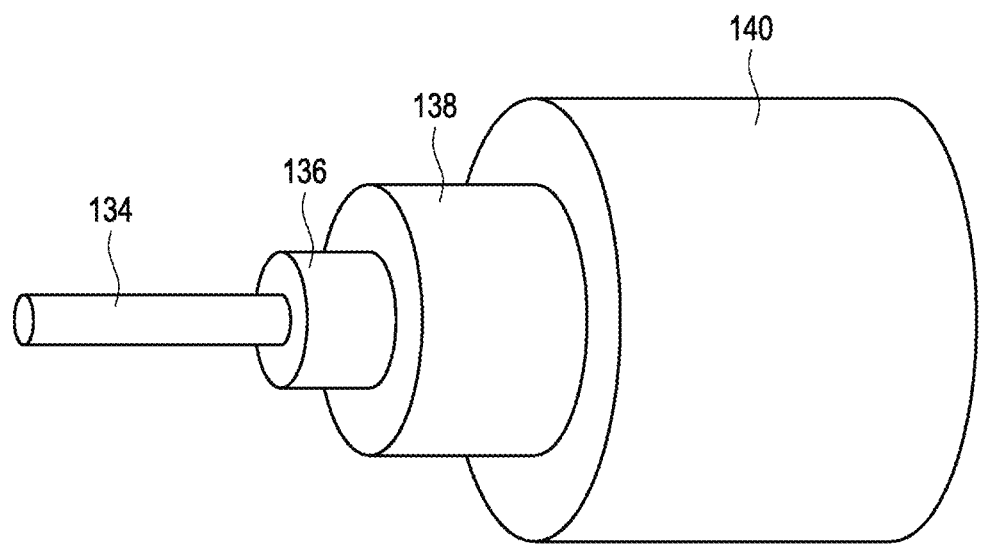
FIG. 6 shows an embodiment of an optical receiving fiber according to the present invention.

FIG. 6 shows a highly schematic view of an embodiment of an optical receiving fiber 120. Each of the optical receiving fibers 120 may comprise the at least one fiber core 134 which is surrounded by the at least one fiber cladding 136. The fiber cladding 136 may have a lower index of refraction as the fiber core 134. The fiber cladding 136 may also be a double or multiple cladding. The fiber cladding 136 may be surrounded by a buffer 138 and an outer jacket 140. The fiber cladding 136 may be coated by the buffer 138 which is adapted to protect the optical receiving fiber 120 from damages and moisture. The buffer 138 may comprise at least one UV-cured urethane acrylate composite and/or at least one polyimide material.

The optical receiving fibers 120 may have specific mechanical properties to ensure stability of the distance measurement in a broad range of environments. The mechanical properties of the optical receiving fibers 120 may be identical or the mechanical properties of the optical receiving fibers 120 may differ. Without wishing to be bound by this theory, a light supporting function of optical receiving fibers 120 relies on relationships of refractive indices and certain energy transport properties. Further certain mechanical parameters may be prerequisite that all functions of the optical receiving fibers 120 are maintained in a stable way. Therefore, certain mechanical parameters may act as prerequisite to ensure a stable measurement itself. At least one of the optical receiving fibers 120 and/or the transfer device 130 may have a ratio $\varepsilon_r/k$ in the range 0.362 (m·K)/W$\leq \varepsilon_r/k \leq$1854 (m·K)/W, wherein k is the thermal conductivity and $\varepsilon_r$ is the relative permittivity. The relative permittivity is also known as the dielectric constant. Preferably, the ratio $\varepsilon_r/k$ is in the range 0.743 (m·K)/W$\leq \varepsilon_r/k \varepsilon$194 (m·K)/W. More preferably, the ratio $\varepsilon_r/k$ is in the range 1.133 (m·K)/W$\leq \varepsilon_r/k \leq$88.7 (m·K)/W. At least one of the optical receiving fibers 120 and/or the transfer device 130 may have a relative permittivity in the range 1.02$\leq \varepsilon_r \leq$18.5, preferably in the range 1.02$\leq \varepsilon_r \leq$14.5, more preferably in the range 1.02$\leq \varepsilon_r \leq$8.7, wherein the relative permittivity is measured at 20° C. and 1 kHz. The optical receiving fibers 120 and/or the transfer device 130 may have a thermal conductivity of k$\leq$24 W/(m·K), preferably k$\leq$17 W/(m·K), more preferably k$\leq$14 W/(m·K). The optical receiving fibers 120 and/or the transfer device 130 may have a thermal conductivity of k$\geq$0.003 W/(m·K), preferably k$\leq$0.007 W/(m·K), more preferably k$\leq$0.014 W/(m·K). The thermal conductivity may be measured at 0° C. and <1% relative humidity.

The transfer device 130 may have a ratio $v_e/n_D$ in the range 9.05$\leq v_e/n_D \leq$77.3, wherein $v_e$ is the Abbé-number and $n_D$ is the refractive index. The Abbé-number $v_e$ is given by $$v_e = \frac{(n_D - 1)}{(n_F - n_c)},$$

wherein $n_i$ is the refractive index for different wavelengths, wherein $N_C$ is the refractive index for 656 nm, $n_D$ is the refractive index for 589 nm and $n_F$ is the refractive index for 486 nm, measured at room temperature, see e.g. https://en.wikipedia.org/wiki/Abbe_number. Preferably, the ratio is in the range of 13.9$\leq v_e/n_D \leq$44.7, more preferably the ratio $v_e/n_D$ in the range of 15.8$\leq v_e/n_D \leq$40.1.

Each of the optical receiving fibers 120 may comprise the at least one cladding 136 and the at least one core 134. A product $\alpha \Delta n$ may be in the range 0.0004 dB/km$\leq \alpha \Delta n \leq$110 dB/km at at least one wavelength in a visual and near infrared wavelength range, wherein $\alpha$ the attenuation coefficient and $\Delta n$ is the refractive index contrast with $\Delta n = (n_1^2 - n_2^2)/(2n_1^2)$, wherein $n_1$ is the maximum core refractive index and $n_2$ is the cladding refractive index. Preferably, the product $\alpha \Delta n$ is in the range 0.002 dB/km$\leq \alpha \Delta n \leq$23 dB/km, more preferably in the range 0.02 dB/km$\leq \alpha \Delta n \leq$11.26 dB/km. The refractive index contrast $\Delta n$ may be in the range 0.0015$\leq \Delta n \leq$0.285, preferably in the range 0.002$\leq \Delta n \leq$0.2750, more preferably in the range 0.003$\leq \Delta n \leq$0.25. The attenuation coefficient of the optical receiving fibers 120 may be in the range 0.2 dB/km$\leq \alpha \leq$420 dB/km, preferably in the range 0.25 dB/km$\leq \alpha \leq$320 dB/km. The transfer device 130 may have an aperture area $D_1$ and at least one of the optical receiving fibers 120 may be the fiber core 134 with a cross-sectional area $D_2$, wherein a ratio $D_1/D_2$ is in the range 0.54$\leq D_1/D_2 \leq$5087, preferably 1.27$\leq D_1/D_2 \leq$413, more preferably 2.17$\leq D_1/D_2 \leq$59.2. A diameter $d_{core}$ of the core 134 of at least one of the optical receiving fibers 120 may be in the range 2.5 µm$\leq d_{core} \leq$10000 µm, preferably in the range 7 µm$\leq d_{core} \leq$3000 µm, more preferably in the range 10 µm$\leq d_{core} \leq$500 µm.

The optical receiving fibers 120 and/or the transfer device 130 may have a Youngs modulus, also denoted elastic modulus, of less or equal 188 GPa, measured at room temperature, for example by using ultrasonic testing. Preferably the optical receiving fibers 120 and/or the transfer device 130 may have a Youngs modulus of less or equal 167 GPa, more preferably in the range from to 0.0001 GPa to 97 GPa. The optical receiving fibers 120 and/or the transfer device 130 may have a Youngs modulus of greater or equal 0.0001 GPa, preferably of greater or equal 0.007 GPa, more preferably of greater or equal 0.053 GPa.

Figure 7:
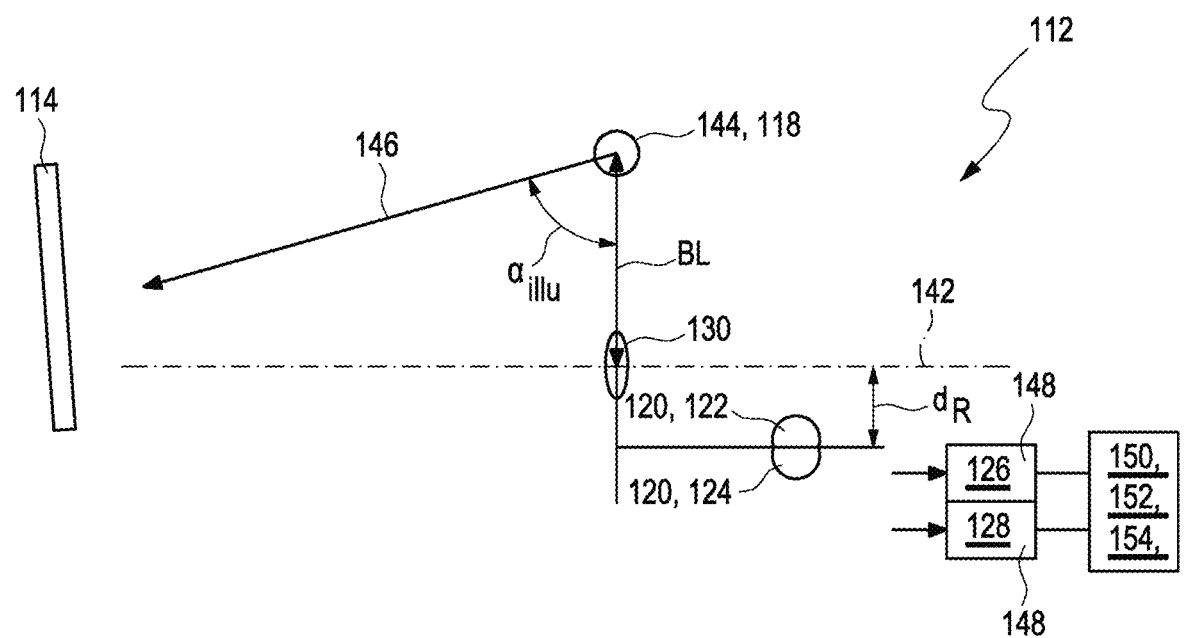
FIG. 7 shows a schematic detector setup according to the present invention.

In FIG. 7, a schematic setup of the detector 112 for determining a position of the at least one object 114 is depicted. The detector 112 comprises the at least one transfer device 130. The transfer device 130 has at least one focal length in response to the at least one incident light beam propagating from the object 114 to the detector 110. The transfer device 130 has at least one optical axis 142.

The detector 112 comprises at least one illumination source 144 adapted to generate at least one light beam 146 for illuminating the object 114. Specifically, the illumination source 144 may comprise at least one light source such as at least one laser and/or laser source. Various types of lasers may be employed, such as semiconductor lasers. Additionally or alternatively, non-laser light sources may be used, such as LEDs and/or light bulbs. The illumination source 144 may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source 144 may have a wavelength of 300 to 1000 nm, especially 500 to 1000 nm. Additionally or alternatively, light in the infrared spectral range may be used, such as in the range of 780 nm to 3.0 μm. Specifically, the light in the part of the near infrared region where silicon photodiodes are applicable specifically in the range of 700 nm to 1000 nm may be used. Further, the illumination source 144 may be configured for emitting modulated or non-modulated light. In case a plurality of illumination sources 144 is used, the different illumination sources may have different modulation frequencies which later on may be used for distinguishing the light beams. The illumination source 144 may comprise the at least one optical sender fiber 118 adapted to transmit the light beam 146 generated by the light source such that it illuminates the object 112. The light beam 146 may leave the optical sender fiber 118 at an exit face of the optical sender fiber 118.

Preferably, the illumination source 144 may be configured to illuminate the object 144 under an angle $\alpha_{illu}$ with respect to the optical axis. The angle $\alpha_{illu}$ may be in the range $0° \leq \alpha_{illu} \leq 40°$, preferably $\alpha_{illu}$ may be in the range $1° \leq 35°$, more preferably $\alpha_{illu}$ may be in the range $2° \alpha_{illu} \leq 25°$. The illumination source 144, specifically an exit pupil of the illumination source 144, may be arranged under an arbitrary angle with respect to the optical axis 142. Illuminating the object 114 under an angle $\geq 5°$ with respect to the optical axis 142 may allow increasing the measurement range and enhancing resolution. Other embodiments, however, are feasible. For example, the illuminating light beam 146 may be parallel to the optical axis 142 or tilted with respect to the optical axis 142. As an example, the illuminating light beam 146 and the optical axis 146 may include an angle of less than 10°, preferably less than 5° or even less than 2°. Further, the illuminating light beam 146 may be on the optical axis 142 or off the optical axis 142. As an example, the illuminating light beam 146 may be parallel to the optical axis having a distance of less than 10 mm to the optical axis, preferably less than 5 mm to the optical axis or even less than 1 mm to the optical axis or may even coincide with the optical axis 142.

The illumination source 144 may have a geometrical extend G in the range $1.5 \cdot 10^{-7}$ mm²·sr≤G≤314 mm²·sr, preferable in the range $1 \cdot 10^{-5}$ mm²·sr≤G≤22 mm²·sr, more preferable in the range $3 \cdot 10^{-4}$ mm²·sr≤G≤3.3 mm²·sr. The geometrical extent G of the illumination source 144 may be defined by $$G = A \cdot \Omega \cdot n^2,$$

wherein A is the area of the surface, which can be an active emitting surface, a light valve, optical aperture or the area of the fiber core 134 with $A_{OF} = \pi \cdot r^2_{OF}$, and $\Omega$ is the projected solid angle subtended by the light and n is the refractive index of the medium. For rotationally-symmetric optical systems with a half aperture angle θ, the geometrical extend is given by $$G = \pi \cdot A \cdot \sin^2(\theta) n^2.$$

For optical fibers a divergence angle is obtained by $\theta_{max} = \arcsin(NA/n)$, where NA is the maximum numerical aperture of the optical fiber.

The detector 112 comprises the at least one first optical receiving fiber 122 and the at least one second optical receiving fiber 124. Each of the optical receiving fibers 120 may have at least one entrance face. A geometric center of the respective entrance face may be aligned perpendicular with respect to an optical axis 142 of the transfer device 130. At least one of the optical receiving fibers 120 may have an entrance face which is oriented towards the object 114. The optical receiving fibers 120 may be arranged in a direction of propagation of an incident light beam propagating from the object 114 to the detector 112 behind the transfer device 130. The optical receiving fibers 120 and the transfer device 130 may be arranged such that the light beam passes through the transfer device 130 before impinging on the optical receiving fibers 120. The optical receiving fibers 120 may be arranged as such, that the light beam impinges on the optical receiving fibers 120 between the transfer device 130 and the focal point of the transfer device 130. For example, a distance in a direction parallel to the optical axis 142 between the transfer device 130 and the position where the light beam impinges on the optical receiving fibers 120 may be at least 20% of the focal length, more preferably at least 50% of the focal length, most preferably at least 80% of the focal length. For example, the distance in a direction parallel to the optical axis 142 between the entrance face at least one of the optical receiving fibers 120 receiving the light beam and the transfer device 130 may be at least 20% of the focal length, more preferably at least 50% of the focal length, most preferably at least 80% of the focal length.

In the preferred setup, the entrance ends of the optical receiving fibers 120 may be positioned such that at an end of a required measurement range an image of the light spot is in focus or near focus and such that both optical receiving fibers 120 receive a similar amount of optical power.

The transfer device 130 may comprise at least one gradient index (GRIN) lens. The transfer device 130 and the optical receiving fibers 120 may be configured as one-piece. The optical receiving fibers 120 may be attached to the transfer device 130 such as by a polymer or glue or the like, to reduce reflections at interfaces with larger differences in refractive index.

The detector 112 may comprise a baseline. The exit pupil of the illumination source 144 may be displaced from the optical axis 142 in a first direction by the distance BL. The optical receiving fibers 120, specifically a centroid of the entrance faces of the optical receiving fibers 120, may be displaced from the optical axis 142 in a second direction, in particular different to the first direction, by the distance $d_R$. The first optical receiving fiber 122 has a core diameter of $d_1$. The second optical receiving fiber 124 has a core diameter of $d_2$. A ratio $d_1$/BL is in the range $0.000047 \leq d_1/BL \leq 313$ and/or a ratio $d_2$/BL is in the range $0.000047 \leq d_2/BL \leq 313$. Preferably the ratio $d_1$/BL is in the range $0.000114 \leq d_1/BL \leq 30.37$, preferably in the range $0.000318 \leq d_1/BL \leq 6.83$, and/or wherein the ratio $d_2$/BL is in the range $0.000114 \leq d_2/BL \leq 30.37$, more preferably in the range $0.000318 \leq d_2/BL \leq 6.83$. The displacement of the illumination source 144 from the optical axis 142 may have an extent greater than 0. The displacement of the illumination source 144 from the optical axis 142 may be in the range 10 μm≤BL≤127000 μm, preferably in the range 100 μm≤BL≤76200 μm, more preferably in the range 500 μm≤BL≤25400 μm. For example, core diameters may range from 1 μm to 5 mm such that a minimal baseline may be 1

μm. A maximum baseline may be defined as 2 m. By adequately setting the ratio of the displacement (BL) and the receiving fiber core diameters ($d_1$ and $d_2$) the measurement range and the resolution can be adjusted depending on the measurement application. In this example a ratio of $d_1$/BL may be $0.0000005 \leq d_1/BL \leq 1$ and/or a ratio of $d_2$/BL may be $0.0000005 \leq d_2/BL \leq 1$. Preferably the ratio $d_1$/BL may be $0.000114 \leq d_1/BL \leq 0.8$, more preferably the ratio $d_1$/BL may be $0.000318 \leq d_1/BL \leq 0.5$. Preferably, the ratio $d_2$/BL may be $0.000114 \leq d_2/BL \leq 0.8$, more preferably $0.000318 \leq d_2/BL \leq 0.5$. A displacement of the exit pupil of the illumination source 144 from the optical axis may allow increasing the measurement range and enhancing resolution. Each of the optical receiving fibers 120 may comprise the at least one entrance face. A centroid of the entrance faces of the first and second optical receiving fibers may be displaced from the optical axis by the distance $d_R$. The distance $d_R$ may be in the range 10 μm $\leq d_R \leq$ 127000 μm, preferably in the range 100 μm $\leq d_R \leq$ 76200 μm, more preferably in the range 500 μm $\leq d_R \leq$ 25400 μm. Thus, the illumination source 144 and/or the exit face of the optical sender fiber 118 and the entrance face of one or both of the optical receiving fibers 120 may be arranged with a relative spatial offset from the optical axis 142 of the transfer device 130. In particular, the illumination source 144 and/or the exit face of the optical sender fiber 118 and the entrance face of one or both of the optical receiving fibers 120 may be arranged with different spatial offsets from the optical axis 142. Such an arrangement may allow enhancing the tendency of the combined signal Q, and thus, accuracy of the distance measurement. In particular, with increasing spatial offset a slope in a Q vs distance diagram increases and thus allows distinguishing similar distances more accurately. For example, one of the illumination source 144 and the entrance face of one or both of the optical receiving fibers 120 may be arranged on the optical axis 142 and the other one may be arranged spaced apart from the optical axis 142. For example, both of illumination source 144 and the entrance face of one or both of the optical receiving fibers 120 may be arranged spaced apart from the optical axis 142 by at least one different distance, in particular perpendicular to the optical axis 142. For example, the at least two optical receiving fibers 120 may be arranged at different distances from the optical axis 142. The optical receiving fibers 120 may be adapted to mimic a larger distance compared to the real distance perpendicular to an optical axis 142 between the illumination source 144 and the optical sensors 126, 128 without moving the illumination source 144 and/or optical sensors 126, 128.

The detector comprises at least two optical sensors 126, 128, wherein at least one first optical sensor 126 is arranged at an exit end of the first optical receiving fiber 122 and at least one second optical sensor 128 is arranged at an exit end of the second optical receiving fiber 124. Each optical sensor has at least one light sensitive area 148. The first optical receiving fiber 122 may be arranged and configured to provide light to the first optical sensor 126 and the second optical receiving fiber 124 may be arranged and configured to provide light to the second optical sensor 128. This is schematically shown with two arrows pointing to the optical sensors 126, 128 in FIG. 7. Each optical sensor 126, 128 is designed to generate at least one sensor signal in response to an illumination of its respective light-sensitive area 148 by a light beam having passed through the respective optical receiving fiber 122, 124.

The detector 112 comprises at least one evaluation device 150 being configured for determining at least one longitudinal coordinate z of the object 114 by evaluating a combined signal Q from the sensor signals. The first optical sensor 126, in response to the illumination by the light beam, may generate a first sensor signal $s_1$, whereas the second optical sensor 128 may generate a second sensor signal 52. Preferably, the optical sensors 126, 128 are linear optical sensors. The sensor signals $s_1$ and $s_2$ are provided to the evaluation device 150. The evaluation device 150 is embodied to derive a combined signal Q from the sensor signal, specifically by evaluating a quotient signal. From the combined signal Q, derived by dividing the sensor signals $s_1$ and $s_2$ or multiples or linear combinations thereof, may be used for deriving at least one item of information on a longitudinal coordinate z of the object 114. The evaluation device 150 may have at least one divider 152 for forming the combined signal Q, and, as an example, at least one position evaluation device 154, for deriving the at least one longitudinal coordinate z from the combined signal Q. It shall be noted that the evaluation device 150 may fully or partially be embodied in hardware and/or software. Thus, as an example, one or more of components 152, 154 may be embodied by appropriate software components.

Figure 8:
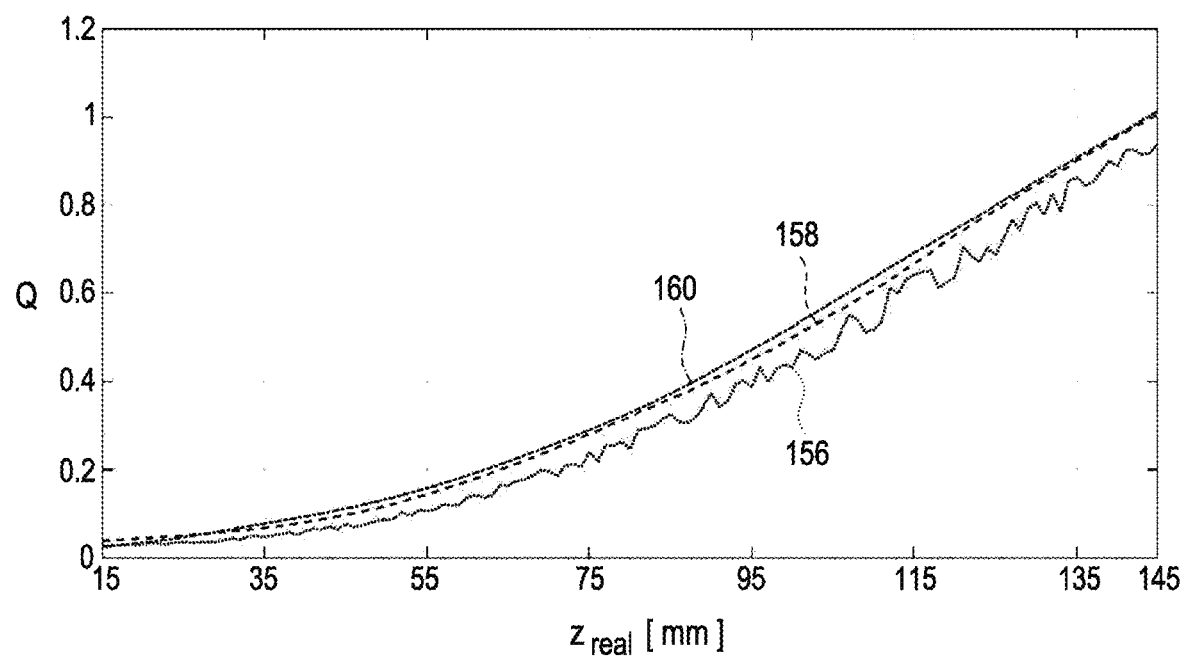
FIG. 8 shows experimental results of distance measurement.

FIG. 8 shows experimental results of distance measurements. The employed measurement head 110 comprises two optical receiving fiber 120 including entrance ends and one optical sender fiber 118 including exit end and including the corresponding fiber cores 134 with identical diameters of 500 μm are aligned and centered horizontally in comparable to the setup in FIG. 1D, wherein the entrance ends of the two optical receiving fibers 120 are positioned directly adjacent to each other, whereas the centroid of the exit end of the optical sender fiber 118 has a distance of 3.4 mm to the centroid of both optical receiving fiber entrance ends, which corresponds to the baseline. As a transfer device 130, an aspherical lens with a diameter of 3 mm collimated the light beams 146 coming out of the exit end of the optical sender fiber 118, whereas the transfer device 130 is positioned in a focal distance of 2 mm of the exit end of the optical sender fiber 118. An identical transfer device 130 in front of the two receiving ends of the optical receiving fibers 120 collects the light beams 146 reflected from a target. Since the entrance ends of the optical receiving fibers 120 are positioned nearer to the transfer device 130 than its focal length, the generated image on the entrance ends of the optical receiving fibers 120 is out of focus. The entrance end of the optical sender fiber 118 is connected to a LED with a central wavelength of 635 nm, while the exit ends of the optical receiving fibers 120 are connected to silicon photodiodes. The determined combined signal Q is shown as a function of the real object distance $z_{real}$ in mm. Three different targets were tested, in particular a black paper object (curve 156, dotted line), a white paper object (curve 158, dashed line) and a metallic surface (curve 160, dashed dotted line). The white paper target used in this experiment yields a reflectivity of 84% at the given wavelength, while the black paper target yields only 10% reflectivity. As metallic surface, an aluminum sheeting with brushed surface is employed. A great reliability independent on the target reflectivity and material is observed. The curve with black paper target shows strong noise due to low signal intensity. The noise may be reduced by introducing automatic gain control in the analog front-end of the receiving electronics or an automated adaption of the illumination intensity.

LIST OF REFERENCE NUMBERS 110 measurement head
112 Detector

114 Object
116 Housing
118 optical sender fiber
120 optical receiving fiber
122 1. optical receiving fiber
124 2. optical receiving fiber
126 1. optical sensor
128 2. optical sensor
130 transfer device
132 spacer device
134 core
136 cladding
138 buffer
140 jacket
142 optical axis
144 Illumination source
146 light beam
148 light sensitive area
150 evaluation device
152 divider
154 position evaluation device
156 curve
158 curve
160 curve

The invention claimed is:

1. A detector (112) for determining a position of at least one object (114), the detector (112) comprising:

at least one transfer device (130), wherein the transfer device (130) has at least one focal length in response to the at least one incident light beam propagating from the object (114) to the detector (112), wherein the transfer device (130) has at least one optical axis (142);

at least one illumination source (144) adapted to generate at least one light beam (146) for illuminating the object (114), wherein an exit pupil of the illumination source (144) is displaced from the optical axis (142) by a distance BL, wherein the illumination source (144) has a geometrical extend G in a range $3 \cdot 10^{-4}$ mm$^2$·sr$\leq$G$\leq$3.3 mm$^2$·sr; wherein the illumination source (144) comprises at least one optical sender fiber (118) for illuminating the object (114);

at least one first optical receiving fiber (120, 126) and at least one second optical receiving fiber (120, 124), wherein each of the optical receiving fibers (120, 126, 128) comprises at least one cladding (136) and at least one core (134), wherein the first optical receiving fiber (120, 122) has a core diameter of $d_1$, wherein the second optical receiving fiber (120, 124) has a core diameter of $d_2$, wherein the ratio $d_1$/BL is in a range $0.000318 \leq d_1/BL \leq 6.83$, and/or wherein the ratio $d_2$/BL is in a range $0.000318 \leq d_2/BL \leq 6.83$; wherein an entrance face of at least one of the optical receiving fibers (120, 126, 124) is arranged such that a variance over distance dependence of the combined signal is maximal, wherein the entrance face of at least one of the optical receiving fibers (120, 126, 124) is positioned as such that a combined signal $Q_{far}$ at large object distances and a combined signal $Q_{close}$ at small object distances have a maximum variation $$\frac{Q_{far}}{Q_{close}} \approx \frac{r_{Coc}^{Object,close}(z_O, Z_s, Z_i)^2}{r_{Coc}^{Object,far}(z_O, Z_s, Z_i)^2} \to \max,$$

wherein $r_{Coc}^{Object,close}$ is a radius of the circle of confusion at small object distances and $r_{Coc}^{Object,far}$ is a radius of the circle of confusion at large object distances, wherein $z_O$ is a detectable distance range between the entrance face of at least one of the optical receiving fibers (120, 126, 124) and the object, $z_s$ is a distance between the transfer device (130) and the entrance face of at least one of the optical receiving fibers (120, 126, 124) and $z_i$ is a position of the focused image behind the transfer device (130), which depends on the position of the object $z_o$;

at least two optical sensors (126, 128), wherein at least one first optical sensor (126) is arranged at an exit end of the first optical receiving fiber (120, 122) and at least one second optical sensor (128) is arranged at an exit end of the second optical receiving fiber (120, 124), wherein each optical sensor (126, 128) has at least one light sensitive area (147), wherein each optical sensor (126, 128) is designed to generate at least one sensor signal in response to an illumination of its respective light-sensitive area (148) by a light beam having passed through the respective optical receiving fiber (120, 122, 124); and at least one evaluation device (150) being configured for determining at least one longitudinal coordinate z of the object (114) by evaluating a combined signal Q from the sensor signals.

2. The detector (112) according to claim 1, wherein the illumination source (144) is configured to illuminate the object (114) under an angle $\alpha_{illu}$ with respect to the optical axis (142), wherein the angle is in a range $0° \leq \alpha_{illu} \leq 40$.

3. The detector (112) according to claim 1, wherein at least one of the optical receiving fibers (120, 122, 124) and/or the transfer device (130) has a ratio $\varepsilon_r/k$ in a range $0.362$ (m·K)/W$\leq \varepsilon_r/k \leq 1854$ (m·K)/W, wherein k is the thermal conductivity and $\varepsilon_r$ is the relative permittivity.

4. The detector (112) according to claim 1, wherein the transfer device (130) has a ratio $v_e/n_D$ in a range $9.05 \leq v_e/n_D \leq 77.3$, wherein $v_e$ is the Abbé-number and $n_D$ is the refractive index, wherein the Abbé-number $v_e$ is given by $$v_e = \frac{(n_D - 1)}{(n_F - n_c)},$$

wherein $n_i$ is the refractive index for different wavelengths, wherein $n_C$ is the refractive index for 656 nm, $n_D$ is the refractive index for 589 nm and $n_F$ is the refractive index for 486 nm.

5. The detector (112) according to claim 1, wherein a product $\alpha \Delta n$ is in a range $0.0004$ dB/km$\leq \alpha \Delta n \leq 110$ dB/km at least one wavelength in a visual and near infrared wavelength range, wherein a is the attenuation coefficient and $\Delta n$ is the refractive index contrast with $\Delta n = (n_1^2 - n_2^2)/(2n_1^2)$, wherein $n_1$ is the maximum core refractive index and $n_2$ is the cladding refractive index.

6. The detector (112) according to claim 1, wherein the transfer device (130) has an aperture area $D_1$ and at least one of the optical receiving fibers (120, 122, 124) has a fiber core (134) with a cross-sectional area $D_2$, wherein a ratio $D_1/D_2$ is in a range $0.54 \leq D_1/D_2 \leq 5087$.

7. The detector (112) according to claim 1, wherein each of the first and the second optical receiving fibers (120, 122, 124) comprises at least one entrance face configured to receive the light beam propagating from the object (114) to the detector (112) having passed through the transfer device (130), wherein a centroid of the entrance faces of the first and second optical receiving fibers (120, 122, 124) is displaced from the optical axis (142) by a distance $d_R$, wherein $d_R$ is in a range 10 μm≤$d_R$≤127000 μm.

8. The detector (112) according to claim 1, wherein the evaluation device (150) is configured for deriving the combined signal Q by one or more of dividing the sensor signals, dividing multiples of the sensor signals, or dividing linear combinations of the sensor signals.

9. The detector (112) according to claim 8, wherein the evaluation device (150) is configured for using at least one predetermined relationship between the combined signal Q and the longitudinal coordinate for determining the longitudinal coordinate.

10. The detector (112) according to claim 1, wherein the evaluation device (150) is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, $A_1$ and $A_2$ are areas of the beam profile at a sensor position of the optical sensors (126, 128), and $E(x,y,z_o)$ denotes the beam profile given at the object distance $z_o$.

11. The detector (112) according to claim 1, wherein each of the sensor signals comprises
at least one information of at least one area of the beam profile of the light beam, wherein the beam profile is selected from the group consisting of a trapezoid beam profile; a triangle beam profile; a conical beam profile and a linear combination of Gaussian beam profiles, wherein the light-sensitive areas (148) are arranged such that a first sensor signal comprises information of a first area of the beam profiles and a second sensor signal comprises information of a second area of the beam profile, wherein the first area of the beam profile and the second area of the beam profile are one or both of adjacent or overlapping regions, wherein the evaluation device (150) is configured to determine the first area of the beam profile and the second area of the beam profile, wherein the first area of the beam profile comprises essentially edge information of the beam profile and the second area of the beam profile comprises essentially center information of the beam profile, wherein the edge information comprises information relating to a number of photons in the first area of the beam profile and the center information comprises information relating to a number of photons in the second area of the beam profile, wherein the evaluation device (150) is configured to derive the combined signal Q by one or more of dividing the edge information and the center information, dividing multiples of the edge information and the center information, dividing linear combinations of the edge information and the center information.

12. The detector (112) according to claim 1, wherein each optical receiving fiber (120, 122, 124) has at least one entrance face, wherein a geometrical center of the respective entrance face is aligned perpendicular with respect to the optical axis (142) of the transfer device (130).

13. The detector (112) according to claim 1, wherein at least one of the optical receiving fibers (120, 122, 124) is a structured fiber having a shaped and/or structured entrance and/or exit face.

14. The detector (112) according to claim 1, wherein the optical sensors are non-pixelated optical sensors.

15. A method for determining a position of at least one object (114) by using at least one detector (112), the method comprising the following steps:
providing at least one transfer device (130), wherein the transfer device (130) has at least one focal length in response to the at least one incident light beam propagating from the object (114) to the detector (112), wherein the transfer device (130) has at least one optical axis (142);
providing at least one illumination source (144) adapted to generate at least one light beam (146) for illuminating the object (114), wherein the illumination source (144) is displaced from the optical axis (142) by a distance BL, wherein the illumination source (144) has a geometrical extend G in a range $3 \cdot 10^{-4}$ mm²·sr≤G≤3.3 mm²·sr; wherein the illumination source (144) comprises at least one optical sender fiber (118) for illuminating the object (114);
providing at least one first optical receiving fiber (120, 122) and at least one second optical receiving fiber (122, 124), wherein each of the optical receiving fibers (120, 122, 124) comprises at least one cladding (136) and at least one core (134), wherein the first optical receiving fiber (120, 122) has a core diameter of $d_1$, wherein the second optical receiving fiber (120, 124) has a core diameter of $d_2$, wherein a ratio $d_1$/BL is in a range 0.000318≤$d_1$/BL≤6.83, and wherein the ratio $d_2$/BL is in the range 0.000318≤$d_2$/BL≤6.83, wherein an entrance face of at least one of the optical receiving fibers (120, 126, 124) is arranged such that a variance over distance dependence of the combined signal is maximal, wherein the entrance face of at least one of the optical receiving fibers (120, 126, 124) is positioned as such that a combined signal $Q_{far}$ at large object distances and a combined signal $Q_{close}$ at small object distances have a maximum variation $$\frac{Q_{far}}{Q_{close}} \approx \frac{r_{Coc}^{Object,close}(z_O, Z_s, Z_i)^2}{r_{Coc}^{Object,far}(z_O, Z_s, Z_i)^2} \to \max,$$

wherein $r_{Coc}^{Object,close}$ is a radius of the circle of confusion at small object distances and $r_{Coc}^{Object,far}$ is a radius of the circle of confusion at large object distances, wherein $z_O$ is a detectable distance range between the entrance face of at least one of the optical receiving fibers (120, 126, 124) and the object, $z_s$ is a distance between the transfer device (130) and the entrance face of at least one of the optical receiving fibers (120, 126, 124) and $z_i$ is a position of the focused image behind the transfer device (130), which depends on the position of the object $z_o$;
providing at least two optical sensors (126, 128), wherein at least one first optical sensor (126) is arranged at an exit end of the first optical receiving fiber (120, 122) and at least one second optical sensor is arranged at an exit end of the second optical receiving fiber (120, 124), wherein each optical sensor (126, 128) has at least one light sensitive area (148), wherein each optical sensor (126, 128) is designed to generate at least one sensor signal in response to an illumination of its respective light-sensitive area (148) by the light beam generated by the object (114) having passed through the respective optical receiving fiber (120, 122, 124);

illuminating the light-sensitive area (148) of at least one of the optical sensors (126, 128) with the light beam having passed through the first optical receiving fiber (120, 122) and illuminating the light-sensitive area (148) of the other one of the optical sensors (126, 128) with the light beam having passed through the second optical receiving fiber (120, 124), wherein, thereby, each of the light-sensitive areas (148) generates at least one sensor signal; and evaluating the sensor signals, thereby, determining at least one longitudinal coordinate z of the object (114), wherein the evaluating comprises deriving a combined signal Q of the sensor signals.

16. A method of using the detector (112) according to claim 1, the method comprising using the detector (112) for a purpose selected from the group consisting of: a position measurement in traffic technology; an entertainment application; an optical data storage application; a security application; a surveillance application; a safety application; a human-machine interface application; a logistics application; an endoscopy application; a medical application; a tracking application; a photography application; a machine vision application; an industrial sensing application; a robotics application; a quality control application; a 3D printing application; an augmented reality application; a manufacturing application; and a purpose in combination with optical data storage and readout.

* * * * *